(12) United States Patent
Funakubo et al.

(10) Patent No.: US 10,191,509 B2
(45) Date of Patent: Jan. 29, 2019

(54) INFORMATION PROCESSING DEVICE, INFORMATION PROCESSING METHOD, AND COMPUTER READABLE STORAGE MEDIUM

(71) Applicant: FUJITSU LIMITED, Kawasaki-shi, Kanagawa (JP)

(72) Inventors: Toshiaki Funakubo, Kawasaki (JP); Kazuho Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 15/475,561

(22) Filed: Mar. 31, 2017

(65) Prior Publication Data

US 2017/0285684 A1   Oct. 5, 2017

(30) Foreign Application Priority Data

Apr. 1, 2016   (JP) .................................. 2016-074753
Feb. 16, 2017   (JP) .................................. 2017-026579

(51) Int. Cl.
*G06F 1/00*   (2006.01)
*G06F 1/14*   (2006.01)
*G06F 1/10*   (2006.01)

(52) U.S. Cl.
CPC . *G06F 1/14* (2013.01); *G06F 1/10* (2013.01)

(58) Field of Classification Search
CPC ........................................................ G06F 1/14
See application file for complete search history.

(56) References Cited

U.S. PATENT DOCUMENTS

| 9,396,146 | B1* | 7/2016 | Sutardja | G06F 13/3625 |
| 2005/0135404 | A1* | 6/2005 | Zumsteg | H04L 12/43 370/442 |
| 2008/0243950 | A1* | 10/2008 | Webman | G06F 11/14 |
| 2008/0243952 | A1* | 10/2008 | Webman | G06F 11/2097 |
| 2012/0131378 | A1* | 5/2012 | Jiang | H04L 69/14 714/4.11 |
| 2017/0351294 | A1* | 12/2017 | Lovett | G06F 1/12 |

FOREIGN PATENT DOCUMENTS

| JP | 8-256161 | 10/1996 |
| JP | 2007-27985 | 2/2007 |
| JP | 2007-163330 | 6/2007 |
| JP | 2007-258800 | 10/2007 |
| JP | 2010-164346 | 7/2010 |

* cited by examiner

*Primary Examiner* — Mohammed H Rehman
(74) *Attorney, Agent, or Firm* — Oblon, McClelland, Maier & Neustadt, L.L.P.

(57) ABSTRACT

An information processing device including: a processor configured to: obtain external times that are measured at different time points in another device, measure of the information processing device in response to obtaining each of external times, and correct a first external time that is obtained in a first time period of a plurality of sequential time periods based on a rate of a change in the internal times from a second external time to a third external time, the second external time being an external time at which a time difference between a corrected time of an external time and an internal time is minimum in the second time period, the third external time being an external time at which a time difference between a corrected time of an external time and an internal time is minimum in the third time period.

11 Claims, 56 Drawing Sheets

FIG. 31

| FIRST CLOCK TIME | SECOND CLOCK TIME | ESTIMATED CLOCK TIME | MEASUREMENT DATA |
|---|---|---|---|
| tl[1] | ts[1] | te[1] | v[1] |
| tl[2] | ts[2] | te[2] | v[2] |
| tl[3] | ts[3] | te[3] | v[3] |
| ⋮ | ⋮ | ⋮ | ⋮ |

FIG. 32

| PERIOD TYPE ID | PERIOD LENGTH |
|---|---|
| 1 | T[1] |
| 2 | T[2] |
| 3 | T[3] |
| ⋮ | ⋮ |
| M | T[M] |

FIG. 33

| PERIOD TYPE ID | THE NUMBER OF TIMES OF APPROPRIATE PARAMETERS | THE NUMBER OF TIMES OF INAPPROPRIATE PARAMETERS |
| --- | --- | --- |
| 1 | $c[1]$ | $cu[1]$ |
| 2 | $c[2]$ | $cu[2]$ |
| 3 | $c[3]$ | $cu[3]$ |
| ⋮ | ⋮ | ⋮ |
| M | $c[M]$ | $cu[M]$ |

INFORMATION PROCESSING DEVICE, INFORMATION PROCESSING METHOD, AND COMPUTER READABLE STORAGE MEDIUM

CROSS-REFERENCE TO RELATED APPLICATION

This application is based upon and claims the benefit of priority of the prior Japanese Patent Application No. 2016-074753, filed on Apr. 1, 2016, and the prior Japanese Patent Application No. 2017-026579, filed on Feb. 16, 2017, the entire contents of which are incorporated herein by reference.

FIELD

The embodiment discussed herein is related to a technique for correcting a recording clock time given by external equipment.

BACKGROUND

In a wearable device including an acceleration sensor, for example, a timestamp is given to the value of the acceleration measured in the case of detecting the motion of a person. Furthermore, by a data collecting device, measurement messages given the timestamp are collected and the behavior of the person is estimated in some cases.

For example, in the case in which one person wears plural wearable devices and observation of coordination of arms and legs is attempted, it is difficult to correctly estimate the behavior if the timestamps given by the respective wearable devices do not match the same time clock basis.

In the case of attempting to make the timestamp given by the wearable device match the basis of a system time clock in the data collecting device, besides an error in a local clock of the wearable device, an error generated in the data collecting device also becomes an obstacle.

Examples of the related art are disclosed in Japanese Laid-open Patent Publications No. 2010-164346, No. 2007-027985, and No. 2007-258800.

SUMMARY

According to an aspect of the embodiment, an information processing device includes a memory, and a processor coupled to the memory and configured to: obtain a plurality of external times that are measured at different time points in another device and reported from the other device in order, measure a plurality of internal times of the information processing device in response to obtaining each of the plurality of external times, and correct a first external time that is obtained in a first time period of a plurality of sequential time periods based on a rate of a change in the plurality of internal times from a second external time to a third external time, the second external time being an external time at which a time difference between a corrected time of an external time obtained in a second time period and an internal time measured in response to obtaining the external time in the second time period is minimum in the second time period, the third external time being an external time at which a time difference between a corrected time of an external time obtained in a third time period and an internal time measured in response to obtaining the external time in the third time period is minimum in the third time period, each of the second time period and the third time period being one of the plurality of the sequential time periods, the second time period being prior to the third time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 31 is a diagram illustrating an example of a clock time table;

FIG. 32 is a diagram illustrating an example of a period type table;

FIG. 33 is a diagram illustrating an example of a number-of-times table;

DESCRIPTION OF EMBODIMENT

In one aspect, an object of the embodiment discussed herein is to alter a recording clock time given by external equipment into an estimated clock time of the own time clock basis more correctly.

[Embodiment 1]

External equipment 101 is a device that is mounted on an arm or leg of a user, for example, and detects the acceleration. The hardware of the external equipment 101 is based on an existing technique. The external equipment 101 includes simple clock (clock counter), processor, memory, sensor, and so forth.

Figure 1:
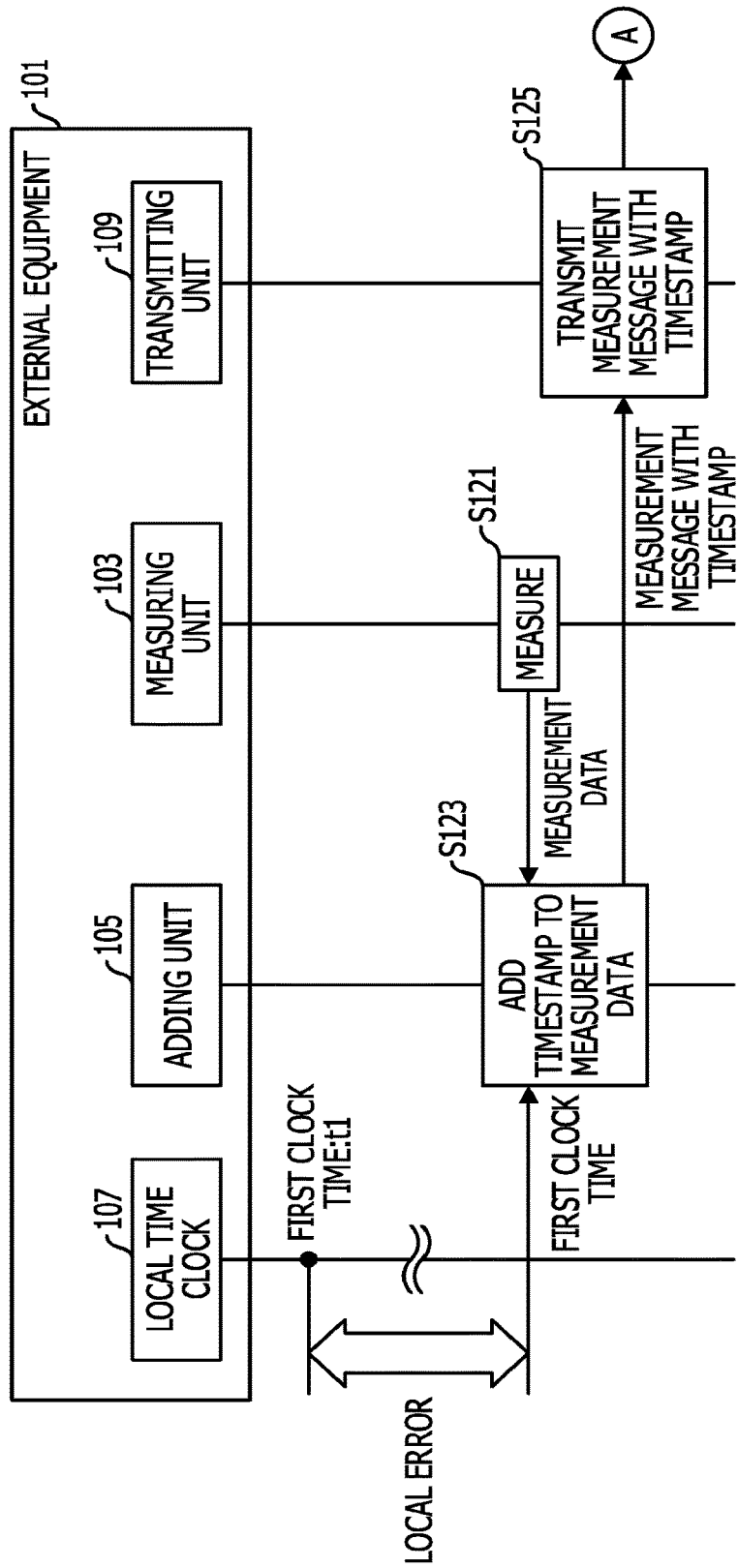
FIG. 1 is a diagram illustrating a sequence example in external equipment.

In FIG. 1, a sequence example in the external equipment 101 is illustrated. The external equipment 101 includes a measuring unit 103, an adding unit 105, a local time clock 107, and a transmitting unit 109. In this example, it is assumed that a cheap reference oscillator is used for the local time clock 107 and therefore the accuracy of the local time clock 107 is not necessarily high. For example, advance/delay of the clock time due to a frequency deviation of a quartz crystal oscillator occurs and such a frequency deviation of the oscillator suffers from influence of the temperature and the internal voltage and varies. Furthermore, a clock time error due to accumulation of advance/delay of the clock time and a clock time error due to the absence of a function of carrying out clock time adjustment at the time of equipment activation occur.

The measuring unit 103 carries out measurement by using an acceleration sensor, for example (S121). When obtaining the measurement data, the adding unit 105 acquires a first clock time (represented by parameter tl) from the local time clock 107. Then, the adding unit 105 adds a timestamp (first clock time) to the measurement data (S123). As described above, the first clock time includes a local error and thus does not necessarily indicate the correct measurement clock time.

The transmitting unit 109 transmits a measurement message with the timestamp to a data collecting device 201 (S125). In this example, it is assumed that the message is transmitted by using a short-distance radio measure. In this example, it is assumed that fixed delay associated with communications (minimum delay that occurs even when the communication environment and the operating state of equipment are ideal) may be ignored or be uniformly corrected. Furthermore, variable delay associated with communications may be treated in such a manner as to be included in retention delay to be described later.

Figure 2:
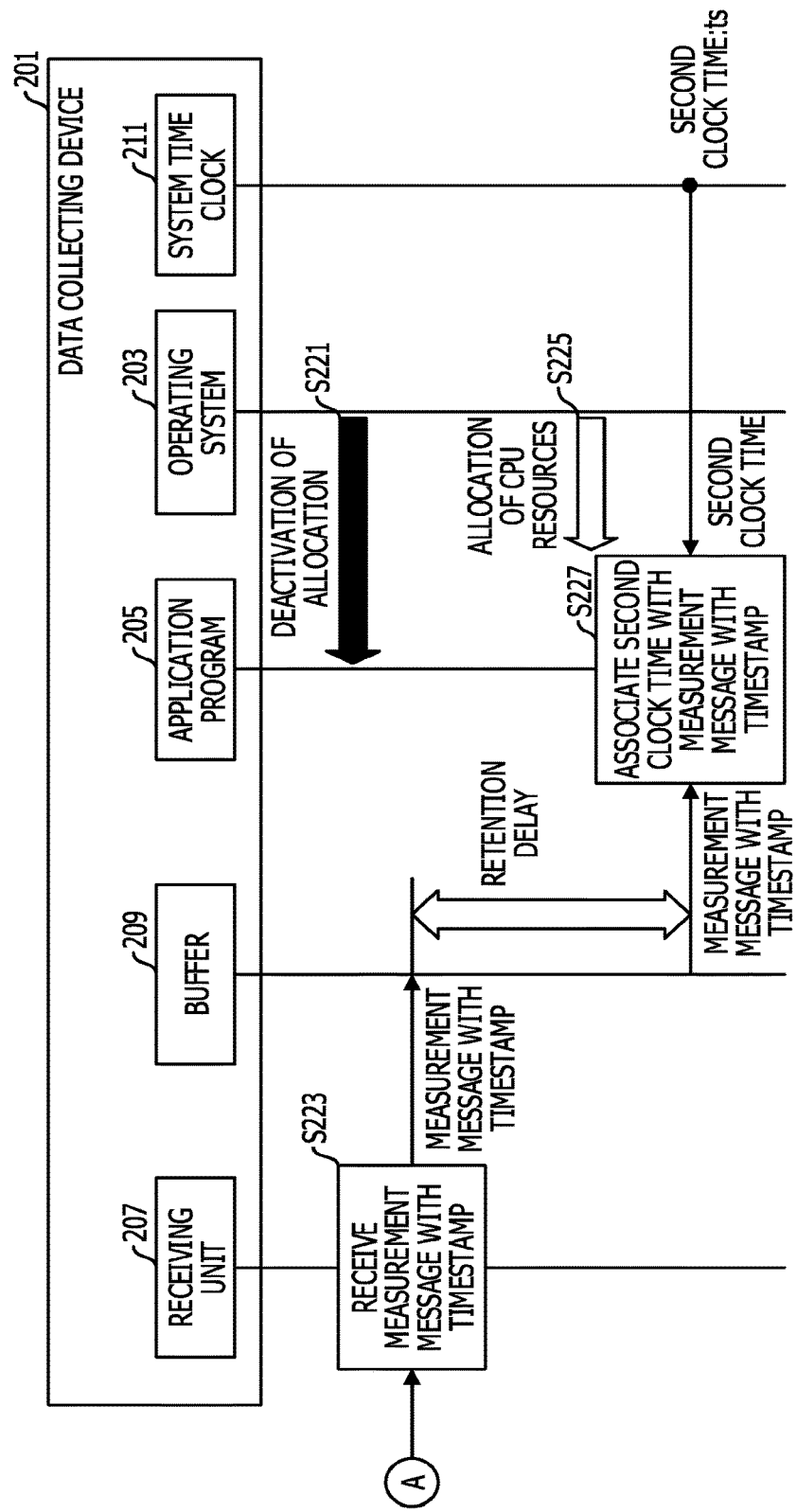
FIG. 2 is a diagram illustrating a sequence example in a data collecting device.

In FIG. 2, a sequence example in the data collecting device 201 is illustrated. The data collecting device 201 is a computer like a notebook personal computer, for example. The data collecting device 201 may be a portable device such as a smartphone. The data collecting device 201 includes an operating system 203, an application program 205, a receiving unit 207, a buffer 209, and a system time clock 211. It is assumed that the system time clock 211 has high accuracy and a second clock time (represented by parameter ts) indicated by the system time clock 211 corresponds with the absolute clock time. However, the accuracy of the system time clock 211 may be low if pieces of data of plural pieces of external equipment 101 are collected by one data collecting device 201 and only clock time synchronization among these pieces of data is intended.

The operating system 203 has deactivated allocation of central processing unit (CPU) resources to the application program 205 (S221). When the receiving unit 207 receives a measurement message with a timestamp in this state (S223), the measurement message with a timestamp is stored in the buffer 209.

Because CPU resources are not allocated to the application program 205, the application program 205 can not read the measurement message with a timestamp. Thereafter, when the operating system 203 allocates CPU resources to the application program 205 (S225), the application program 205 reads the measurement message with a timestamp from the buffer 209. The application program 205 further acquires a second clock time from the system time clock 211 and associates the second clock time with the measurement message with a timestamp (S227). The time from the storing of the measurement message with a timestamp in the buffer 209 to the reading of the measurement message with a timestamp and the associating the second clock time by the application program 205 is equivalent to retention delay.

Figure 3:
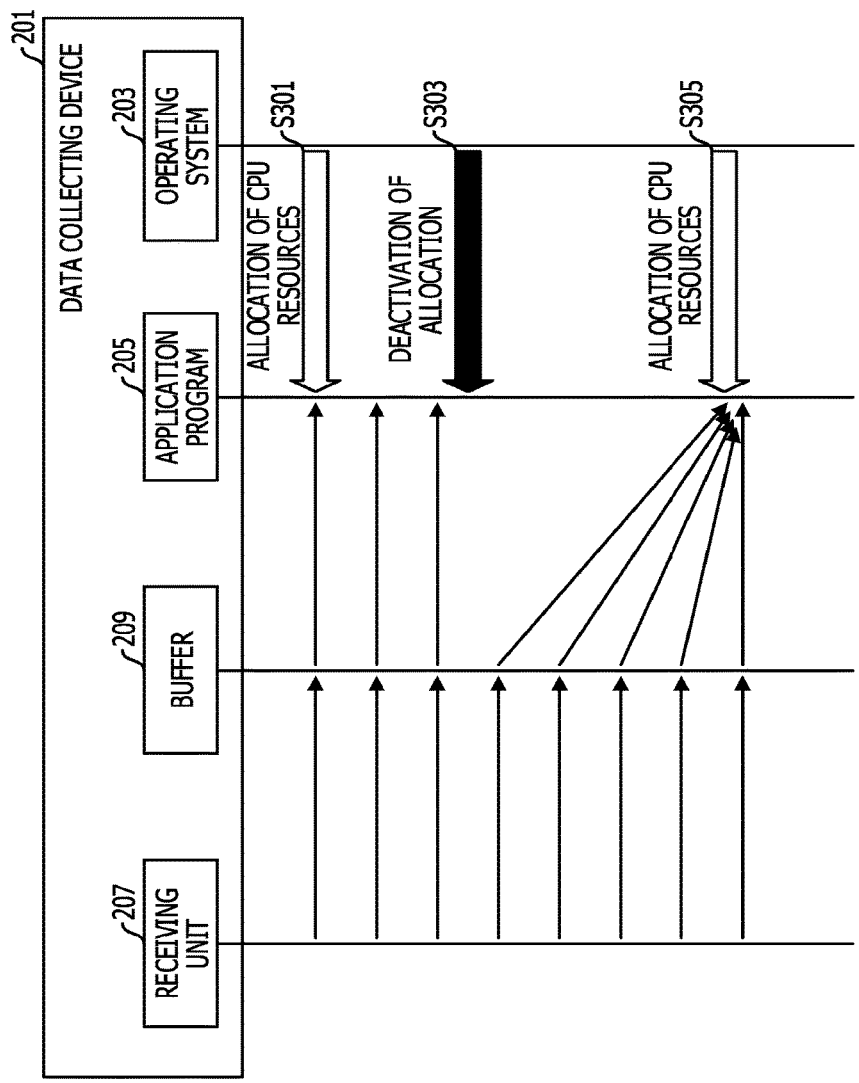
FIG. 3 is a time chart relating to reading of measurement messages with a timestamp.

A supplementary description will be made about the retention delay. In FIG. 3, a time chart relating to reading of measurement messages with a timestamp is illustrated. Measurement messages with a timestamp stored in the buffer 209 are immediately read by the application program 205 in the period from allocation of CPU resources (S301) to deactivation of the allocation (S303). Thus, if opportunities for allocation of CPU resources and opportunities for reception of a measurement message with a timestamp sufficiently exist, opportunities in which the retention delay is sufficiently small are obtained because a correlation does not exist between both opportunities. On the other hand, measurement messages with a timestamp stored in the buffer 209 in the state in which CPU resources are not allocated remain retained. Then, the measurement messages are concurrently read at a timing when CPU resources are allocated to the application program 205 (S305). As above, the retention delay is not uniform.

Figure 4:
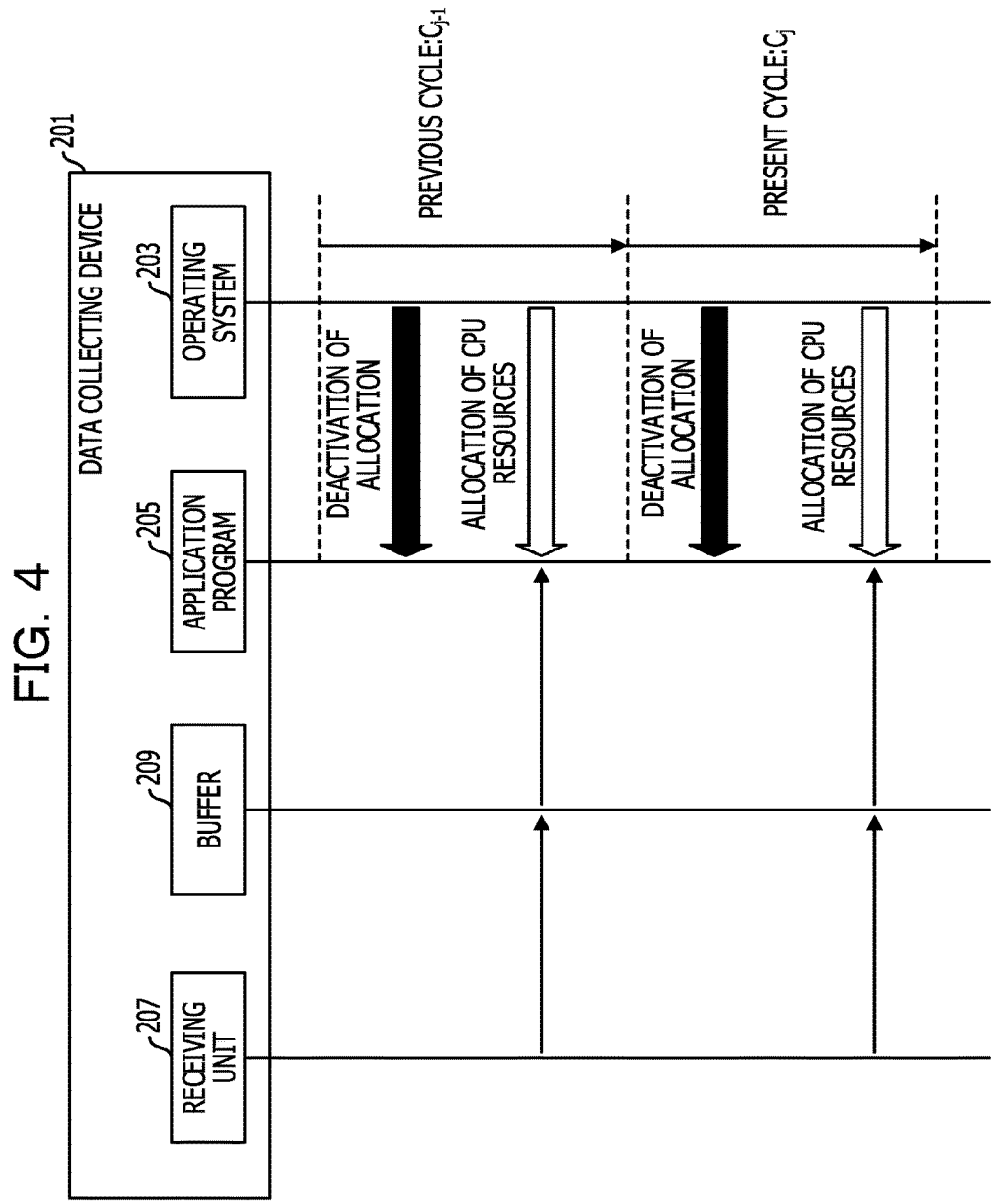
FIG. 4 is a diagram illustrating an example of a cycle.

In the present embodiment, processing is executed with a cycle set. In FIG. 4, an example of a cycle is illustrated. CPU resources are allocated at least one time immediately after a measurement message with a timestamp is received in each cycle, and the length of the cycle (represented by parameter T) is set in such a manner that variation in the temperature and internal voltage of the external equipment 101 can be deemed to be minute in the period. Hereinafter, the cycle as the processing subject will be referred to as the present cycle and be represented by symbol $C_j$. Furthermore, the cycle immediately before the present cycle will be referred to as the previous cycle and be represented by symbol $C_{j-1}$.

Figure 5:
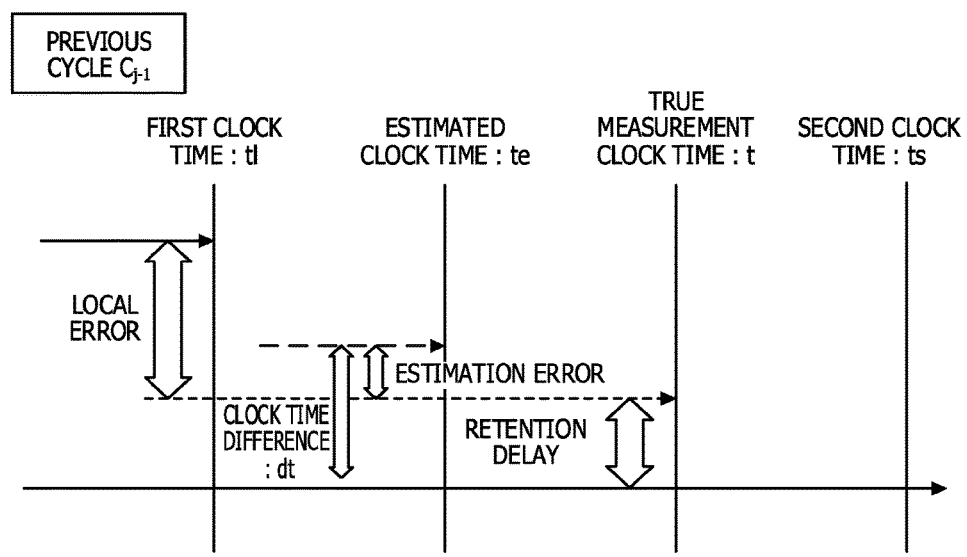
FIG. 5 is a diagram illustrating a relationship among respective clock times.

In FIG. 5, a relationship among respective clock times is illustrated. From the left side, the first clock time, an estimated clock time (represented by parameter te), a true measurement clock time (represented by parameter t), and the second clock time are represented sequentially. The time elapses toward the lower side in FIG. 5. The true measurement clock time is a clock time obtained by removing a local error included in the first clock time and altering the first clock time according to the basis of the data collecting device 201. The estimated clock time is a clock time obtained by estimation of the true measurement clock time by the application program 205 based on the first clock time and the second clock time. Furthermore, the difference between the estimated clock time and the true measurement clock time is referred to as an estimation error. The initial estimated clock time is not necessarily close to the true measurement clock time.

In the present embodiment, the estimation error is caused to come closer to 0 in the process of repeating a step of calculating the estimated clock time. In this step, the clock time difference (represented by parameter dt) between the estimated clock time and the second clock time is calculated.

Figure 6:
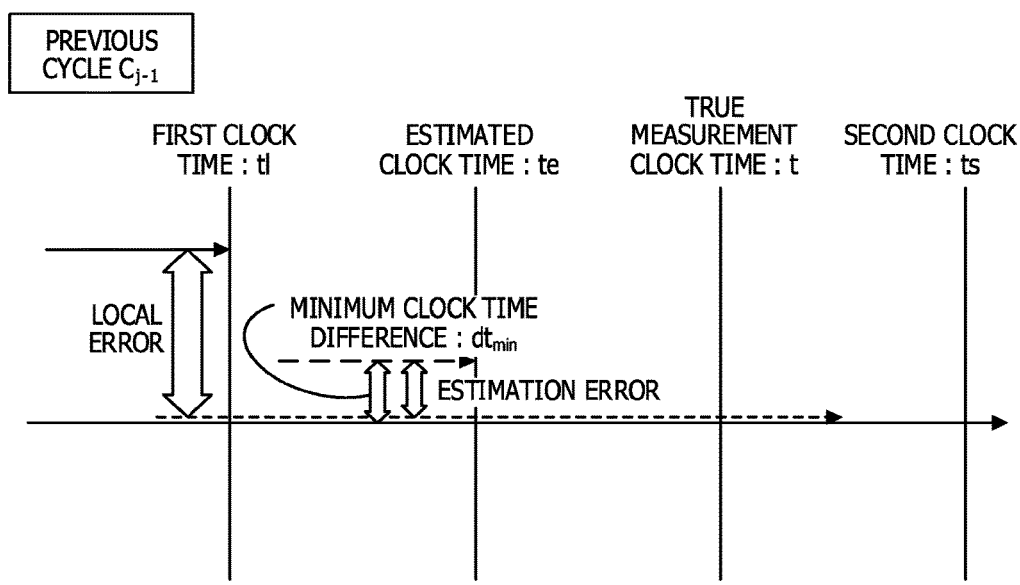
FIG. 6 is a diagram illustrating a minimum clock time difference.

In FIG. 6, an example when retention delay does not exist is illustrated. If the retention delay does not exist, the clock time difference is equivalent to the estimation error. Furthermore, the clock time difference at this time indicates the minimum value among the clock time differences calculated in the relevant cycle (in this example, previous cycle $C_{j-1}$, for convenience of explanation). Therefore, identifying the minimum clock time difference (represented by parameter $dt_{min}$) in the cycle is equivalent to obtaining the estimation error at the moment.

Figure 7:
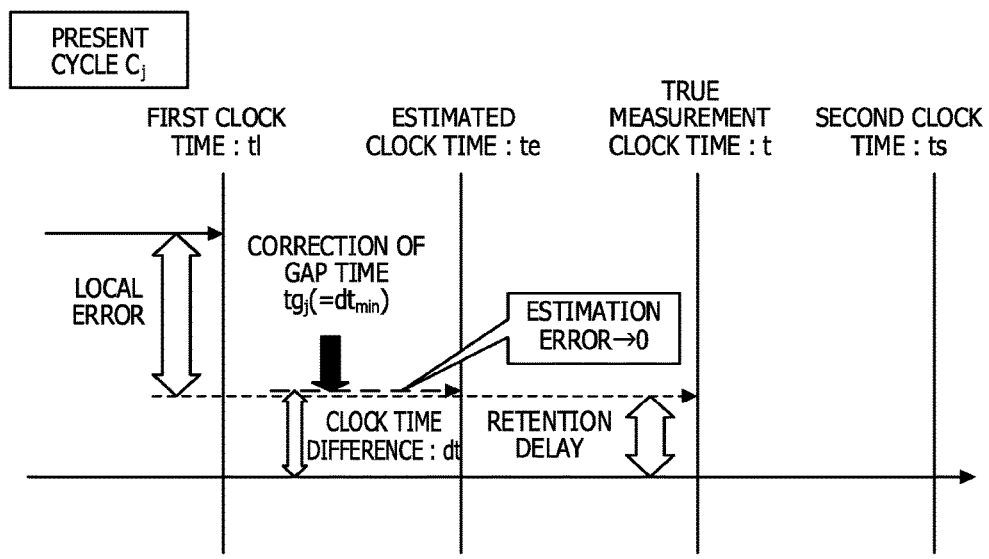
FIG. 7 is a diagram for explaining correction of a gap time.

Based on the assumption that the cycle has shifted from the previous cycle $C_{j-1}$ represented in FIG. 5 and FIG. 6 to the present cycle $C_j$, correction of a gap time will be described by using FIG. 7. The minimum clock time difference of the previous cycle $C_{j-1}$ is identified at the timing of the shift to the present cycle $C_j$. Here, if a supposition that the frequency deviation of the local time clock is 0 (or same as a frequency deviation of system clock) in the previous cycle $C_{j-1}$ and the present cycle $C_j$ is made, the identified minimum clock time difference is substantially equal also to the gap time in the present cycle $C_j$ and therefore the minimum clock time difference of the previous cycle $C_{j-1}$ is defined as the gap time (represented by parameter $tg_j$) used in the present cycle $C_j$. Furthermore, when the estimated clock time is calculated in the present cycle $C_j$, correction for removing the gap time is carried out. If this is done, the estimation error becomes almost 0 as long as under the above-described supposition. Although the frequency deviation of the local time clock is not 0 actually, it becomes possible to deem that the above-described supposition holds by repeating correction of the change rate of the local error to be described later and this process. Furthermore, the gap time $tg_j$ represented in FIG. 7 is assumed to be a negative value.

Figure 8:
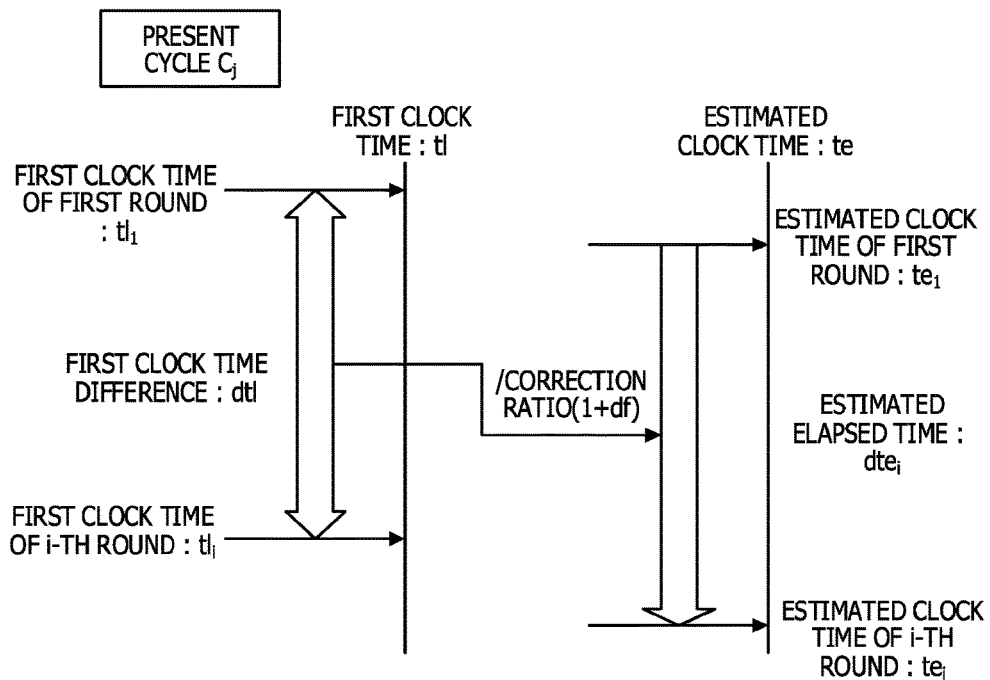
FIG. 8 is a diagram for explaining an estimated elapsed time.

The error identified in the previous cycle $C_{j-1}$ is removed as described above. On the other hand, due to the frequency deviation of the local time clock, the local error often expands or contracts at a certain ratio over time. In the present embodiment, correction is carried out also regarding such a change in the error. The change rate of the change in the frequency deviation of the lock time clock, for example, in this error, varies depending on the temperature and internal voltage of the external equipment 101. However, this variation is sluggish and the length T of the period is set sufficiently short with respective to this variation rate. Thus, the influence is minute in this process. As illustrated in FIG. 8, the estimated clock time of the i-th round is obtained by adding an estimated elapsed time of the i-th round (represented by parameter $dte_i$) in the present cycle $C_j$ to the estimated clock time of the first round (represented by parameter $te_1$) in the present cycle $C_j$.

The estimated elapsed time of the i-th round is obtained by dividing a first clock time difference (represented by parameter dtl) between the first clock time of the i-th round and the first clock time of the first round in the present cycle $C_j$ by a correction ratio (1+df). 1/(1+df) is the change rate of the local error, and df is the frequency deviation of the local time clock.

Figure 9:
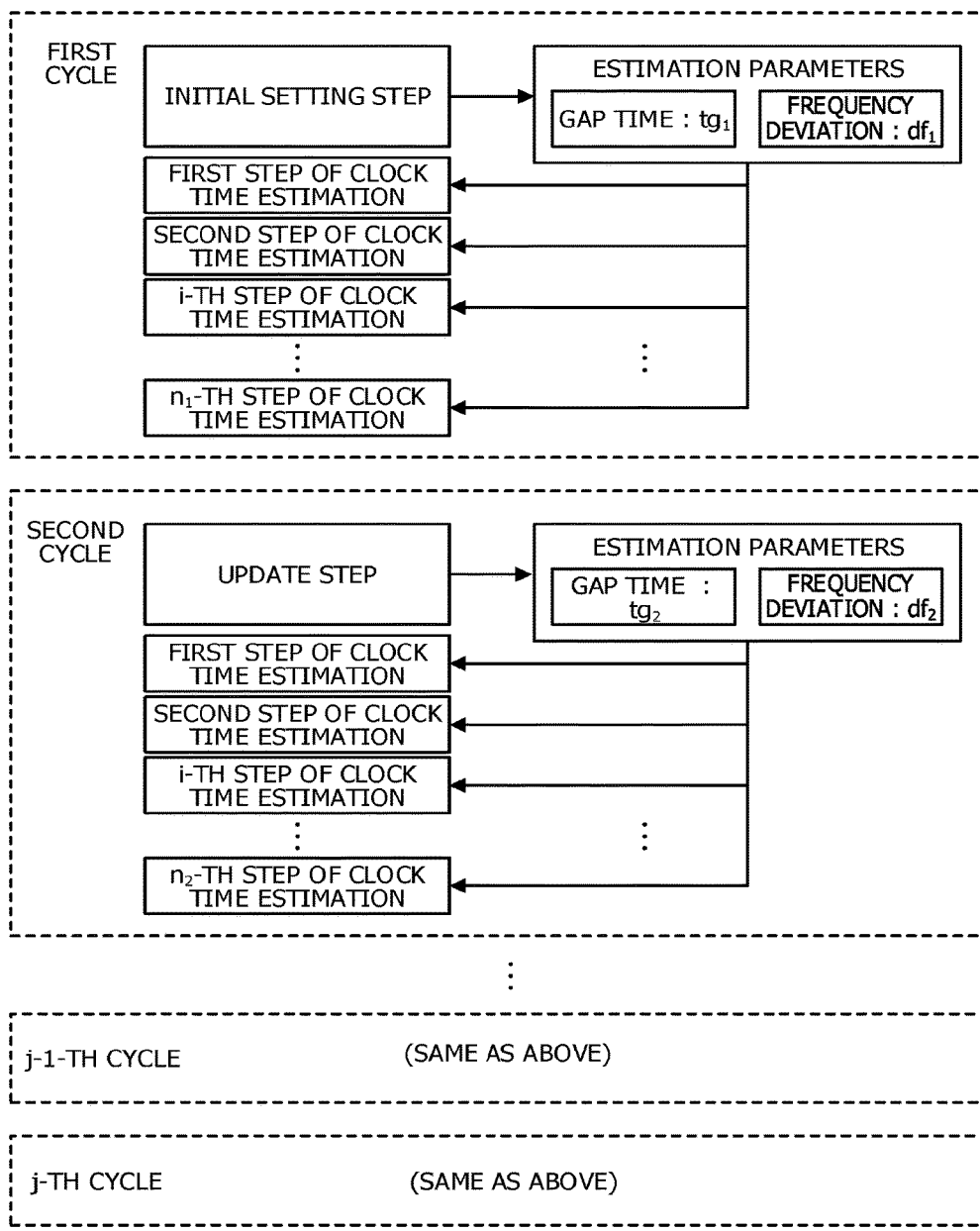
FIG. 9 is a diagram illustrating steps of operation in a data collecting device.

In FIG. 9, steps of operation in the data collecting device 201 are illustrated. In an initial setting step of the first cycle, the gap time ($tg_1$) and the frequency deviation ($df_1$) are tentatively set. In this example, the gap time ($tg_1$) and the frequency deviation ($df_1$) are used in $n_1$ times of clock time estimation of the first cycle.

In an update step of the second cycle, the gap time ($tg_2$) and the frequency deviation ($df_2$) are updated with a reflection of the calculation result in the first cycle. In this example, the gap time ($tg_2$) and the frequency deviation ($df_2$) are used in $n_2$ times of clock time estimation of the second cycle. If the error in the gap time ($tg_1$) and the frequency deviation ($df_1$) that are tentatively set and are used in the first cycle is expected to be large, $df_1$ used in the first cycle may be directly used as the frequency deviation used in the second cycle and the update of the frequency deviation may be carried out from the third cycle.

Furthermore, also in the third and subsequent cycles, operation is carried out with similar steps to the case of the second cycle. The contents of processing partly differ between the first step of clock time estimation and the second and subsequent steps of clock time estimation.

Figure 10:
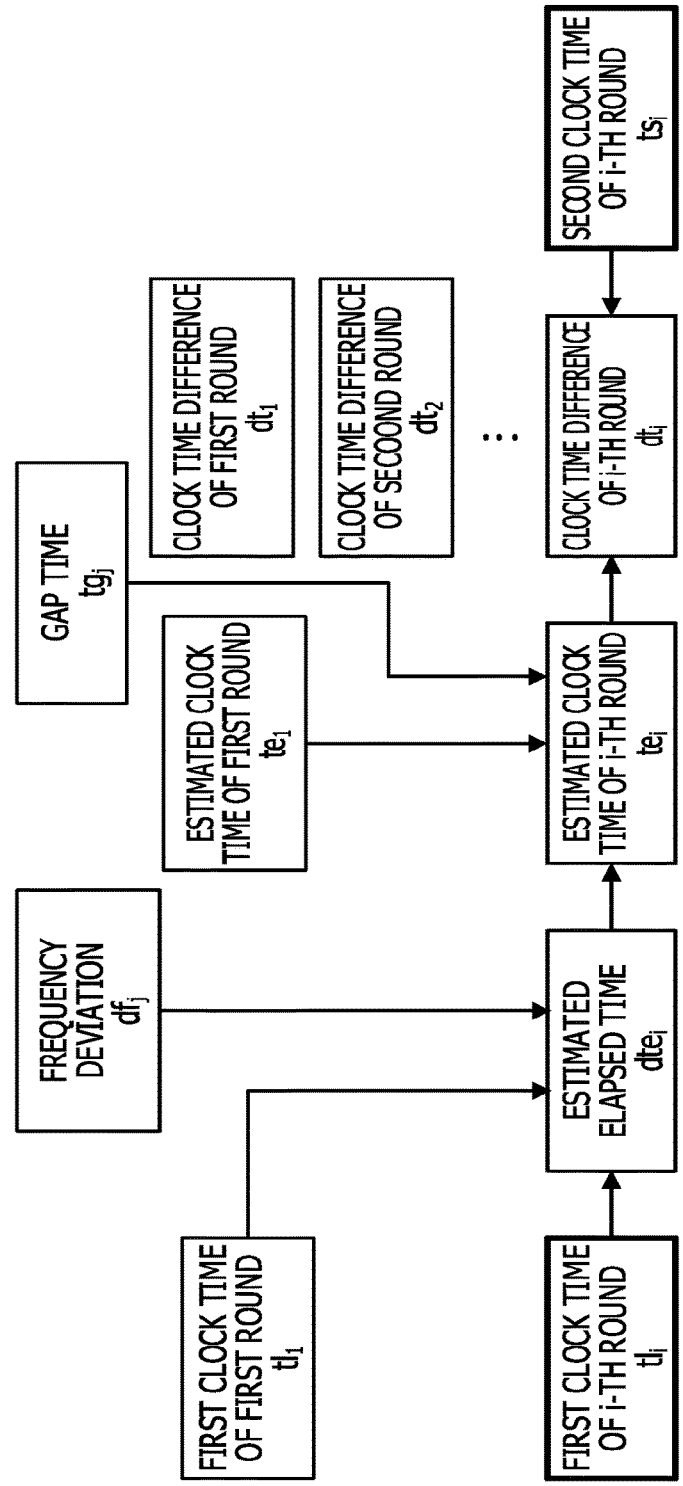
FIG. 10 is a diagram illustrating an outline of second and subsequent steps of clock time estimation.

Subsequently, the outline of each step will be described. For convenience, first an outline of second and subsequent steps of clock time estimation will be represented by using FIG. 10. As described by using FIG. 8, the estimated elapsed time $dte_i$ of the i-th round is obtained in accordance with an expression of the estimated elapsed time $dte_i$ of the i-th round=(the first clock time $tl_i$ of the i-th round–the first clock time $tl_1$ of the first round)/(1+the frequency deviation $df_j$).

Then, the estimated clock time $te_i$ of the i-th round is obtained in accordance with an expression of the estimated clock time $te_i$ of the i-th round=the estimated clock time $te_1$ of the first round+the estimated elapsed time $dte_i$ of the i-th round–the gap time $tg_j$.

Moreover, the second clock time $ts_i$ of the i-th round is subtracted from the estimated clock time $te_i$ of the i-th round to obtain the clock time difference $dt_i$ of the i-th round. The clock time difference $dt_i$ of the i-th round is compared with the candidate for the minimum clock time difference in the i–1-th round and the smaller clock time difference is held as the candidate for the minimum clock time difference. For example, the minimum clock time difference among the clock time differences dt of the first round to the i-th round is held.

Figure 11:
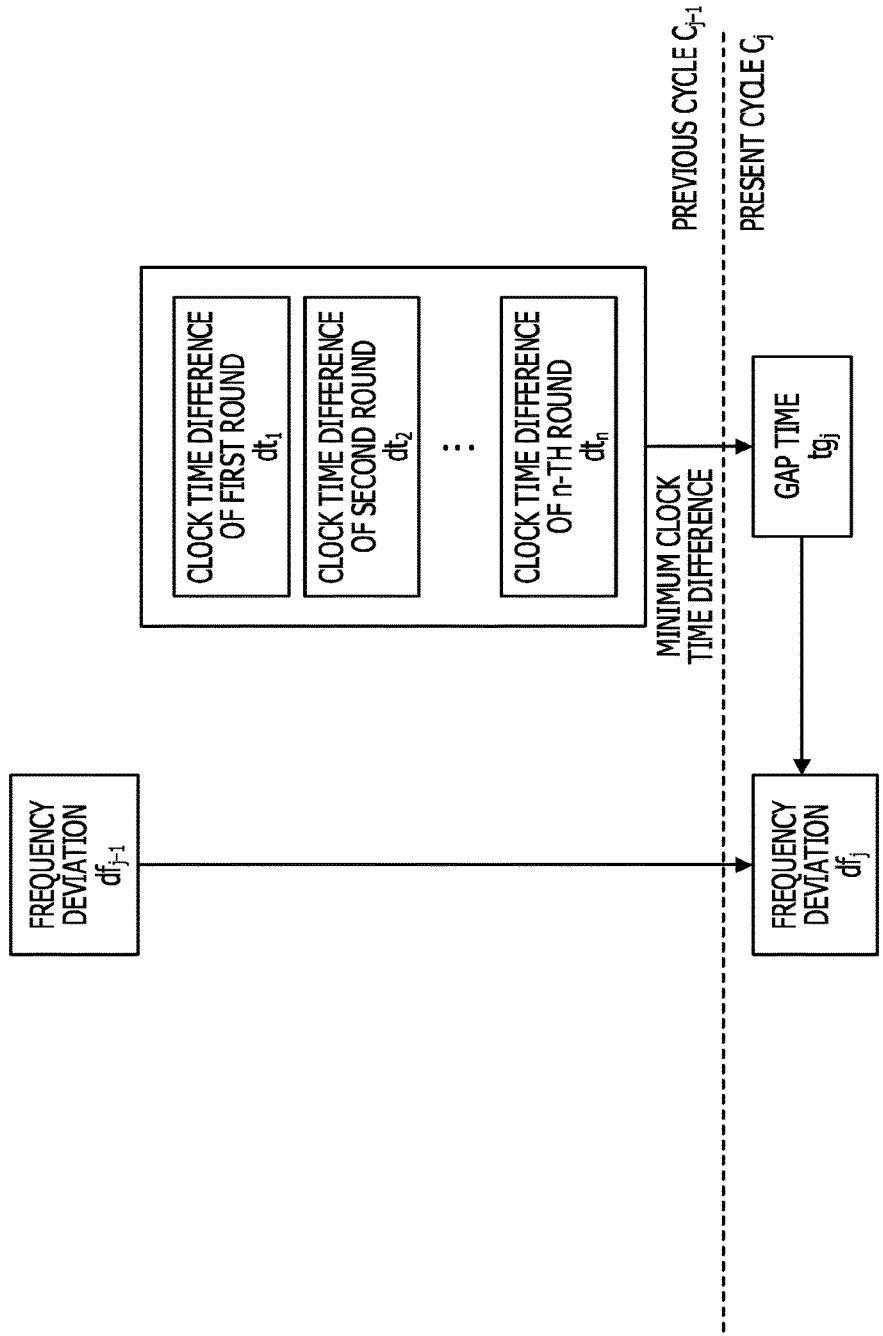
FIG. 11 is a diagram illustrating an outline of an update step.

In FIG. 11, an outline of an update step is illustrated. The upper side relative to a dashed line represents the calculation result in the previous cycle $C_{j-1}$. The lower side relative to the dashed line represents the calculation result in the present cycle $C_j$.

First, the candidate for the minimum clock time difference that is determined in each step of the previous cycle $C_{j-1}$ and is held is settled as the minimum clock time difference $dt_{min}$ at the time of the update step. This is substantially equal to the minimum clock time difference among the clock time differences $dt_1$ to $dt_n$ obtained in the previous cycle $C_{j-1}$. Then, this minimum clock time difference $dt_{min}$ is set as the gap time $tg_j$ used in the present cycle $C_j$.

Furthermore, the frequency deviation $df_j$ in the present cycle $C_j$ is obtained in accordance with the following expression (1).

[Expression 1]
$$df_j = \frac{df_{j-1} - tg_j/T}{1 + tg_j/T} \quad (1)$$

$df_{j-1}$ is the frequency deviation in the previous cycle $C_{j-1}$. $tg_j$ is the gap time used in the present cycle $C_j$. T is the length of the cycle. Here, the second clock time when the minimum clock time difference $dt_{min}$ is obtained may be held as a minimum time difference occurrence clock time $t_{min\_j}$ and a value of the following expression (2) may be used instead of T in the expression (1) by using $t_{min\_j}$ in the present cycle $C_j$ and $t_{min\_j-1}$ in the previous cycle $C_{j-1}$.

$$t_{min\_j} - t_{min\_j-1} \quad (2)$$

Description will be made about the derivation of this expression (1). It is assumed that the gap time $tg_j$ is generated due to an error included in the frequency deviation $df_{j-1}$ in the previous cycle $C_{j-1}$ or change in the frequency deviation df. When the gap time $tg_j$ is deemed to be generated in the period of the length T of the cycle, the expansion/contraction rate of the measurement time in the local time clock is represented by $(T+tg_j)/T$. Furthermore, the reciprocal $T/(T+tg_j)$ of the expansion/contraction rate corresponds with the change rate of the frequency. Here, because the change rate of the frequency can be represented as $(1+df_j)/(1+df_{j-1})$ by using the frequency deviation, the above-described expression is derived from an equation $(1+df_j)/(1+df_{j-1})=T/(T+tg_j)$.

Figure 12:
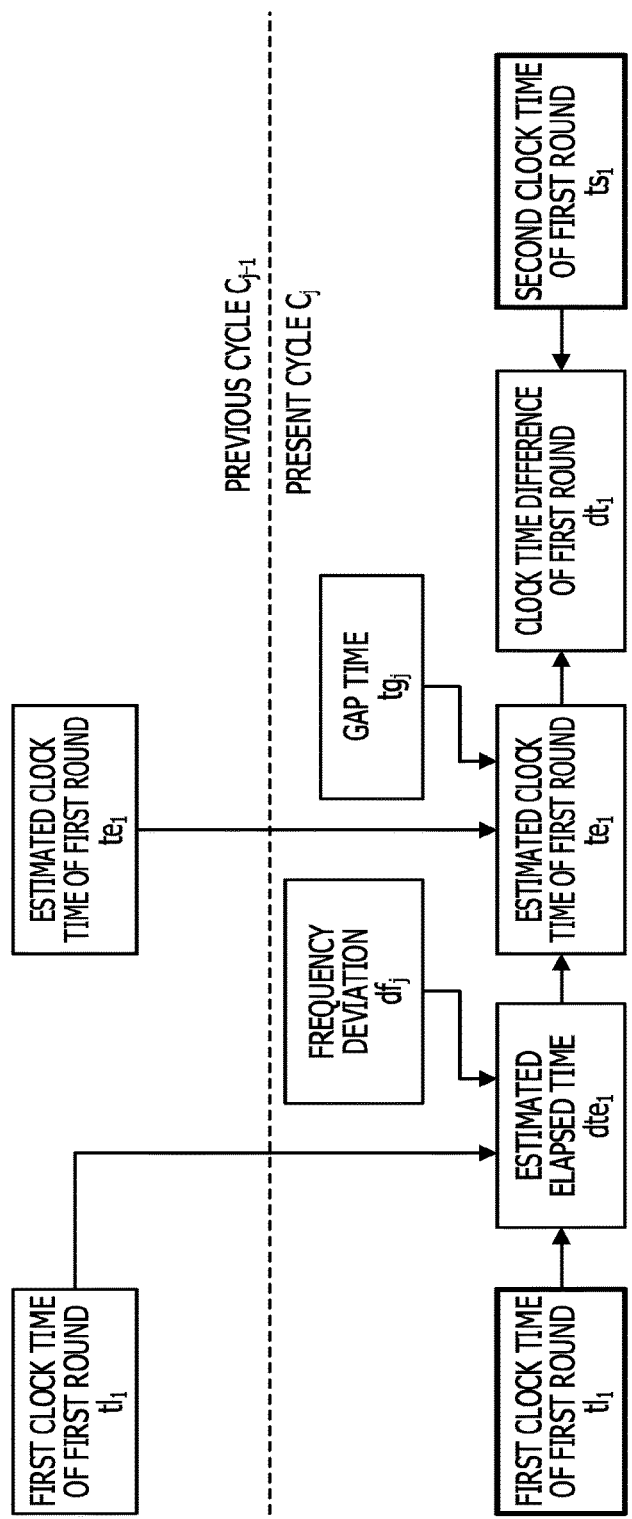
FIG. 12 is a diagram illustrating an outline of a first step of a clock time estimation.

In FIG. 12, the outline of a first step of clock time estimation is illustrated. The upper side relative to a dashed line represents the calculation result in the previous cycle $C_{j-1}$. The lower side relative to the dashed line represents the calculation result in the present cycle $C_j$.

An estimated elapsed time $dte_1$ of the first round is obtained in accordance with an expression of the estimated elapsed time $dte_1$ of the first round=(the first clock time $tl_1$ of the first round in the present cycle $C_j$—the first clock time $tl_1$ of the first round in the previous cycle $C_{j-1}$)/(1+the frequency deviation $df_j$ in the present cycle $C_j$). Here, instead of the first clock time $tl_1$ of the first round in the previous cycle $C_{j-1}$, the first clock time when the minimum clock time difference $dt_{min}$ in the previous cycle $C_{j-1}$ is obtained may be held and used.

Then, the estimated clock time $te_1$ of the first round in the present cycle $C_j$ is obtained in accordance with an expression of the estimated clock time $te_1$ of the first round in the present cycle $C_j$=the estimated clock time $te_1$ of the first round in the previous cycle $C_{j-1}$+the estimated elapsed time $dte_1$ of the first round in the present cycle $C_j$–the gap time $tg_j$ used in the present cycle $C_j$. Here, instead of the estimated clock time $te_1$ of the first round in the previous cycle $C_{j-1}$, the minimum time difference occurrence clock time $t_{min\_j-1}$ in the previous cycle $C_{j-1}$ may be used.

Moreover, the second clock time $ts_1$ of the first round is subtracted from the estimated clock time $te_1$ of the first round in the present cycle $C_j$ to obtain the clock time difference $dt_1$ of the first round. The first clock time of the first round or the first clock time when the minimum clock time difference $dt_{min}$ is obtained and the estimated clock time of the first round or the minimum time difference occurrence clock time in the present cycle $C_j$ are held at least until the update step in the next cycle. This is the end of the description of the outline relating to the present embodiment.

Figure 13:
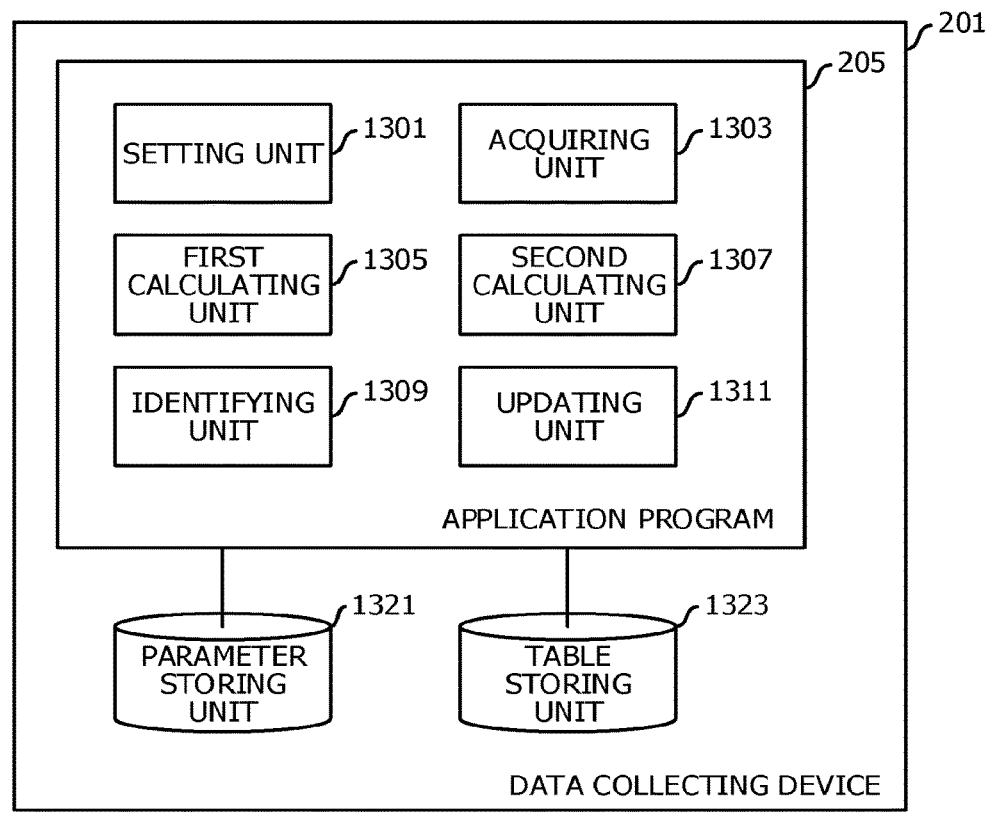
FIG. 13 is a diagram illustrating a module configuration example of a data collecting device.

In FIG. 13, a module configuration example of the data collecting device 201 is illustrated. The operating system 203, the receiving unit 207, the buffer 209, and the system time clock 211 described by referring to FIG. 2 are omitted.

The application program 205 includes programs for implementing a setting unit 1301, an acquiring unit 1303, a first calculating unit 1305, a second calculating unit 1307, an identifying unit 1309, and an updating unit 1311. In FIG. 13, the programs for implementing the respective units are represented as the respective units. Each unit is implemented by execution of the program for the unit by a processor. The data collecting device 201 further includes a parameter storing unit 1321 and a table storing unit 1323. The parameter storing unit 1321 stores the above-described respective parameters. The table storing unit 1323 stores a table that associates the first clock time, the second clock time, the estimated clock time, and measurement data. However, the first clock time and the second clock time may be omitted.

Figure 14:
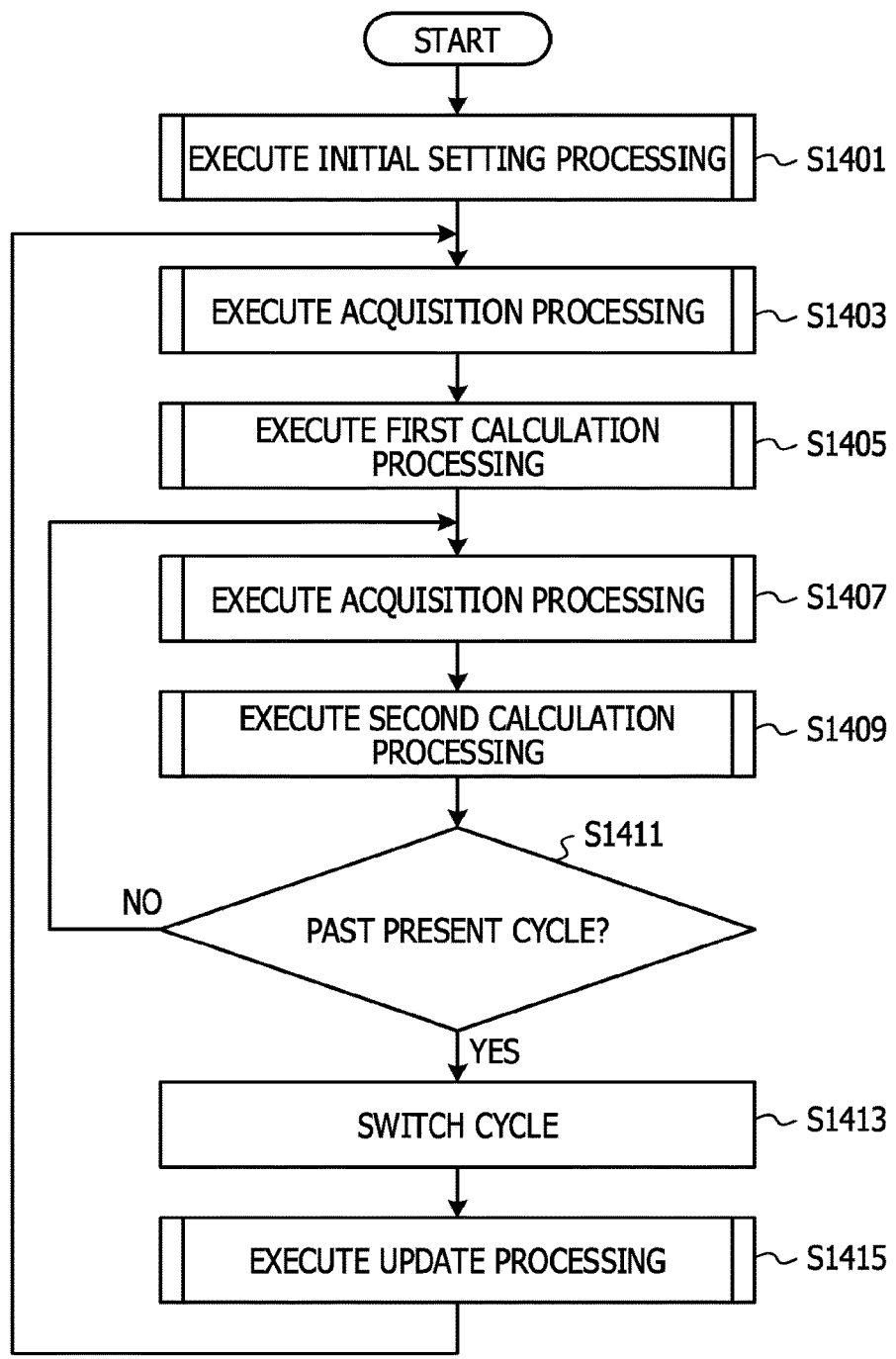
FIG. 14 is a diagram illustrating a flow of main processing (A)

In FIG. 14, a flow of main processing (A) is illustrated. The first setting unit 1301 executes first initial setting processing (S1401). The first initial setting processing is equivalent to the initial setting step. Details of the first initial setting processing will be described later by using FIG. 15.

The acquiring unit 1303 executes acquisition processing (S1403). In the acquisition processing, the first clock time and the second clock time are acquired. Details of the acquisition processing will be described later by using FIG. 16.

The first calculating unit 1305 and the second calculating unit 1307 execute first calculation processing (S1405). The first calculation processing is equivalent to the first step of clock time estimation. Details of the first calculation processing will be described later by using FIG. 17.

The first acquiring unit 1303 executes acquisition processing (S1407). The acquisition processing in S1407 is similar to the case of S1403.

The first calculating unit 1305 and the second calculating unit 1307 execute second calculation processing (S1409). The second calculation processing is equivalent to the second or subsequent steps of clock time estimation. Details of the second calculation processing will be described later by using FIG. 18.

The updating unit 1311 determines whether or not the second clock time has gotten past the present cycle $C_j$ (S1411). If the updating unit 1311 determines that the second clock time has not gotten past the present cycle $C_j$, return to the processing represented in S1407 is made and the above-described processing is repeated. In the determination of S1411, the estimated clock time may be used instead of the second clock time.

On the other hand, if determining that the second clock time has gotten past the present cycle $C_j$, the updating unit 1311 switches the cycle (S1413). Then, the identifying unit 1309 and the updating unit 1311 execute update processing (S1415). The update processing is equivalent to the update step. Details of the update processing will be described later by using FIG. 19.

Upon the end of the update processing, return to the processing represented in S1403 is made and the above-described processing is repeated.

Figure 15:
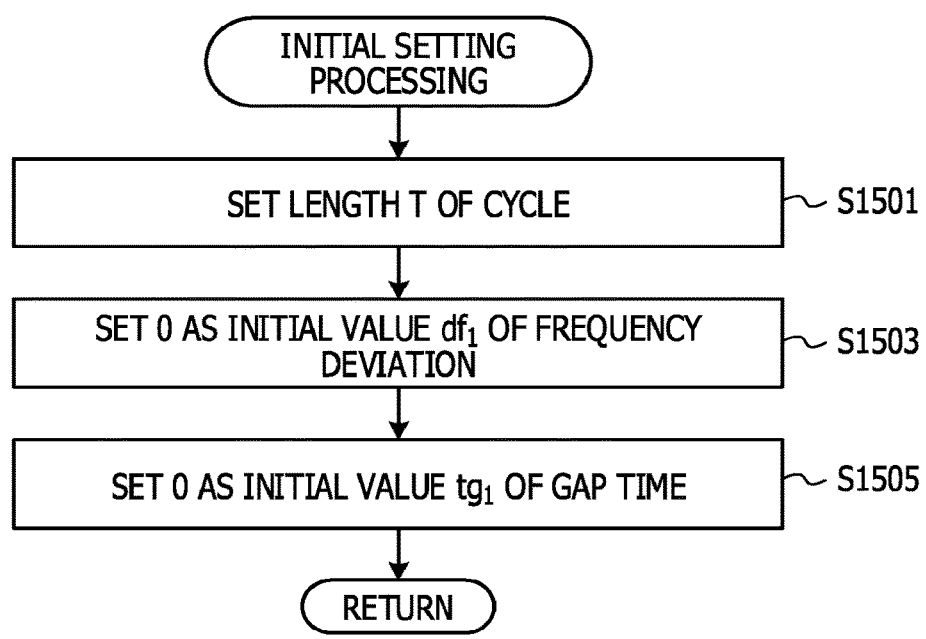
FIG. 15 is a diagram illustrating a flow of first initial setting processing.

In FIG. 15, a flow of the first initial setting processing is illustrated. The first setting unit 1301 sets the length T of the cycle (S1501). For example, the length T of the cycle may be a given value or may be set by user operation.

The first setting unit 1301 sets 0 as the initial value $df_1$ of the frequency deviation (S1503). Moreover, the first setting unit 1301 sets 0 as the initial value $tg_1$ of the gap time (S1505). Then, return to the main processing (A) is made.

Figure 16:
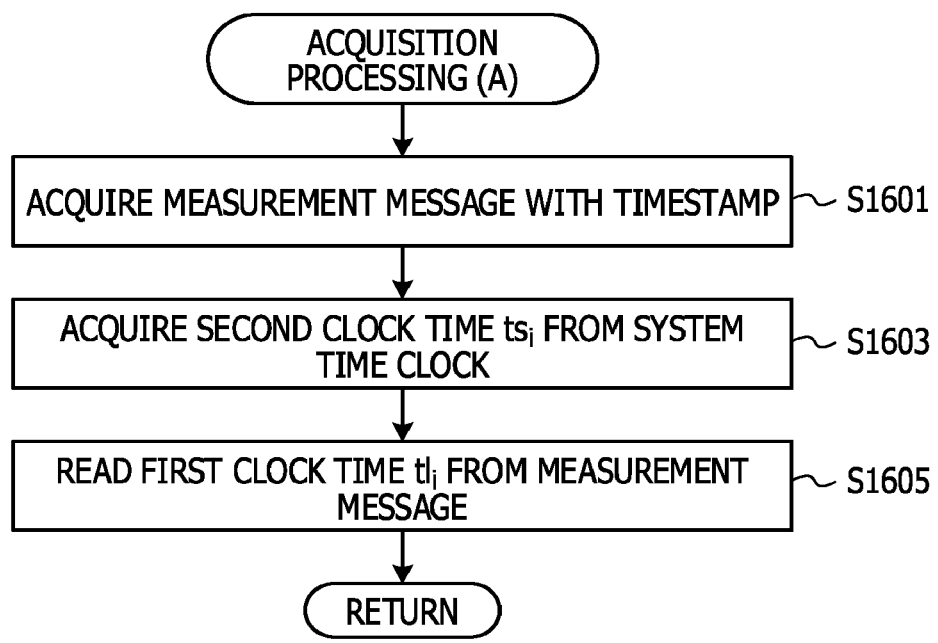
FIG. 16 is a diagram illustrating a flow of acquisition processing (A)

In FIG. 16, a flow of acquisition processing (A) is illustrated. The first acquiring unit 1303 acquires a measurement message with a timestamp from the buffer 209 (S1601). The first acquiring unit 1303 acquires the second clock time $ts_i$ from the system time clock 211 (S1603). Moreover, the first acquiring unit 1303 reads the first clock time $tl_1$ from the measurement message (S1605). Then, return to the main processing (A) is made.

Figure 17:
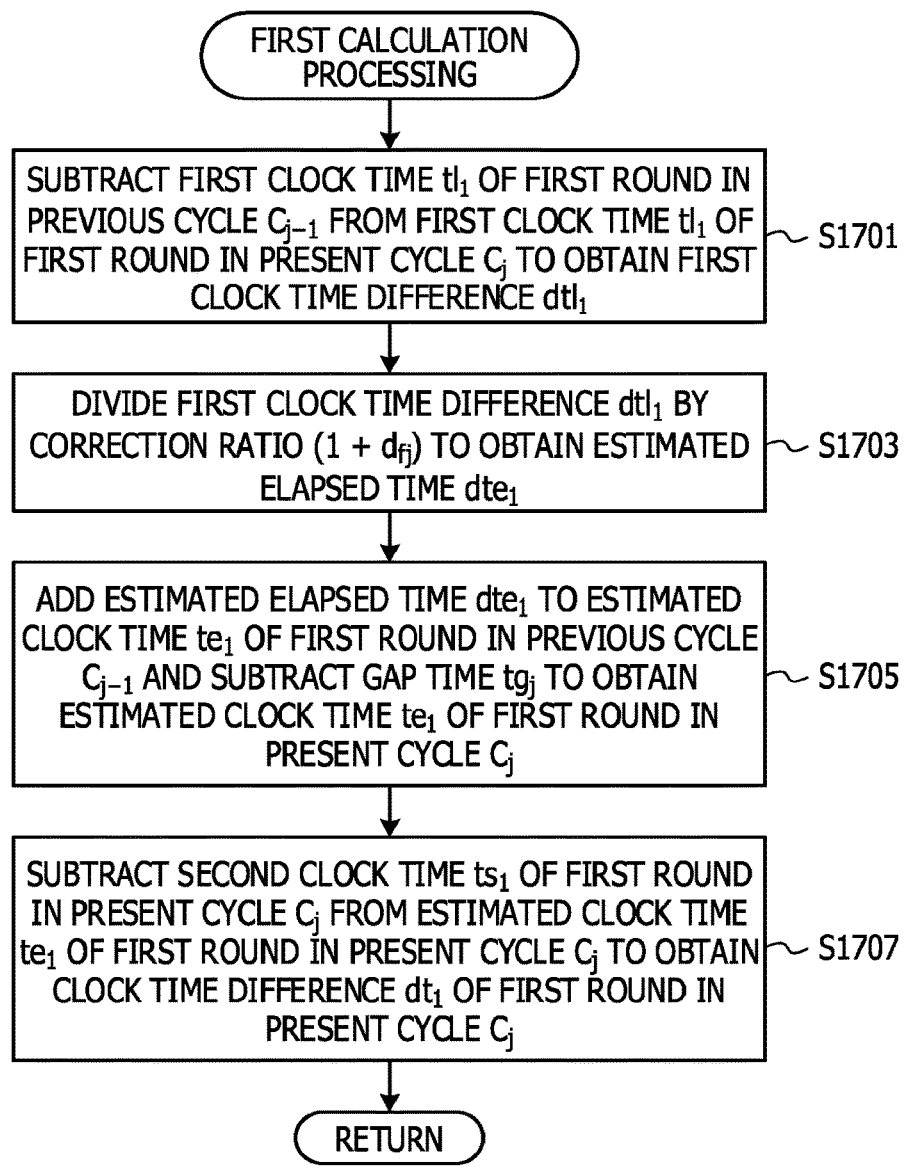
FIG. 17 is a diagram illustrating a flow of first calculation processing.

In FIG. 17, a flow of the first calculation processing is illustrated. The first calculating unit 1305 subtracts the first clock time $tl_1$ of the first round in the previous cycle $C_{j-1}$ from the first clock time $tl_1$ of the first round in the present cycle $C_j$ to obtain the first clock time difference $dtl_1$ (S1701). The first calculating unit 1305 divides the first clock time difference $dtl_1$ by the correction ratio $(1+df_j)$ to obtain the estimated elapsed time $dte_1$ (S1703). The first calculating unit 1305 adds the estimated elapsed time $dte_1$ to the estimated clock time $te_1$ of the first round in the previous cycle $C_{j-1}$ and subtracts the gap time $tg_1$ to obtain the estimated clock time $te_1$ of the first round in the present cycle $C_j$ (S1705). Moreover, the second calculating unit 1307 subtracts the second clock time $ts_1$ of the first round in the present cycle $C_j$ from the estimated clock time $te_1$ of the first round in the present cycle $C_j$ to obtain the clock time difference $dt_1$ of the first round in the present cycle $C_j$ (S1707). Then, return to the main processing (A) is made.

Figure 18:
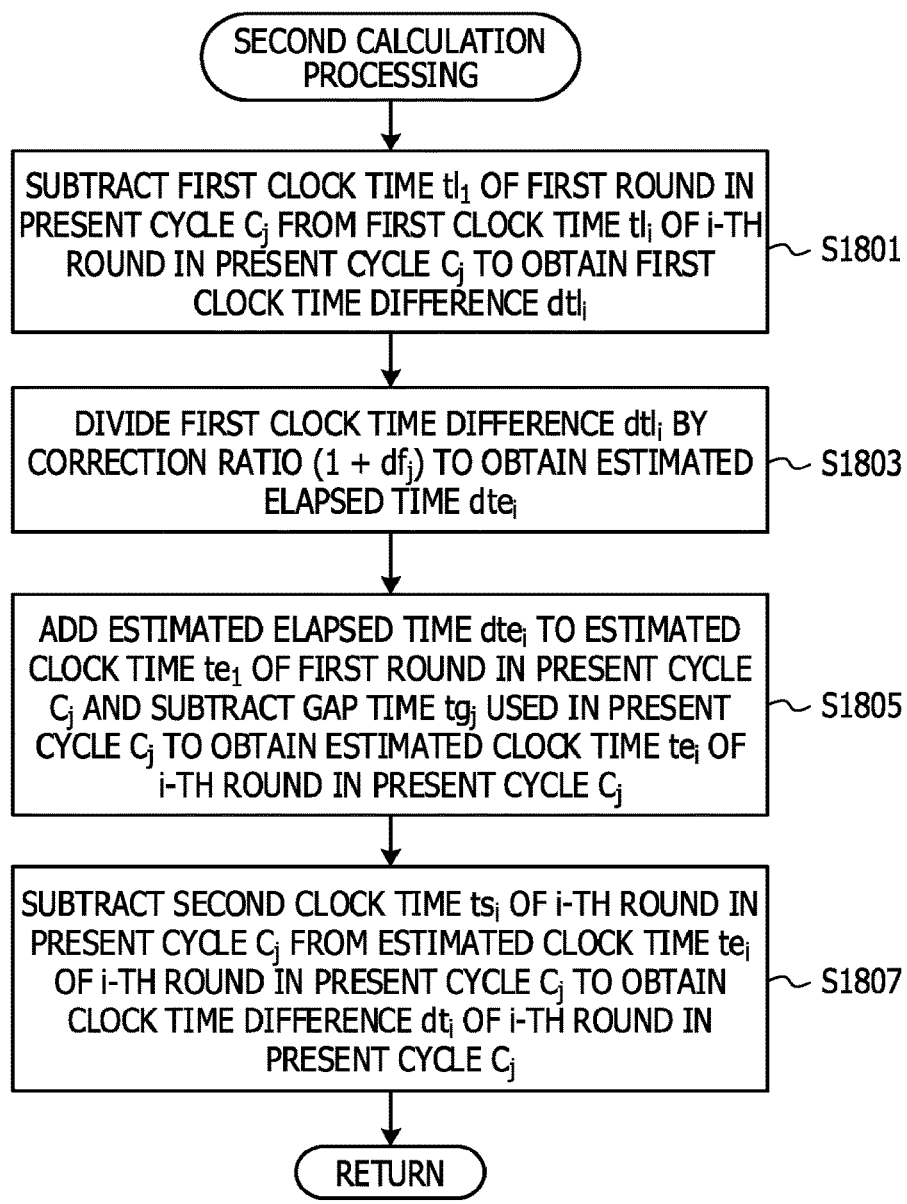
FIG. 18 is a diagram illustrating a flow of second calculation processing.

In FIG. 18, a flow of the second calculation processing is illustrated. The first calculating unit 1305 subtracts the first clock time $tl_1$ of the first round in the present cycle $C_j$ from the first clock time $tl_i$ of the i-th round in the present cycle $C_j$ to obtain the first clock time difference $dtl_i$ (S1801). The first calculating unit 1305 divides the first clock time difference $dtl_i$ by the correction ratio $(1+df_j)$ to obtain the estimated elapsed time $dte_i$ (S1803). The first calculating unit 1305 adds the estimated elapsed time $dte_i$ to the estimated clock time $te_1$ of the first round in the present cycle $C_j$ and subtracts the gap time $tg_j$ used in the present cycle $C_j$ to obtain the estimated clock time $te_i$ of the i-th round in the present cycle $C_j$ (S1805). The second calculating unit 1307 subtracts the second clock time $ts_i$ of the i-th round in the present cycle $C_j$ from the estimated clock time $te_i$ of the i-th round in the present cycle $C_j$ to obtain the clock time difference $dt_i$ of the i-th round in the present cycle $C_j$ (S1807). Then, return to the main processing (A) is made.

Figure 19:
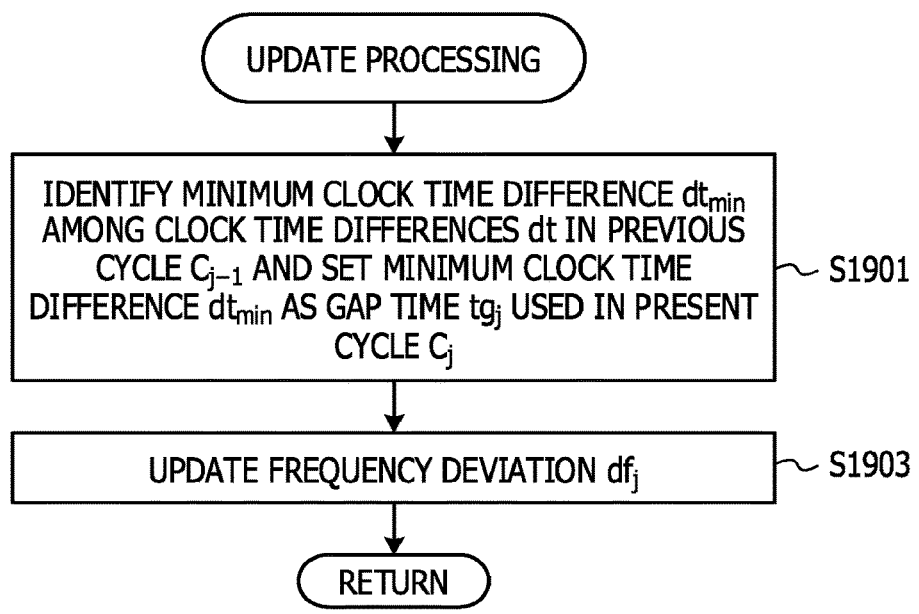
FIG. 19 is a diagram illustrating a flow of update processing.

In FIG. 19, a flow of the update processing is illustrated. The identifying unit 1309 identifies the minimum clock time difference $dt_{min}$ among the clock time differences dt in the previous cycle $C_{j-1}$. Then, the updating unit 1311 sets the minimum clock time difference $dt_{min}$ as the gap time $tg_j$ used in the present cycle $C_j$ (S1901). The updating unit 1311 updates the frequency deviation $df_j$ in accordance with the above-described expression (1) (S1903). Then, return to the main processing (A) is made.

According to the present embodiment, the first clock time given by the external equipment 101 can be altered into a clock time of the own system time clock basis more correctly. For example, the local error can be reduced without being affected by processing delay in the data collecting device 201.

As another contrivance, it may be determined that the reliability of the estimated clock time in the previous cycle is low if the absolute value of the minimum clock time difference $dt_{min}$ surpasses a threshold. This is because, in this case, there is a possibility that the retention delay did not become 0 in the cycle.

Furthermore, the length T of the cycle may be adjusted based on the minimum past clock time difference $dt_{min}$.

Moreover, whether or not to execute the update processing may be decided based on the minimum past clock time difference $dt_{min}$. This is because it is also conceivable that the premise that the retention delay becomes 0 in the cycle does not hold.

In addition, the length T of the cycle may be decided based on the temperature, the internal voltage, or the clock counter frequency of the external equipment 101. It can be expected that a more appropriate length T of the cycle is set.

[Embodiment 2]

Figure 20:
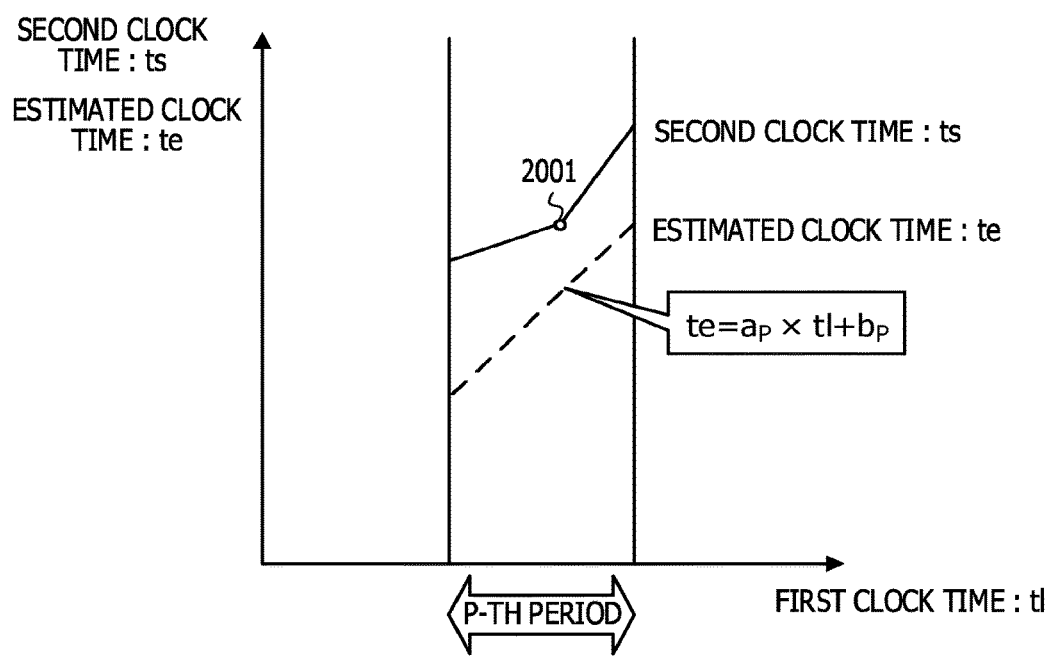
FIG. 20 is a diagram illustrating a transition example of a second clock time and an estimated clock time.

The outline of embodiment 2 will be described by using FIG. 20 to FIG. 29. FIG. 20 illustrates the estimated clock time te in a P-th period by a dashed line. A solid line represents the second clock time ts. The abscissa axis represents the first clock time tl. The estimated clock time te is calculated in accordance with an expression of $te = a_P \times tl + b_P$. The estimation parameters $(a_P, b_P)$ are parameters applied to the calculation of the estimated clock time te in the P-th period.

Figure 21:
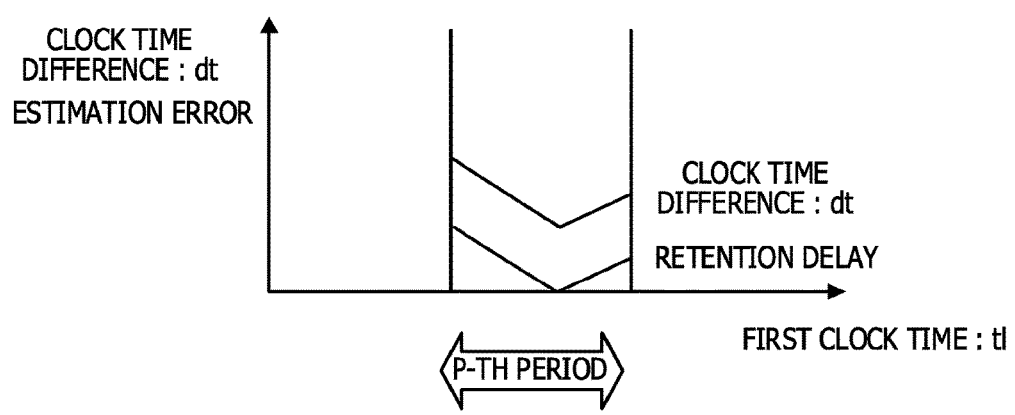
FIG. 21 is a diagram illustrating a transition example of a clock time difference and retention delay.

FIG. 21 illustrates the clock time difference dt in the P-th period. The clock time difference dt is the time obtained by subtracting the estimated clock time te from the second clock time ts. The clock time difference dt at the second clock time ts indicated at a point 2001 in FIG. 20 does not include retention delay as illustrated in FIG. 21. This state is described above by using FIG. 6. Also in the present embodiment, the estimated clock time te is calculated based on the timing when the clock time difference dt becomes minimum.

Figure 22:
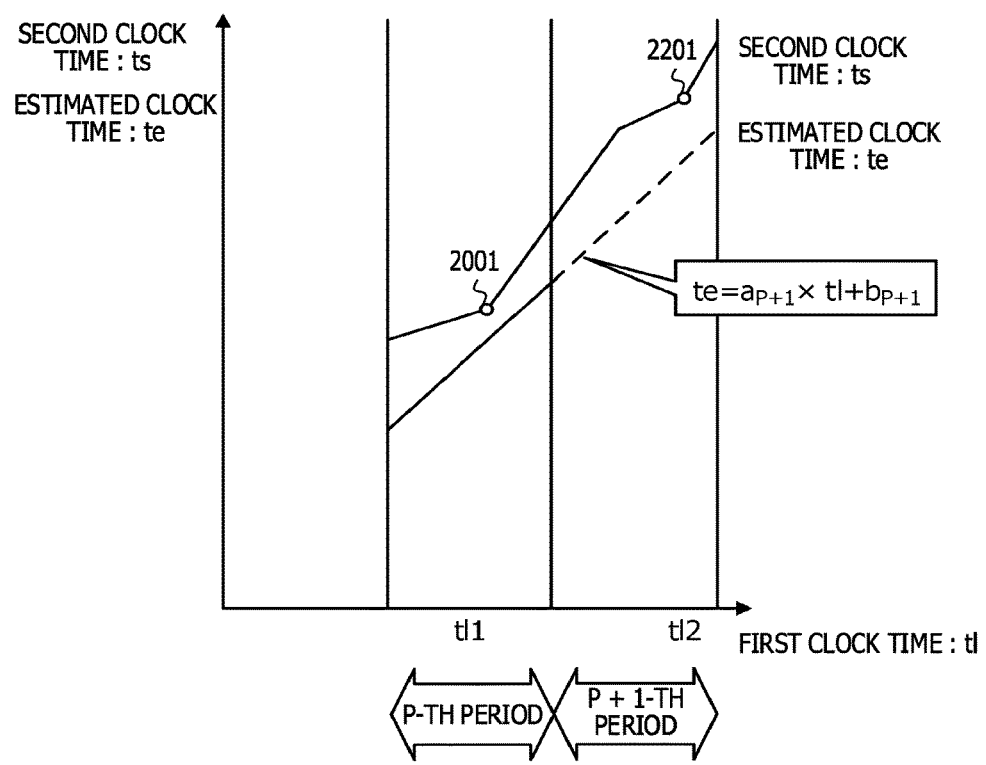
FIG. 22 is a diagram illustrating a transition example of a second clock time and an estimated clock time.

FIG. 22 illustrates the estimated clock time te in a P+1-th period by a dashed line. A solid line is a line obtained by extending a straight line represented by an expression of $te=a_{P+1} \times tl+b_{P+1}$ to calculate the estimated clock time te of the P+1-th period to the P-th period. The estimated clock time te of the P-th period illustrated in FIG. 20 is not updated. The estimation parameters ($a_{P+1}$, $b_{P+1}$) are parameters applied to the calculation of the estimated clock time te in the P+1-th period.

Figure 23:
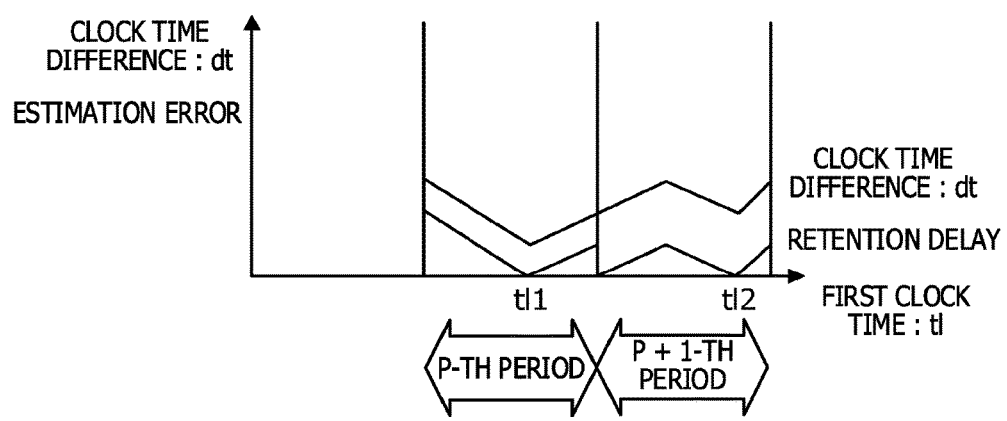
FIG. 23 is a diagram illustrating a transition example of a clock time difference and a retention delay.

FIG. 23 illustrates the clock time difference dt in the P+1-th period. Also regarding the P+1-th period, the clock time difference dt based on the calculation expression of $te=a_{P+1} \times tl+b_{P+1}$ is illustrated. Neither the clock time difference dt at the second clock time ts indicated at the point 2001 in FIG. 22 nor the clock time difference dt at the second clock time ts indicated at a point 2201 includes retention delay as illustrated in FIG. 23. In the present embodiment, an approximate expression corresponding to the straight line that links these two points is used.

Figure 24:
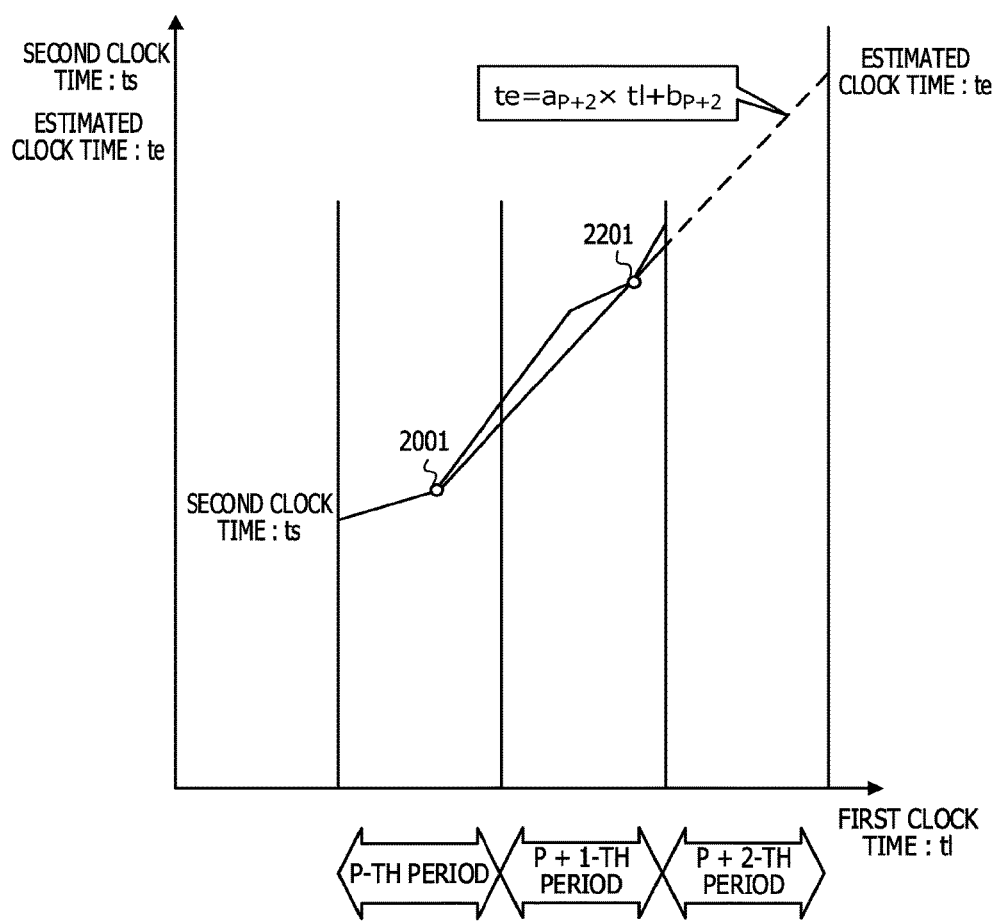
FIG. 24 is a diagram illustrating a transition example of a second clock time and an estimated clock time.

FIG. 24 illustrates the estimated clock time te in a P+2-th period by a dashed line. A solid line is a line obtained by extending a straight line represented by an expression of $te=a_{P+2} \times tl+b_{P+2}$ to calculate the estimated clock time te of the P+2-th period to the point 2001. The estimated clock time te of the P-th period illustrated in FIG. 20 and the estimated clock time te of the P+1-th period illustrated in FIG. 22 are not updated. The estimation parameters ($a_{P+2}$, $b_{P+2}$) are parameters applied to the calculation of the estimated clock time te in the P+2-th period. At the end timing of the P+1-th period, the estimation parameters ($a_{P+1}$, $b_{P+1}$) applied to the calculation of the estimated clock time te in the P+1-th period are referred to as present estimation parameters. Furthermore, the estimation parameters ($a_{P+2}$, $b_{P+2}$) applied to the calculation of the estimated clock time te in the P+2-th period are referred to as new estimation parameters. The new estimation parameters are obtained by correcting the present estimation parameters.

Figure 25:
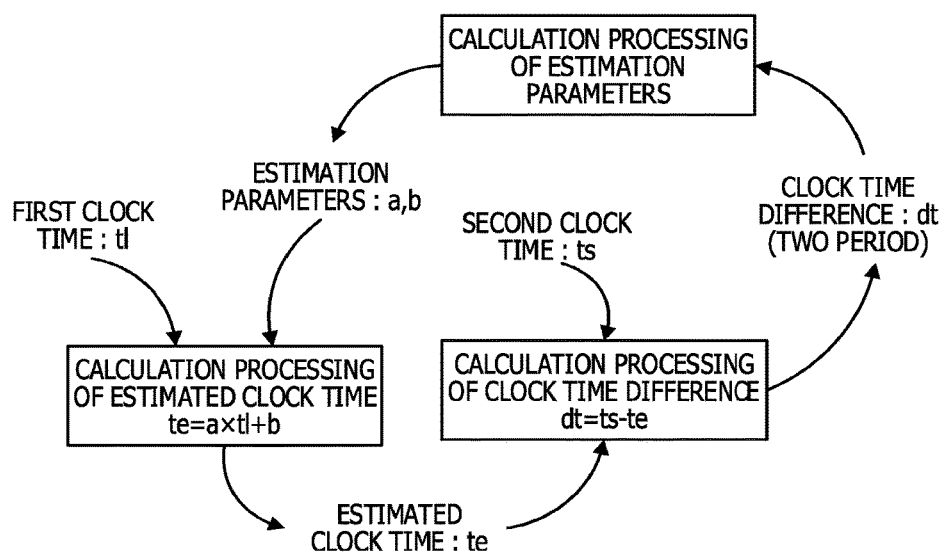
FIG. 25 is a diagram illustrating a relationship among parameters.

The relationship among the parameters will be marshaled by using FIG. 25. The clock time difference dt is calculated based on the second clock time ts and the estimated clock time te. In the present embodiment, attention is paid to the minimum clock time difference dt in each of two periods. The new estimation parameters are calculated by correcting the present estimation parameters based on these minimum clock time differences dt and the appearance clock times thereof. Then, the first clock time in the next period is converted to the estimated clock time by the new estimation parameters. This cycle is repeated.

Figure 26:
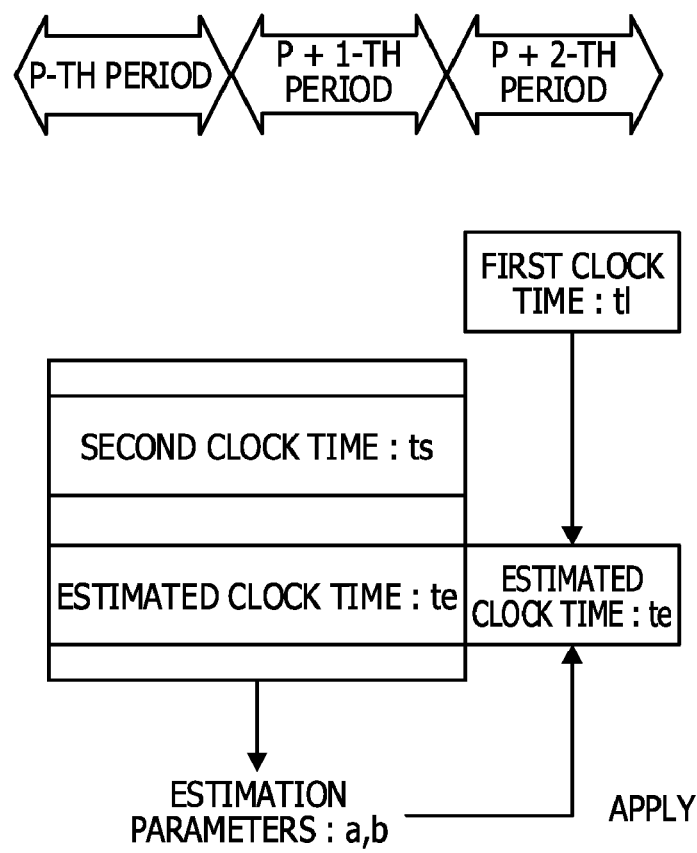
FIG. 26 is a diagram illustrating an outline of processing to which estimation parameters are applied.

The relationship between periods and the respective clock times will be marshaled by using FIG. 26. FIG. 26 is based on the assumption that the new estimation parameters applied to calculation of the estimated clock time te in the P+2-th period are calculated at the end timing of the P+1-th period. In the case of calculating these new estimation parameters, clock time data of the P-th period and clock time data of the P+1-th period are used. For example, the second clock time is of the P-th period and the P+1-th period and the estimated clock time te of the P-th period and the P+1-th period are used. The estimated clock time te of the P-th period is a value based on the present estimation parameters applied to calculation of the estimated clock time te in the P+1-th period. The new estimation parameters are occasionally applied to the first clock time tl in the P+2-th period and immediately the estimated clock time is obtained.

Figure 27:
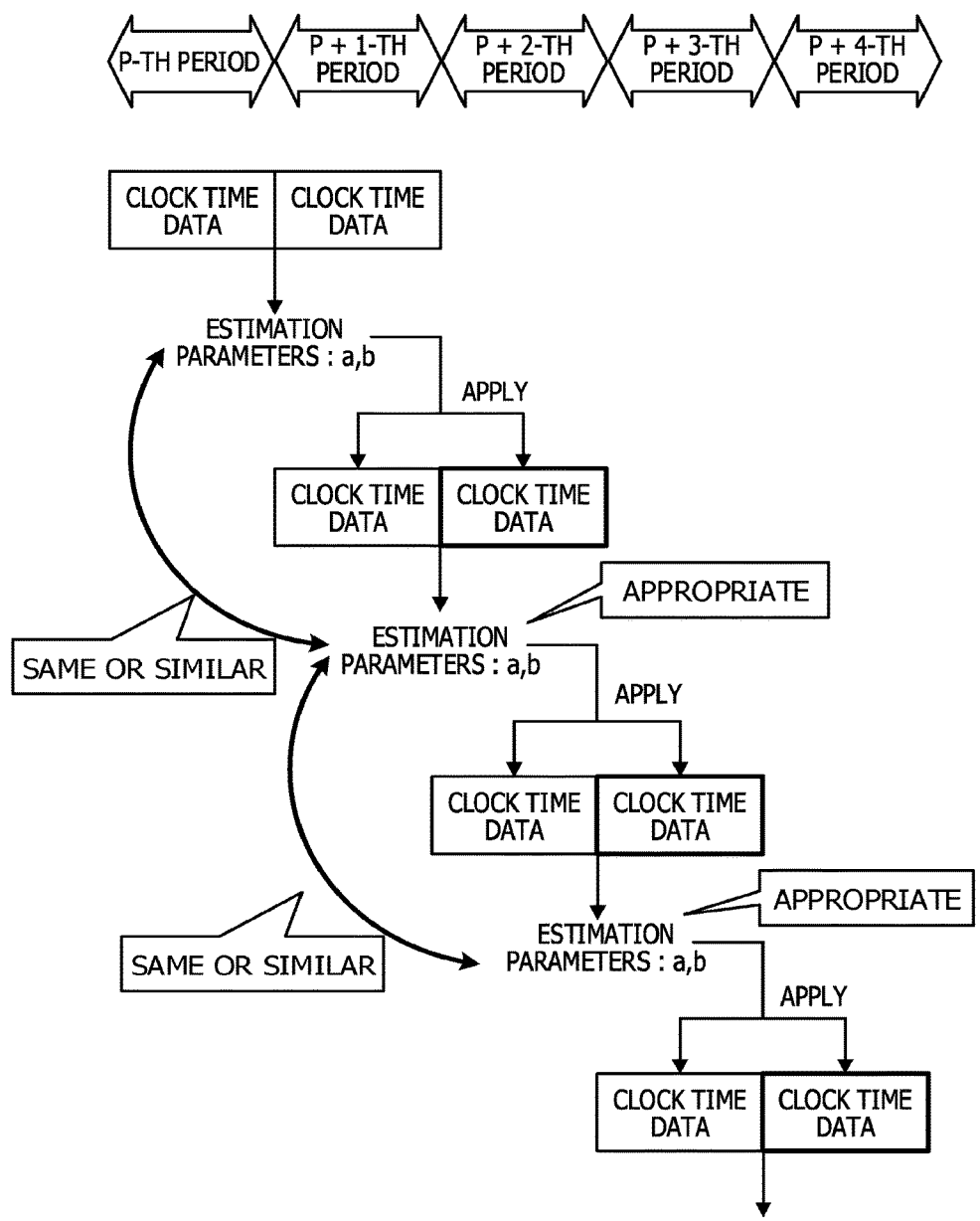
FIG. 27 is a diagram illustrating an outline of processing when estimation parameters are appropriate.

As illustrated in FIG. 27, the relationship between periods and the respective clock times explained in FIG. 26 is repeated in accordance with the elapse of periods. In FIG. 27, it is assumed that each estimation parameter is appropriate. If each estimation parameter is appropriate, the length of each period does not change.

However, the estimation parameter may not be appropriate. If the minimum clock time difference dt in a certain period includes a time equivalent to retention delay, the estimation parameters calculated based on the period do not lead to the correct estimated clock time. In the present embodiment, if the new estimation parameters are the same as or similar to the present estimation parameters, it is determined that these new estimation parameters are appropriate. If the estimated clock time is correct, this estimated clock time is continuous and the estimation parameters used as the basis of this estimated clock time are also approximate.

Figure 28:
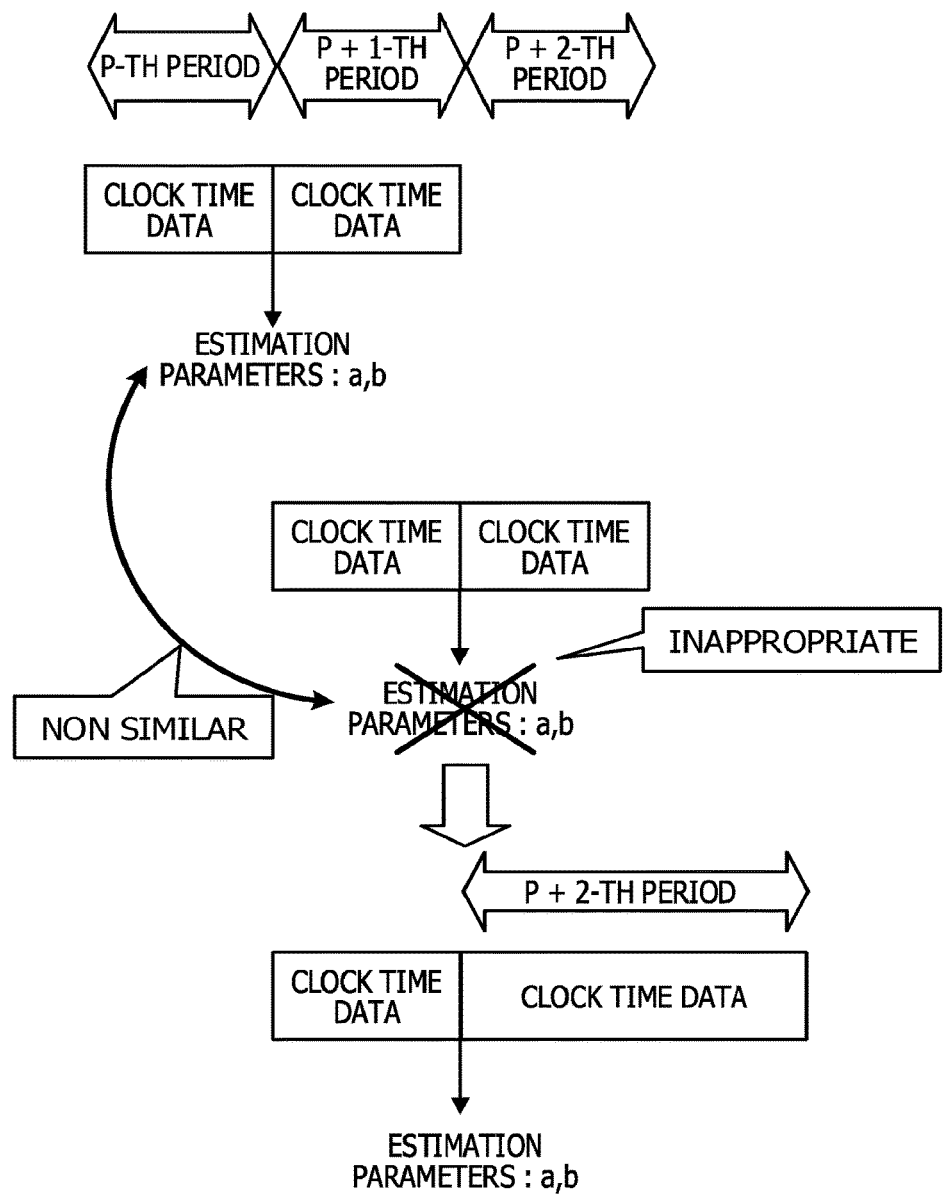
FIG. 28 is a diagram illustrating an outline of processing when estimation parameters are inappropriate.

As illustrated in FIG. 28, if the new estimation parameters are not similar to the present estimation parameters, a period to serve as the basis of the new estimation parameters is extended. In this example, of the P+1-th period and the P+2-th period that serve as the basis of the new estimation parameters, the latter P+2-th period is extended. If a period is set longer as above, the possibility that the minimum clock time difference in this period does not include retention delay becomes higher. This example is based on the premise that the present estimation parameters are appropriate.

However, the error includes a component due to a frequency deviation in the local time clock 107 as well as the retention delay. When the true measurement clock time t is represented on a graph whose abscissa axis indicates the first clock time tl, the true measurement clock time t often represents a curve due to variation in the frequency deviation. Therefore, there is a possibility that, if the period to which the above-described approximate expression is applied is too long, the error between the estimated clock time to and the true measurement clock time t is enlarged in part of the period. Accordingly, in view of the possibility of the occurrence of frequency deviation variation of a shorter period, trouble is caused if the period set longer once is kept as it is.

Figure 29:
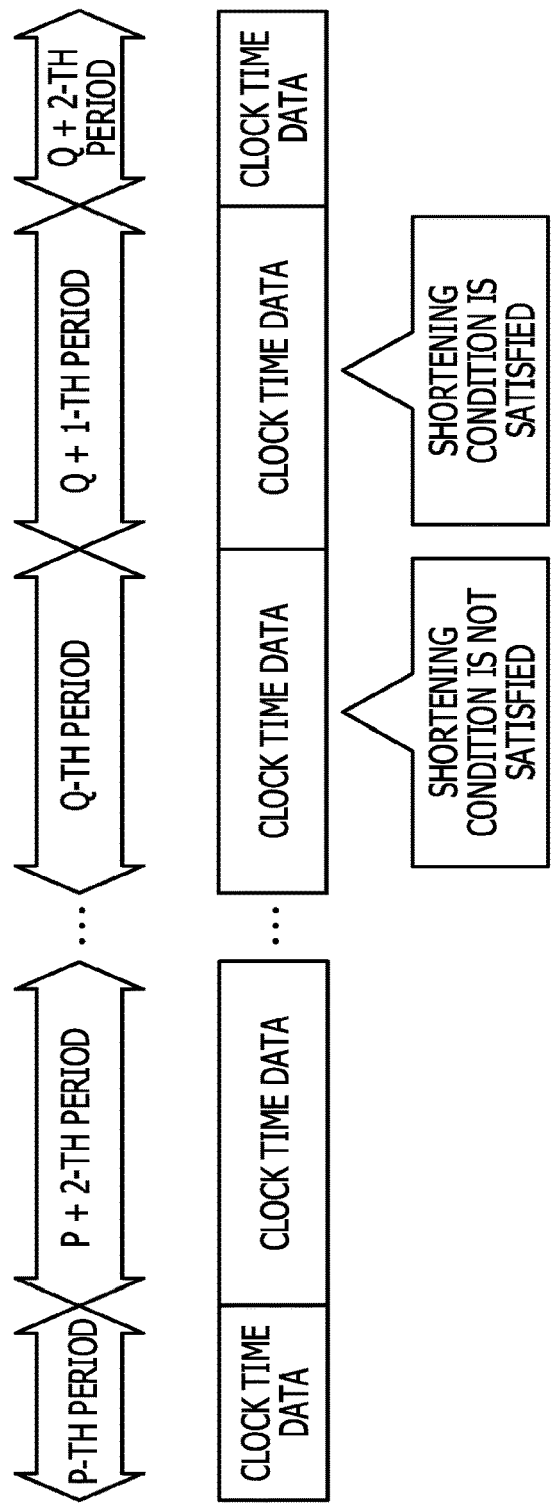
FIG. 29 is a diagram illustrating an outline of period shortening.

In an example illustrated in FIG. 29, in the case in which new estimation parameters obtained at the end timing of a Q-th period are appropriate, the length of a Q+1-th period is the same as the case of the Q-th period if a given shortening condition is not satisfied. On the other hand, in the case in which new estimation parameters obtained at the end timing of a Q+1-th period are appropriate, the length of a Q+2-th period is set shorter than the case of the Q+1-th period if the given shortening condition is satisfied. The shortening condition will be described later. For example, if the possibility that new estimation parameters are determined to be appropriate is high, the next period is shortened. This is the end of the description of the outline in the present embodiment.

Figure 30:
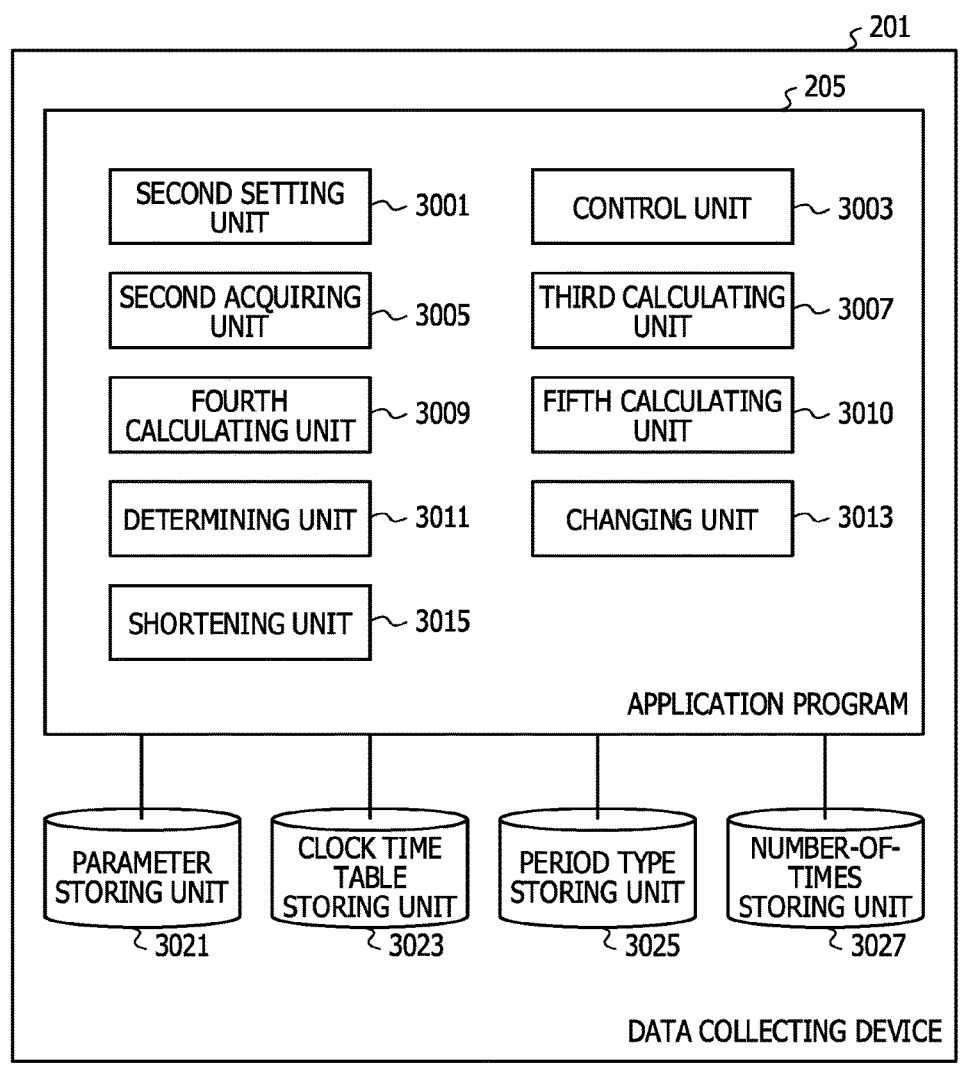
FIG. 30 is a diagram illustrating a module configuration example of a data collecting device.

In FIG. 30, a module configuration example of the data collecting device 201 is illustrated. The application program 205 includes a second setting unit 3001, a control unit 3003, a second acquiring unit 3005, a third calculating unit 3007, a fourth calculating unit 3009, a fifth calculating unit 3010, a determining unit 3011, a changing unit 3013, and a shortening unit 3015. Furthermore, the data collecting device 201 includes a parameter storing unit 3021, a clock time table storing unit 3023, a period type storing unit 3025, and a number-of-times storing unit 3027.

The second setting unit 3001 sets initial values to various kinds of internal parameters. The control unit 3003 controls operation of the application program 205. The second acquiring unit 3005 acquires measurement messages with a timestamp from the buffer 209. The third calculating unit 3007 calculates the estimated clock time te. The fourth calculating unit 3009 calculates the estimation parameters. The fifth calculating unit 3010 calculates the clock time difference dt. The determining unit 3011 determines whether or not the estimation parameters are appropriate. The changing unit 3013 changes the period type. For example, the changing unit 3013 extends the relevant period. The shortening unit 3015 shortens the next period.

The parameter storing unit 3021 stores various kinds of internal parameters. The clock time table storing unit 3023 stores a clock time table. The clock time table will be described later by using FIG. 31. The period type storing unit 3025 stores a period type table. The period type table will be described later by using FIG. 32. The number-of-times storing unit 3027 stores a number-of-times table. The number-of-times table will be described later by using FIG. 33.

The above-described second setting unit 3001, the control unit 3003, the second acquiring unit 3005, the third calculating unit 3007, the fourth calculating unit 3009, the fifth calculating unit 3010, the determining unit 3011, the changing unit 3013, and the shortening unit 3015 are implemented by using hardware resources (for example, FIG. 56) and programs that cause a processor to execute processing to be described below.

Figure 56:
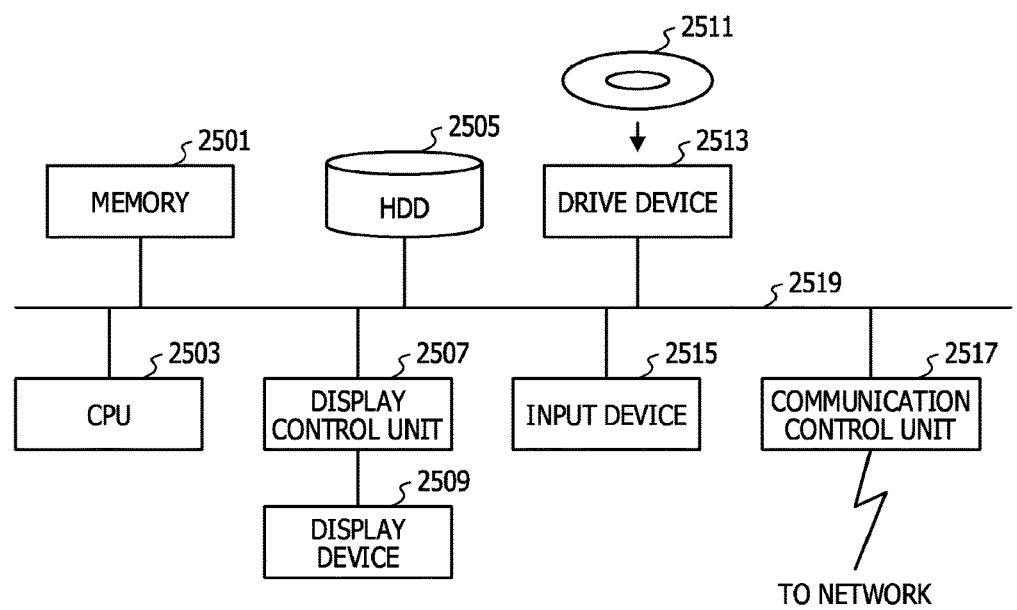
FIG. 56 is a functional block diagram of a computer.

The above-described parameter storing unit 3021, the clock time table storing unit 3023, the period type storing unit 3025, and the number-of-times storing unit 3027 are implemented by using hardware resources (for example, FIG. 56).

In FIG. 31, an example of the clock time table will be illustrated. In the clock time table in this example, records corresponding to measurement messages with a timestamp are set. The records of the clock time table include a field in which the first clock time is stored, a field in which the second clock time is stored, a field in which the estimated clock time is stored, and a field in which measurement data is stored.

In FIG. 32, an example of the period type table is illustrated. The period type table in this example includes records corresponding to period types. The records of the period type table include a field in which a period type identification (ID) is set and a field in which a period length is set.

The period type ID is used to identify the period type. The period length is the length of the period in the relevant period type. Suppose that the period type table is already prepared at the timing of start of main processing. In this example, M period types are set.

In FIG. 33, an example of the number-of-times table is illustrated. The number-of-times table in this example includes records corresponding to the period types. The records of the number-of-times table include a field in which the period type ID is stored, a field in which the number of times of appropriate parameters is stored, and a filed in which the number of times of inappropriate parameters is stored.

The period type ID is used to identify the period type of the count subject. The number of times of appropriate parameters is the number of times the estimation parameters are determined to be appropriate in determination of whether or not the estimation parameters based on a period of the relevant period type are appropriate. The number of times of inappropriate parameters is the number of times the estimation parameters are determined to be inappropriate in determination of whether or not the estimation parameters based on a period of the relevant period type are appropriate.

Figure 34:
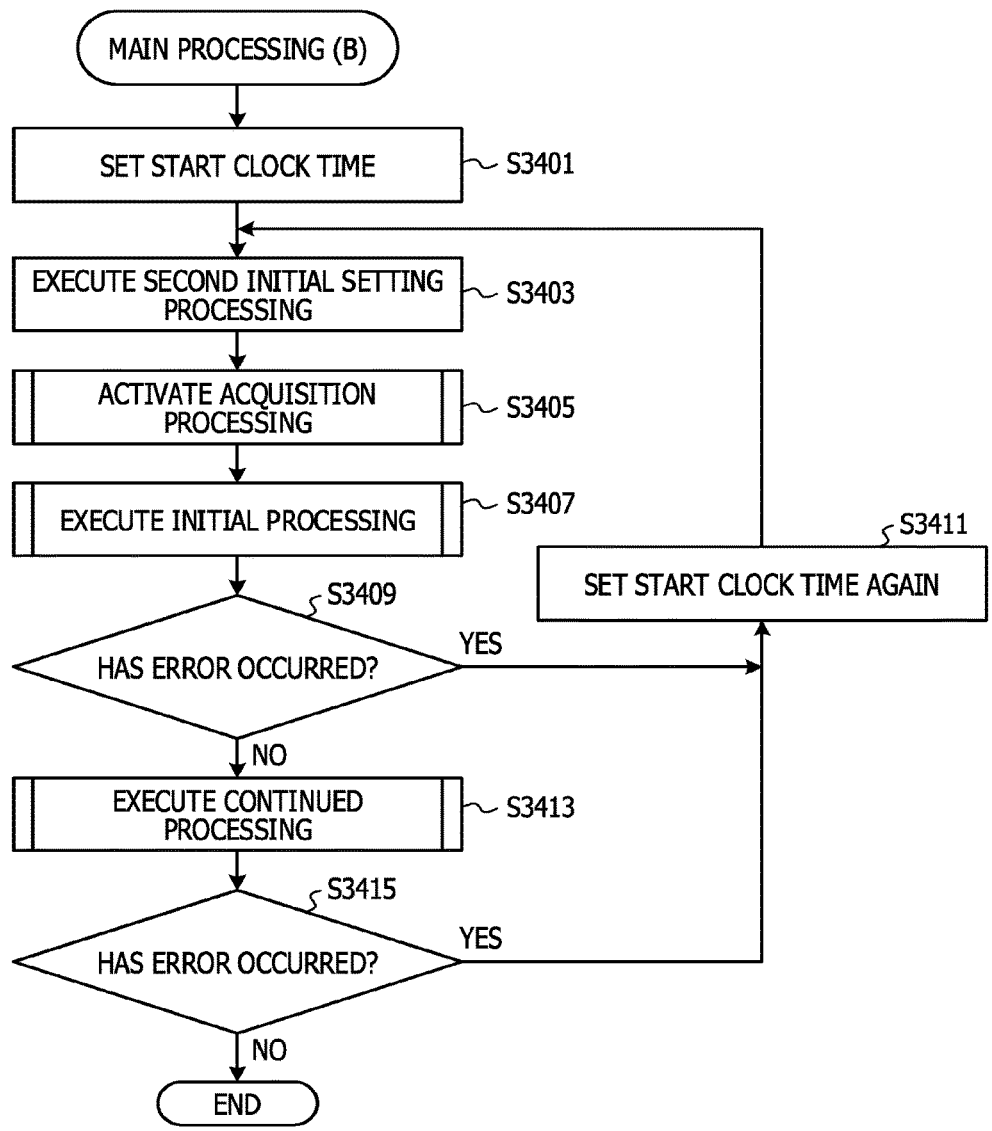
FIG. 34 is a diagram illustrating a flow of main processing (B)

In the present embodiment, main processing (B) is executed instead of main processing (A). In FIG. 34, the flow of main processing (B) is illustrated. The second setting unit 3001 sets a start clock time (S3401). The start clock time is used as the criteria of each period. The start clock time is the present clock time for example. However, the second setting unit 3001 may omit the setting of the start clock time.

The second setting unit 3001 executes second initial setting processing (S3403). In the second initial setting processing, initialization of the respective parameters is carried out. In this example, 1 is set as $a_{new}$ of the new estimation parameters. As $b_{new}$ of the new estimation parameters, 0 is set. As $a_{cur}$ of the present estimation parameters, 1 is set. As $b_{cur}$ of the present estimation parameters, 0 is set. As overall indexes e[0], e[1], and e[2], −1 is set. In S4607 in FIG. 46 to be described later, −1 is a value for control used for determining that the present overall index is the third or subsequent overall index. As each number cl of times of appropriate parameters and each number cu of times of inappropriate parameters, 0 is set. As a parameter i of the period type ID, 1 is set. The details of each parameter will be described later.

The control unit 3003 activates acquisition processing (S3405). The acquisition processing acquires measurement messages with a timestamp from the buffer 209 and sets new records in the clock time table. An example is represented in which the acquisition processing is caused to operate concurrently with main processing (B) in view of shortening of processing delay to settlement of the correction result of the recording clock time. However, the acquisition processing does not have to be caused to concurrently operate.

Figure 35:
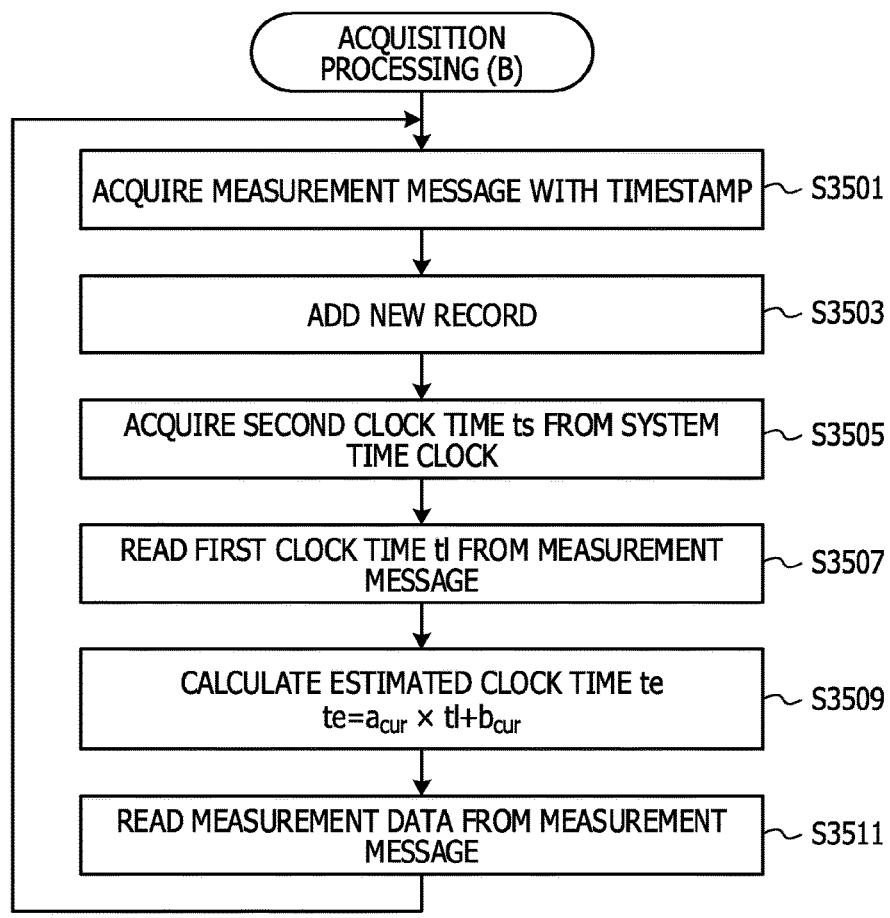
FIG. 35 is a diagram illustrating a flow of acquisition processing (B)

In the present embodiment, acquisition processing (B) is activated. In FIG. 35, the flow of acquisition processing (B) is illustrated. The second acquiring unit 3005 acquires a measurement message with a timestamp from the buffer 209 (S3501). The second acquiring unit 3005 adds a new record to the clock time table (S3503). The second acquiring unit 3005 acquires the second clock time ts from the system time clock 211 and stores the second clock time ts in the new record (S3505). The second acquiring unit 3005 reads the first clock time tl from the measurement message and stores the first clock time tl in the new record (S3507). The third calculating unit 3007 calculates the estimated clock time te by using the present estimation parameters ($a_{cur}$, $b_{cur}$) and records the estimated clock time te in the new record (S3509). The second acquiring unit 3005 reads measurement data from the measurement message and stores the measurement data in the new record (S3511). Then, the second acquiring unit 3005 returns to the processing represented in S3501 and repeats the above-described processing.

Referring back to FIG. 34, the control unit 3003 executes initial processing (S3407). In the initial processing, processing relating to a first period to a third period is executed.

Figure 36:
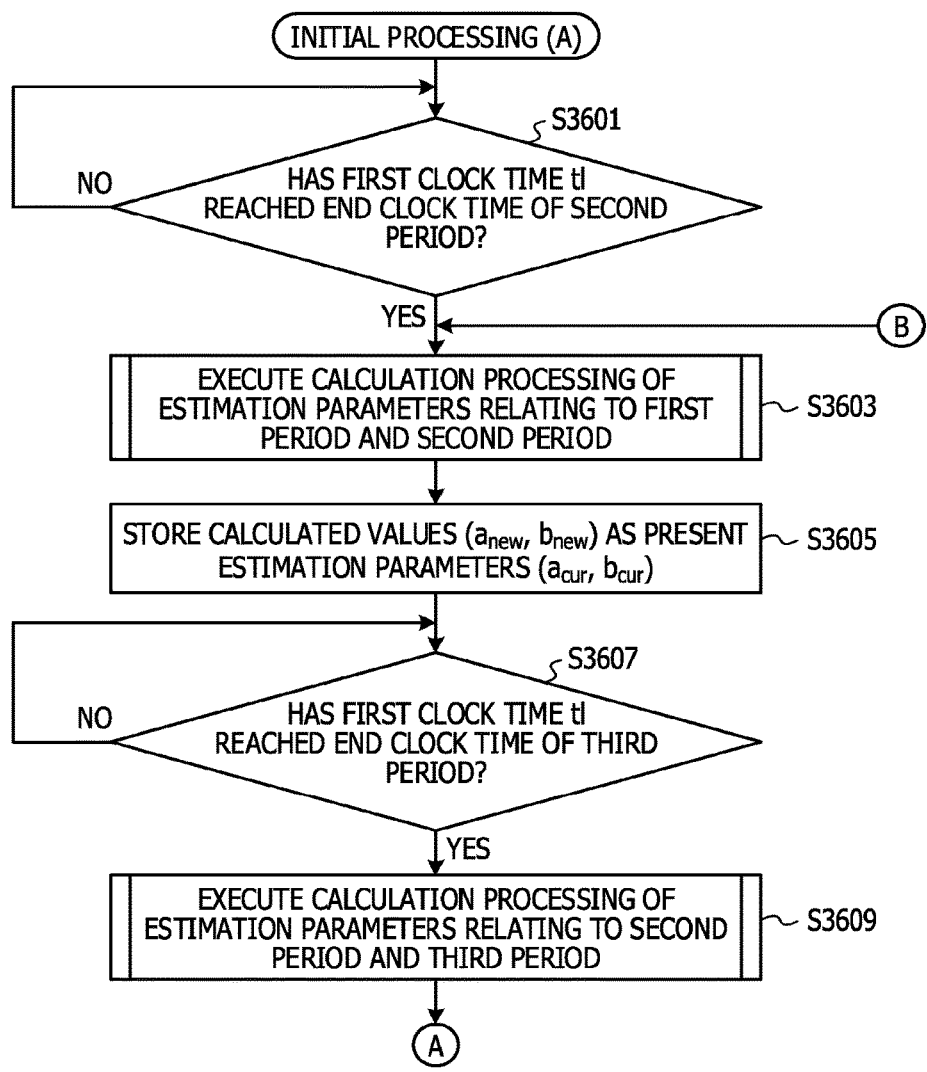
FIG. 36 is a diagram illustrating a flow of initial processing (A)

In the present embodiment, initial processing (A) is executed. In FIG. 36, the flow of initial processing (A) is illustrated. The control unit 3003 determines whether or not the latest first clock time tl stored in the clock time table in acquisition processing (B) has reached the end clock time of the second period (S3601). If determining that the latest first clock time tl has not reached the end clock time of the second period, the control unit 3003 repeats the processing represented in S3601. Note that the end clock time is obtained by adding the length of the period to the start clock time.

On the other hand, if it is determined that the latest first clock time tl has reached the end clock time of the second period, the fourth calculating unit 3009 executes calculation processing of estimation parameters relating to the first period and the second period (S3603).

Figure 37:
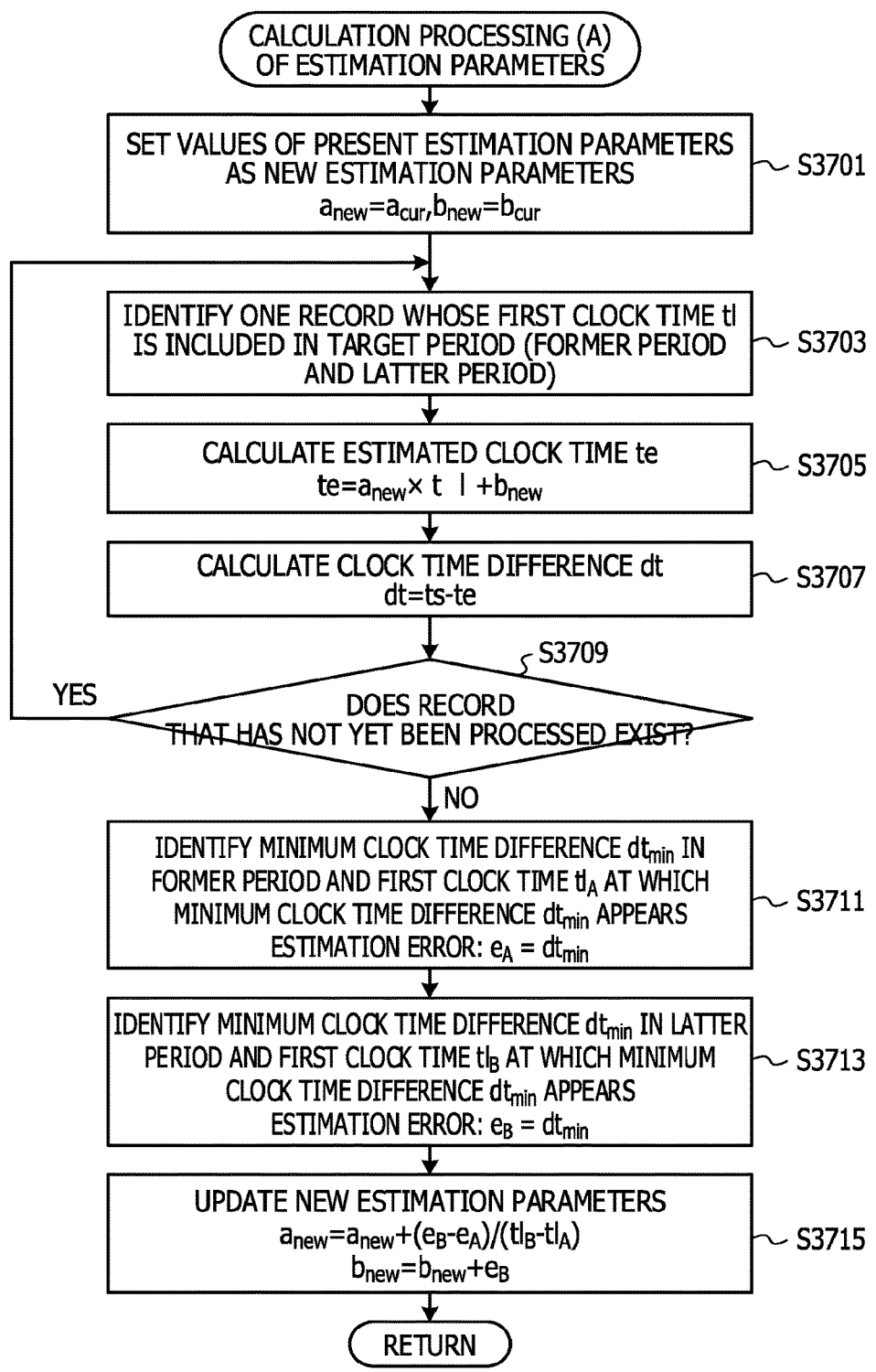
FIG. 37 is a diagram illustrating a flow of calculation processing (A) of estimation parameters.

In the present embodiment, calculation processing (A) of estimation parameters is executed. In FIG. 37, the flow of calculation processing (A) of estimation parameters is illustrated. The fourth calculating unit 3009 sets the values of the present estimation parameters ($a_{cur}$, $b_{cur}$) as the new estimation parameters ($a_{new}$, $b_{new}$) (S3701). The values set at this time become the correction targets.

The fourth calculating unit 3009 identifies one record whose first clock time tl is included in the target period (target period includes two periods, for example, former period and latter period) (S3703). For example, the fourth calculating unit 3009 identifies the record in accordance with the order.

The third calculating unit 3007 calculates the estimated clock time te by using the new estimation parameters ($a_{new}$, $b_{new}$) (S3705). The fifth calculating unit 3010 calculates the clock time difference dt by subtracting the estimated clock time te from the second clock time is (S3707). The clock time difference dt is held while calculation processing (A) of estimation parameters is executed. The fourth calculating unit 3009 determines whether or not a record that has not yet been processed exists (S3709). If determining that a record that has not yet been processed exists, the fourth calculating unit 3009 returns to the processing represented in S3703 and the above-described processing is repeated.

On the other hand, if determining that a record that has not yet been processed does not exist, the fourth calculating unit 3009 identifies the minimum clock time difference $dt_{min}$ in the former period and a first clock time $tl_A$ at which this minimum clock time difference $dt_{min}$ appears (S3711). With this minimum clock time difference $dt_{min}$ deemed as an estimation error $e_A$, subsequent processing is executed.

Furthermore, the fourth calculating unit 3009 identifies the minimum clock time difference $dt_{min}$ in the latter period and a first clock time $tl_B$ at which this minimum clock time difference $dt_{min}$ appears (S3713). With this minimum clock time difference $dt_{min}$ deemed as an estimation error $e_B$, subsequent processing is executed.

Then, the fourth calculating unit 3009 updates the new estimation parameters ($a_{new}$, $b_{new}$) in accordance with an expression of $a_{new}=a_{new}+(e_B-e_A)/(tl_B-tl_A)$ and an expression of $b_{new}=b_{new}+e_B$ (S3715). Upon the end of calculation processing (A) of estimation parameters, return to the processing of the caller is made.

Referring back to FIG. 36, the control unit 3003 stores the values ($a_{new}$, $b_{new}$) calculated in S3603 as the present estimation parameters ($a_{cur}$, $b_{cur}$) (S3605).

The control unit 3003 determines whether or not the latest first clock time tl stored in the clock time table in acquisition processing (B) has reached the end clock time of the third period (S3607). If determining that the latest first clock time tl has not reached the end clock time of the third period, the control unit 3003 repeats the processing represented in S3607.

On the other hand, if the control unit 3003 determines that the latest first clock time tl has reached the end clock time of the third period, the fourth calculating unit 3009 executes calculation processing of estimation parameters relating to the second period and the third period (S3609). As for the estimation parameters relating to the second period and the third period, the estimation parameters have not yet been settled at the stage at which the processing of S3609 has been ended. Transition is made to processing of S3801 represented in FIG. 38 through connector A.

The determining unit 3011 executes determination processing concerning whether or not estimation parameters are appropriate (S3801). In the determination processing concerning whether or not estimation parameters are appropriate, whether or not the new estimation parameters (in the initial processing, the estimation parameters relating to the second period and the third period) are appropriate is determined. The determination processing concerning whether or not estimation parameters are appropriate will be described later by using FIG. 39 to FIG. 41.

The control unit 3003 causes the processing to branch depending on whether or not the new estimation parameters relating to the second period and the third period are appropriate (S3803). If the new estimation parameters relating to the second period and the third period are not appropriate, for example, if these new estimation parameters are inappropriate, the control unit 3003 adds 1 to the number cu[i] of times of inappropriate parameters relating to the period type (parameter of period type ID: i) of the third period (S3805).

The changing unit 3013 determines whether or not the period type (parameter of period type ID: i) of the first to third periods is the longest type (period type ID: M) (S3807).

If determining that the period type of the third period is not the longest type, the changing unit 3013 makes a change to the period type that is longer by one stage (S3809). For example, the changing unit 3013 adds 1 to the parameter i of the period type ID. Then, return to the processing of S3603 represented in FIG. 36 is made through connector B.

If determining that the period type of the third period is the longest type in S3807, the changing unit 3013 determines whether or not the longest type has continued a given number of times (S3811). If the longest type has continued a given number of times, the changing unit 3013 determines that an error has occurred (S3813). If an error has occurred, initial processing (A) is ended and return to main processing (B) of the caller is made.

If the longest type has not yet continued the given number of times, return to the processing of S3603 represented in FIG. 36 is made through connector B directly.

The description will be returned to the processing represented in S3803. If the new estimation parameters relating to the second period and the third period are appropriate, the control unit 3003 adds 1 to the number cl[i] of times of appropriate parameters relating to the period type (parameter i of period type ID) of the third period (S3815).

Moreover, the control unit 3003 sets the values of the new estimation parameters ($a_{new}$, $b_{new}$) as the present estimation parameters ($a_{cur}$, $b_{cur}$) (S3817). Upon the end of initial processing (A), return to main processing (B) of the caller is made.

Figure 39:
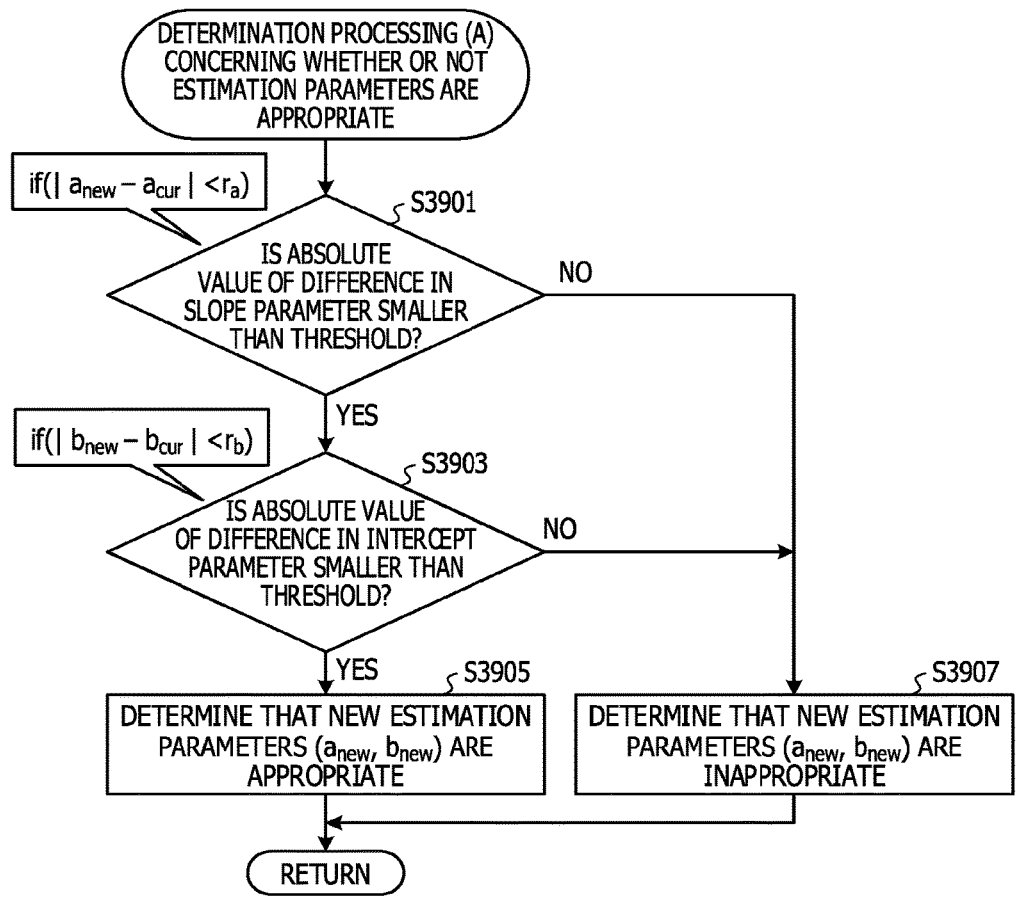
FIG. 39 is a diagram illustrating a flow of determination processing (A) concerning whether or not estimation parameters are appropriate.

In the present embodiment, two examples of the determination processing concerning whether or not estimation parameters are appropriate will be represented. In FIG. 39, the flow of determination processing (A) concerning whether or not estimation parameters are appropriate is illustrated. The determining unit 3011 determines whether or not the absolute value of the difference in the slope parameter is smaller than a threshold $r_a$ (S3901). For example, the determining unit 3011 determines whether or not the absolute value of the value obtained by subtracting the present slope parameter $a_{cur}$ from the new slope parameter $a_{new}$ is smaller than the threshold $r_a$. If this absolute value is not smaller than the threshold $r_a$, the determining unit 3011 determines that the new estimation parameters ($a_{new}$, $b_{new}$) are inappropriate (S3907). On the other hand, if this absolute value is smaller than the threshold $r_a$, transition is made to processing of S3903.

The determining unit 3011 determines whether or not the absolute value of the difference in the intercept parameter is smaller than a threshold $r_b$ (S3903). For example, the determining unit 3011 determines whether or not the absolute value of the value obtained by subtracting the present intercept parameter $b_{cur}$ from the new intercept parameter $b_{new}$ is smaller than the threshold $r_b$. If this absolute value is not smaller than the threshold $r_b$, the determining unit 3011 determines that the new estimation parameters ($a_{new}$, $b_{new}$) are inappropriate (S3907). On the other hand, if this absolute value is smaller than the threshold $r_b$, the determining unit 3011 determines that the new estimation parameters ($a_{new}$, $b_{new}$) are appropriate (S3905). Upon the end of the determination processing concerning whether or not estimation parameters are appropriate, return to the processing of the caller is made.

Here, the example is represented in which the determination of whether or not parameters are appropriate is carried out based on the absolute value of the difference in the slope parameter and the absolute value of the difference in the intercept parameter. However, with omission of the processing of S3901, the determination of whether or not parameters are appropriate may be carried out based on the absolute value of the difference in the intercept parameter. Alternatively, with omission of the processing of S3903, the determination of whether or not parameters are appropriate may be carried out based on the absolute value of the difference in the slope parameter.

Figure 40:
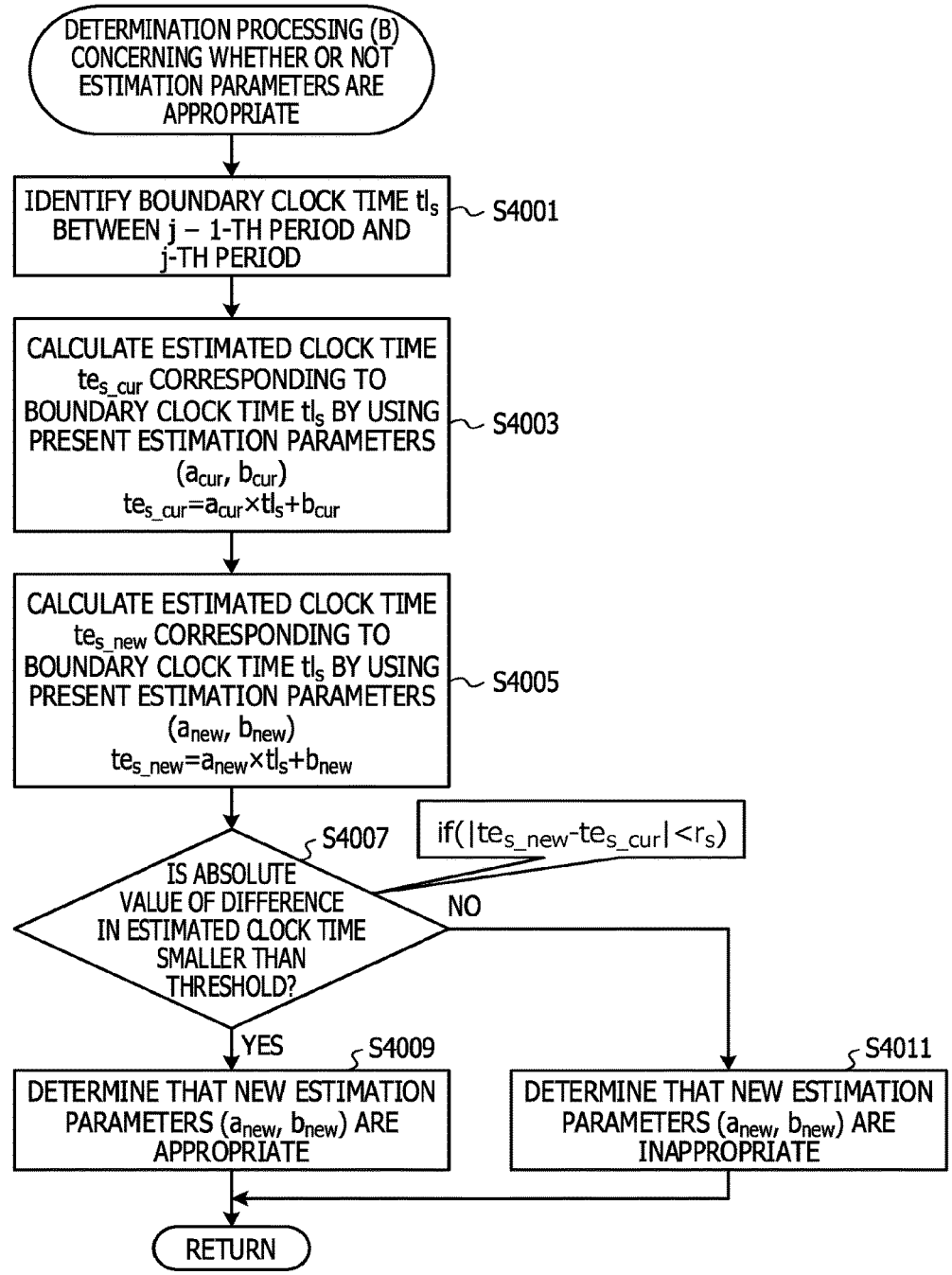
FIG. 40 is a diagram illustrating a flow of determination processing (B) concerning whether or not estimation parameters are appropriate.
Figure 41:
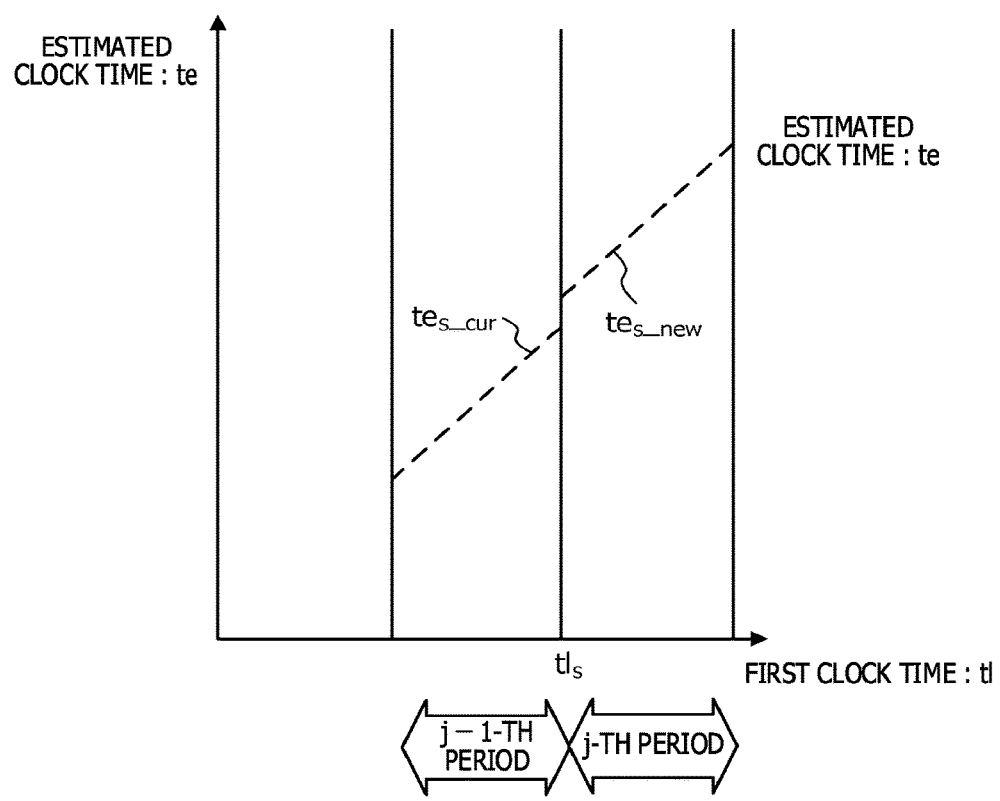
FIG. 41 is a diagram illustrating an outline of determination processing (B) concerning whether or not estimation parameters are appropriate.

The other example relating to the determination processing concerning whether or not estimation parameters are appropriate will be described. In FIG. 40, the flow of determination processing (B) concerning whether or not estimation parameters are appropriate is illustrated. The determining unit 3011 identifies a boundary clock time $tl_s$ between a j−1-th period and a j-th period (S4001). In the following, supplementation will be given with regard to determination processing (B) concerning whether or not estimation parameters are appropriate by using FIG. 41. As illustrated in FIG. 41, the boundary clock time $tl_s$ is equivalent to the end clock time of the j−1-th period and is equivalent to the start clock time of the j-th period.

The determining unit 3011 calculates an estimated clock time $te_{s\_cur}$ corresponding to the boundary clock time $tl_s$ by using the present estimation parameters ($a_{cur}$, $b_{cur}$) (S4003). Furthermore, the determining unit 3011 calculates an estimated clock time $te_{s\_new}$ corresponding to the boundary clock time $tl_s$ by using the new estimation parameters ($a_{new}$, $b_{new}$) (S4005).

The determining unit 3011 determines whether or not the absolute value of the difference in the estimated clock time is smaller than a threshold (S4007). For example, the determining unit 3011 determines whether or not the absolute value of the value obtained by subtracting the estimated clock time $te_{s\_cur}$ based on the present estimation parameters ($a_{cur}$, $b_{cur}$) from the estimated clock time $te_{s\_new}$ based on the new estimation parameters ($a_{new}$, $b_{new}$) is smaller than a threshold $r_s$.

If determining that the absolute value of the difference in the estimated clock time is smaller than the threshold, the determining unit 3011 determines that the new estimation parameters ($a_{new}$, $b_{new}$) are appropriate (S4009). This is because the estimated clock time $te_{s\_new}$ and the estimated clock time $te_{s\_cur}$ become close values as illustrated in FIG. 41 if the new estimation parameters are appropriate.

On the other hand, if determining that the absolute value of the difference in the estimated clock time is not smaller than the threshold, the determining unit 3011 determines that the new estimation parameters ($a_{new}$, $b_{new}$) are inappropriate (S4011). Upon the end of determination processing (B) concerning whether or not estimation parameters are appropriate, return to the processing of the caller is made.

Referring back to FIG. 34, the control unit 3003 causes the processing to branch depending on whether or not it is determined that an error has occurred in the initial processing of S3407 (S3409). If it is determined that an error has occurred in the initial processing, the second setting unit 3001 sets the start clock time again (S3411). For example, the second setting unit 3001 sets the present clock time as the start clock time. Then, return to the processing represented in S3403 is made and the above-described processing is repeated. Note that if the acquisition processing is continued, the activation of the acquisition processing is omitted.

On the other hand, if it is determined that an error has not occurred in the initial processing, the control unit 3003 executes continued processing (S3413). In the continued processing, processing relating to fourth and subsequent periods is executed.

Figure 42:
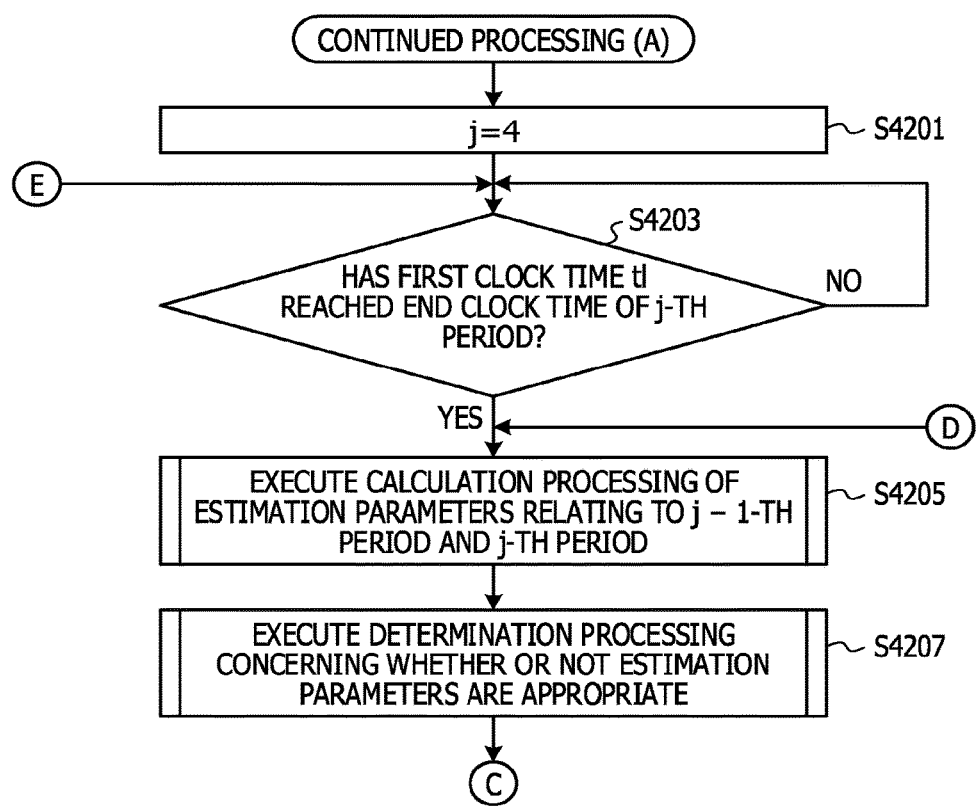
FIG. 42 is a diagram illustrating a flow of continued processing (A)

In the present embodiment, continued processing (A) is executed. In FIG. 42, the flow of continued processing (A) is illustrated. Because the flow starts from the processing relating to the fourth period, the control unit 3003 sets 4 as a parameter j of the period number (S4201).

The control unit 3003 determines whether or not the latest first clock time tl stored in the clock time table in acquisition processing (B) has reached the end clock time of the j-th period (S4203). If determining that the latest first clock time tl has not reached the end clock time of the j-th period, the control unit 3003 repeats the processing represented in S4203.

On the other hand, if determining that the latest first clock time tl has reached the end clock time of the j-th period, the control unit 3003 executes calculation processing of estimation parameters relating to the j−1-th period and the j-th period (S4205). Next, the determining unit 3011 executes determination processing concerning whether or not estimation parameters are appropriate (S4207). Then, transition is made to processing of S4301 represented in FIG. 43 through connector C. The calculation processing of estimation parameters and the determination processing concerning whether or not estimation parameters are appropriate are as described above.

Figure 38:
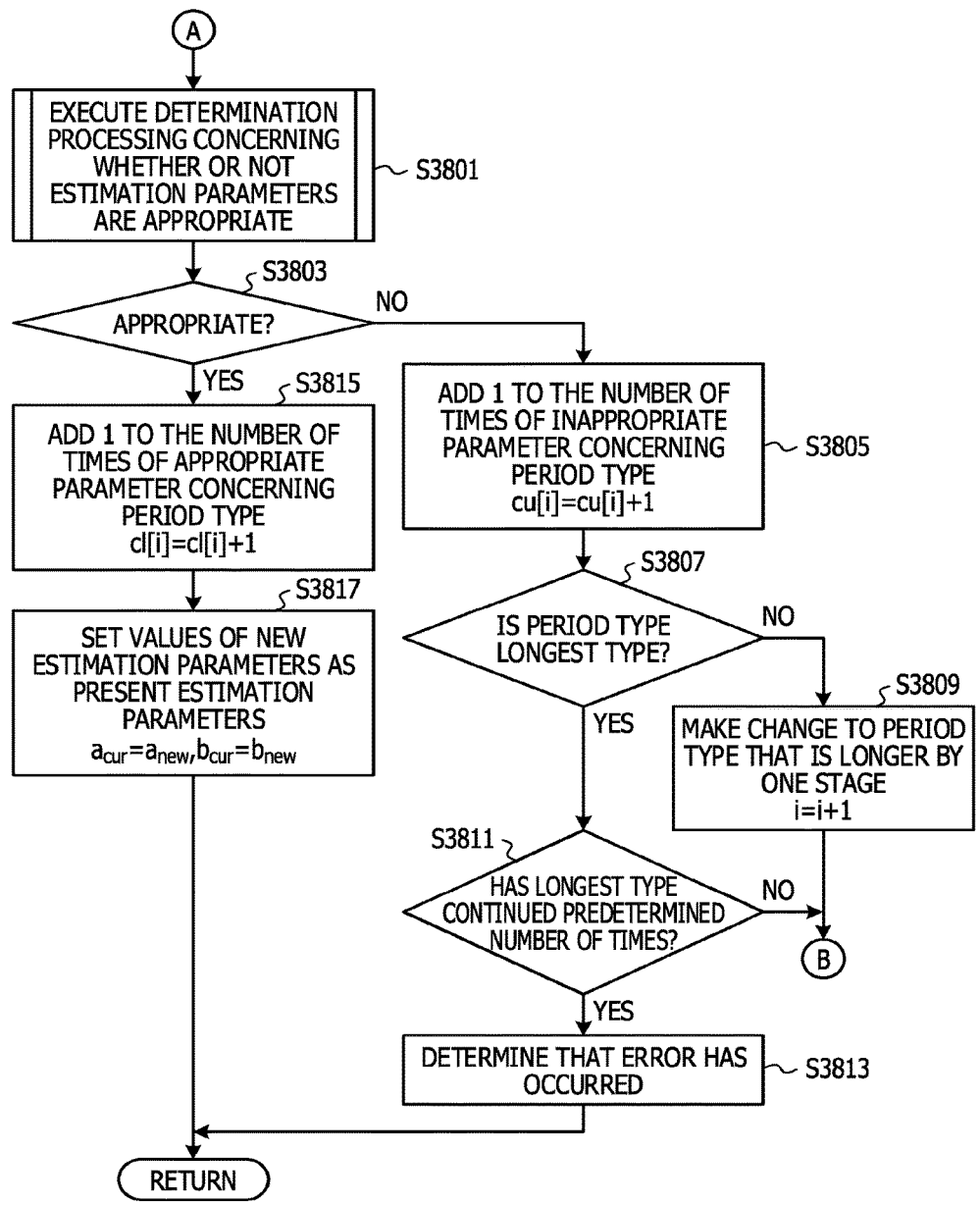
FIG. 38 is a diagram illustrating the flow of initial processing (A)
Figure 43:
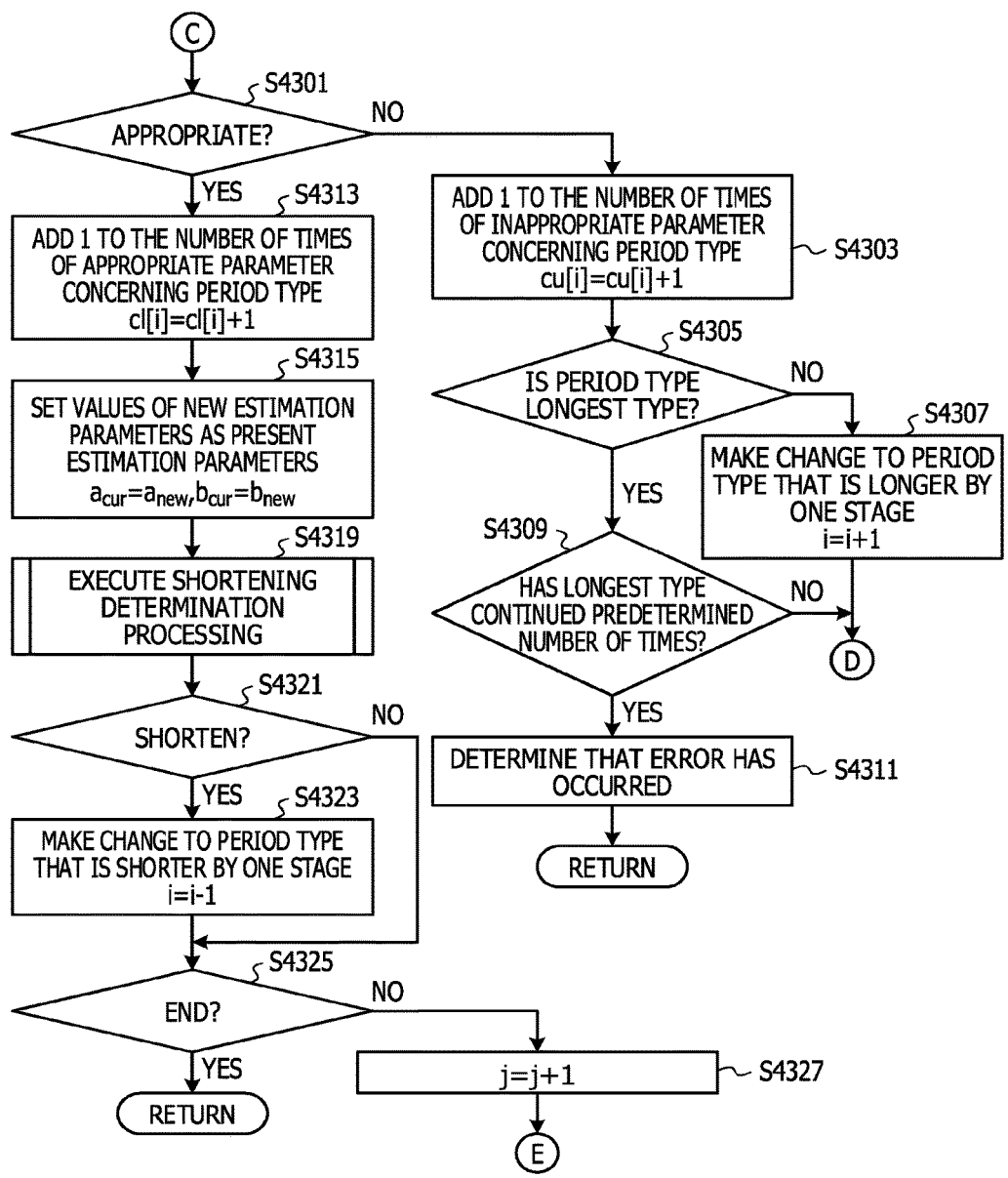
FIG. 43 is a diagram illustrating the flow of continued processing (A)

Referring next to FIG. 43, the processing of S4301 to S4315 is similar to the case of the processing of S3803 to S3817 represented in FIG. 38. Subsequently to the processing of S4315, the shortening unit 3015 executes shortening determination processing (S4319). In the shortening determination processing, determination of whether or not to shorten the period length is carried out.

Figure 44:
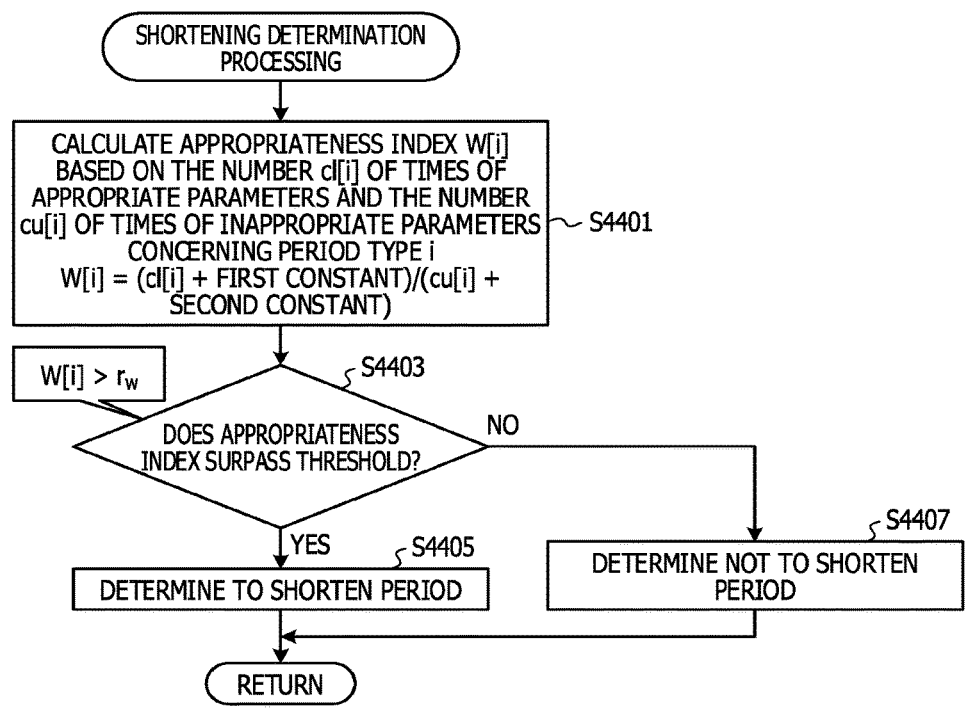
FIG. 44 is a diagram illustrating a flow of shortening determination processing.

In FIG. 44, the flow of the shortening determination processing is illustrated. The shortening unit 3015 calculates an appropriateness index W[i] based on the number cl[i] of times of appropriate parameters and the number cu[i] of times of inappropriate parameters concerning the relevant period type ID [i] (S4401). For example, the shortening unit 3015 calculates the appropriateness index W[i] in accordance with an expression W[i]=(cl[i]+first constant)/(cu[i]+second constant). The first constant is a real number. The second constant is also a real number. Note that the period type ID [i] indicates the present period type.

The shortening unit 3015 determines whether or not the appropriateness index W[i] surpasses a threshold $r_W$ (S4403). If the appropriateness index W[i] surpasses the threshold $r_W$, the shortening unit 3015 determines to shorten the period length (S4405). On the other hand, if the appropriateness index W[i] does not surpass the threshold $r_W$, the shortening unit 3015 determines not to shorten the period length (S4407). Upon the end of the shortening determination processing, return to the processing of the caller is made.

Referring back to FIG. 43, the shortening unit 3015 causes the processing to branch depending on whether or not the shortening unit 3015 has determined to shorten the period (S4321). If having determined to shorten the period, the shortening unit 3015 makes a change to the period type that is shorter by one stage (S4323). For example, the shortening unit 3015 subtracts 1 from the parameter i of the period type ID. On the other hand, if the shortening unit 3015 has determined not to shorten the period, transition is made to processing of S4325 directly.

The control unit 3003 determines whether or not to end the processing (S4325). The control unit 3003 determines whether or not an end instruction has been made for example.

If determining not to end the processing, the control unit 3003 adds 1 to the period number j (S4327). Then, return to the processing of S4203 represented in FIG. 42 is made through connector E. On the other hand, if determining to end the processing, continued processing (A) is ended and return to main processing (B) of the caller is made.

Referring back to FIG. 34, the control unit 3003 causes the processing to branch depending on whether or not it is determined that an error has occurred in the continued processing of S3413 (S3415). If it is determined that an error has occurred in the continued processing, the second setting unit 3001 sets the start clock time again (S3411). For example, the second setting unit 3001 sets the present clock time as the start clock time. Then, return to the processing represented in S3403 is made and the above-described processing is repeated. Note that if the acquisition processing is continued, the activation of the acquisition processing is omitted.

On the other hand, if it is determined that an error has not occurred in the continued processing, main processing (B) is ended. Before main processing (B) is ended, the control unit 3003 may stop the acquisition processing.

According to the present embodiment, the recording clock time given by external equipment may be altered into an estimated clock time of the own time clock criterion more correctly.

Furthermore, the new estimation parameters are applied to the next period and thus the estimated clock time may be obtained at an early timing.

Moreover, if the new estimation parameters are inappropriate, the period is extended and the new estimation parameters are recalculated. This may correct the error in the estimated clock time.

In addition, the next period is shortened if the shortening condition is satisfied. Therefore, it is easy to reduce the estimation error due to variation in the frequency deviation in the local time clock 107.

[Embodiment 3]

In the present embodiment, an example in which iteration is carried out in calculation processing of estimation parameters will be described.

Figure 45:
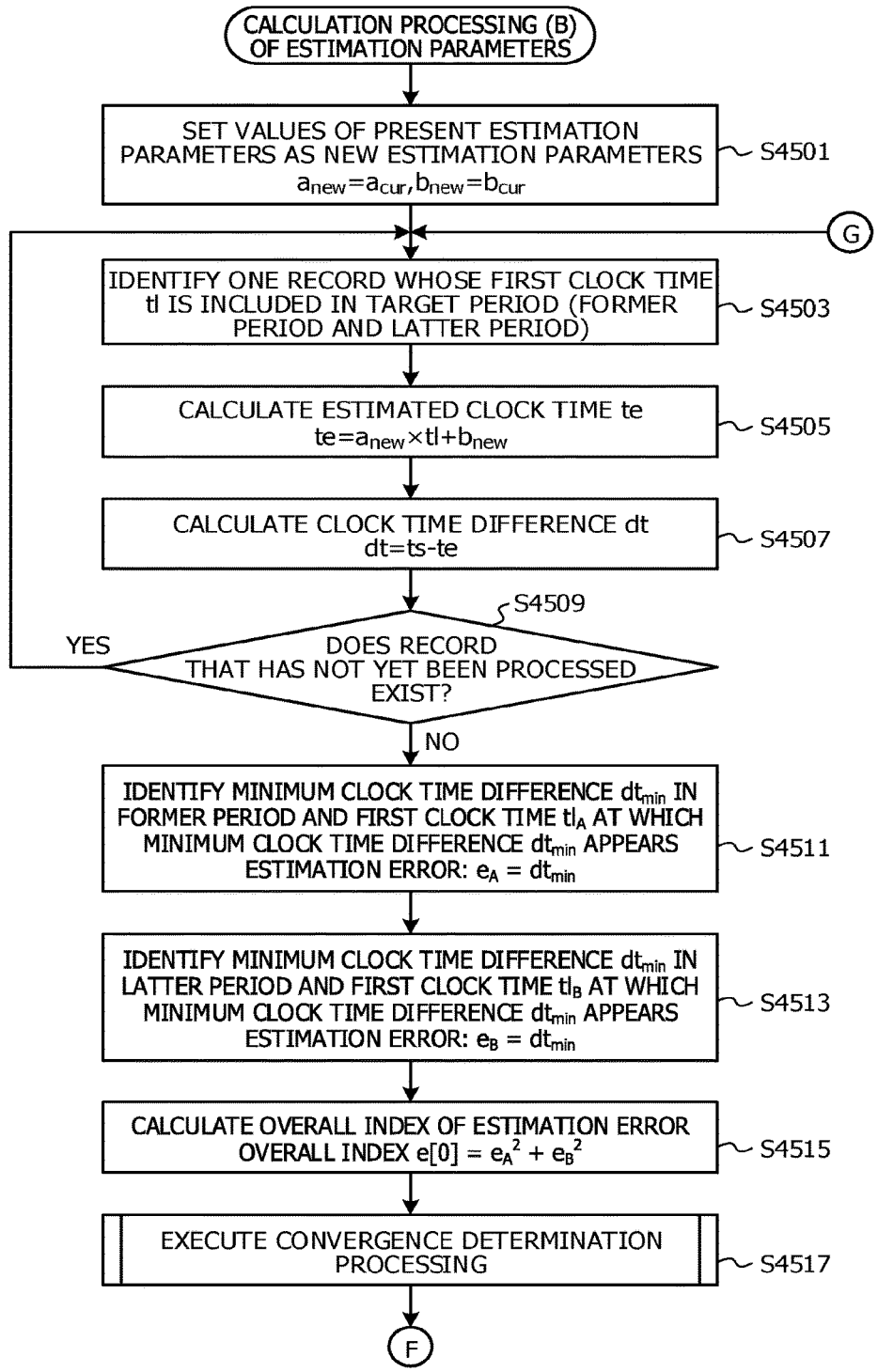
FIG. 45 is a diagram illustrating a flow of calculation processing (B) of estimation parameters.

In the present embodiment, calculation processing (B) of estimation parameters is executed instead of calculation processing (A) of estimation parameters. In FIG. 45, the flow of calculation processing (B) of estimation parameters is illustrated. The processing of S4501 to S4513 is similar to the case of the processing of S3701 to S3713 represented in FIG. 37.

The fourth calculating unit 3009 calculates an overall index e[0] of the estimation error in accordance with an expression of the overall index $e[0]=e_A^2+e_B^2$ (S4515). Then, the fourth calculating unit 3009 executes convergence determination processing (S4517). In the convergence determination processing, whether or not the estimation parameters have converged is determined based on the present overall index e[0] of the estimation error, the last overall index e[1] of the estimation error, and the second last overall index e[2] of the estimation error.

Figure 46:
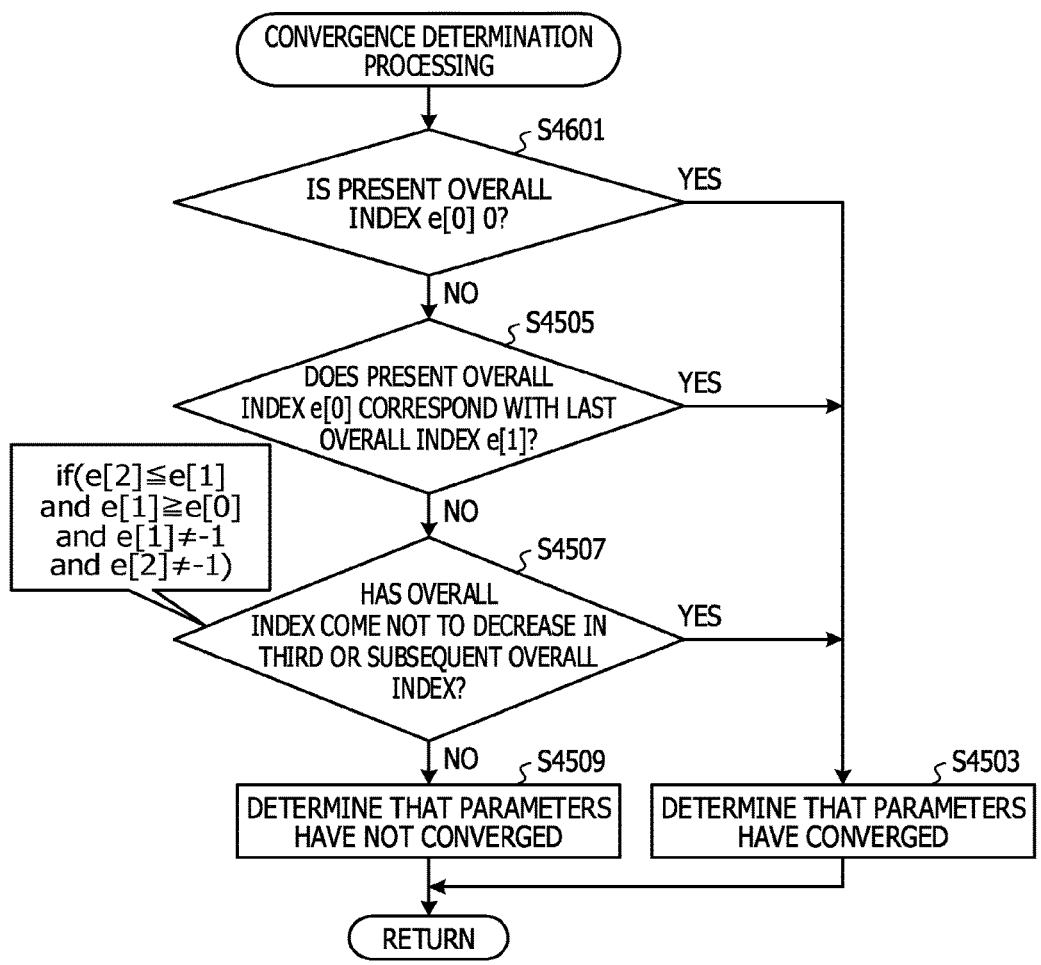
FIG. 46 is a diagram illustrating a flow of convergence determination processing.

In FIG. 46, the flow of the convergence determination processing is illustrated. The fourth calculating unit 3009 determines whether or not the present overall index e[0] is 0 (S4601). If determining that the present overall index e[0] is 0, the fourth calculating unit 3009 determines that the estimation parameters have converged (S4603). Then, the convergence determination processing is ended and return to calculation processing (B) of estimation parameters, of the caller, is made.

On the other hand, if determining that the present overall index e[0] is not 0, the fourth calculating unit 3009 determines whether or not the present overall index e[0] corresponds with the last overall index e[1] (S4605). If determining that the present overall index e[0] corresponds with the last overall index e[1], the fourth calculating unit 3009 determines that the estimation parameters have converged (S4603). Then, the convergence determination processing is ended and return to calculation processing (B) of estimation parameters, of the caller, is made.

On the other hand, if determining that the present overall index e[0] does not correspond with the last overall index e[1], the fourth calculating unit 3009 determines whether or not the overall index has come not to decrease in the third or subsequent overall index. (S4607). Note that in this example, the fourth calculating unit 3009 determines whether or not a conditional expression of (e[2]≤e[1] and e[1]≥e[0] and e[1]≠−1 and e[2]≠−1) is satisfied. In this example, the initial value of e[1] and e[2] is −1 and the expression of (e[1]≠−1 and e[2]≠−1) is equivalent to a condition that the present overall index is the third or subsequent overall index.

If determining that the overall index has come not to decrease in the third or subsequent overall index, the fourth calculating unit 3009 determines that the estimation parameters have converged (S4603). Then, the convergence determination processing is ended and return to calculation processing (B) of estimation parameters, of the caller, is made.

On the other hand, if the fourth calculating unit 3009 does not determine that the overall index has come not to decrease in the third or subsequent overall index, the fourth calculating unit 3009 determines that the estimation parameters have not converged (S4609). Then, the convergence determination processing is ended and return to calculation processing (B) of estimation parameters, of the caller, is made.

Figure 47:
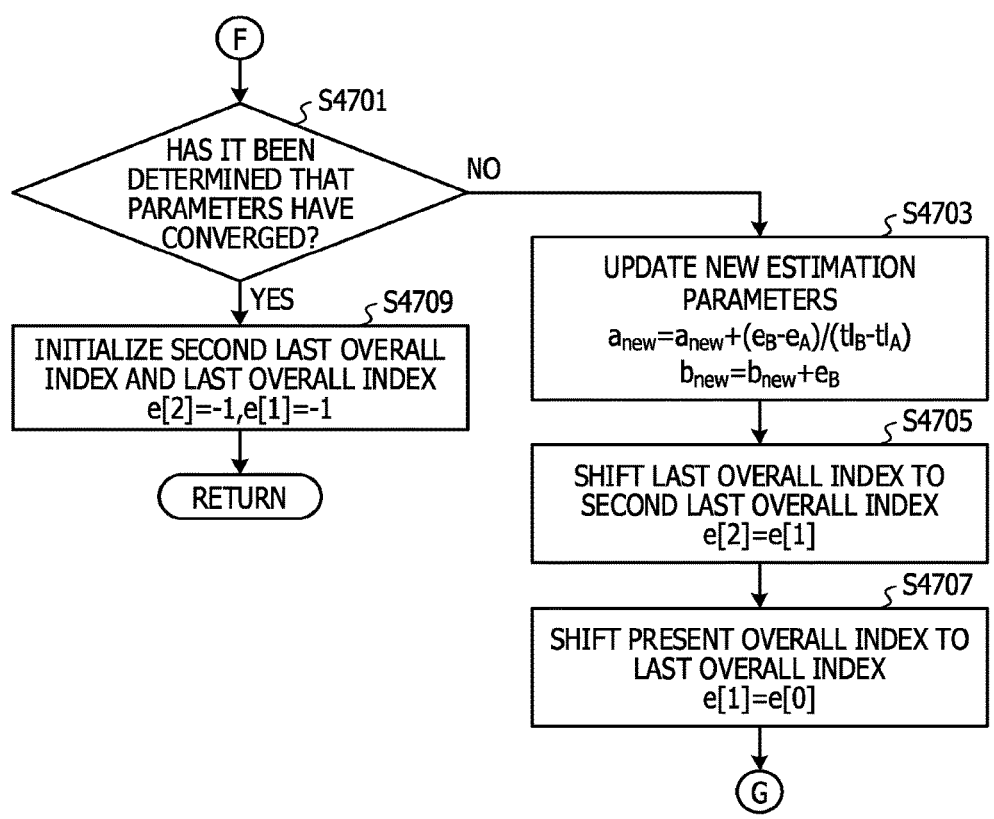
FIG. 47 is a diagram illustrating the flow of calculation processing (B) of estimation parameters.

Referring back to FIG. 45, upon the end of the convergence determination processing in S4517, transition is made to processing of S4701 represented in FIG. 47 through connector F.

Note that a sum of squared difference relating to the estimation parameters, $(a_{new}-a_{cur})^2+(b_{new}-b_{cur})^2$, may be used as the overall index e.

Referring next to FIG. 47, the fourth calculating unit 3009 causes the processing to branch depending on whether or not the fourth calculating unit 3009 has determined that the estimation parameters have converged (S4701). If having determined that the new estimation parameters have not converged, the fourth calculating unit 3009 updates the new estimation parameters $(a_{new}, b_{new})$ in accordance with an expression of $a_{new}=a_{new}+(e_B-e_A)/(tl_B-tl_A)$ and an expression of $b_{new}=b_{new}+e_B$ (S4703). Furthermore, the fourth calculating unit 3009 shifts the last overall index to the parameter of the second last overall index (S4705). Moreover, the fourth calculating unit 3009 shifts the present overall index to the parameter of the last overall index (S4707). Return to the processing of S4503 represented in FIG. 45 is made through connector G.

On the other hand, if having determined that the new estimation parameters have converged, the fourth calculating unit 3009 initializes the second last overall index and the last overall index (S4709). In this example, −1 is set as e[1] and e[2].

According to the present embodiment, the accuracy of the estimation parameters is enhanced by the iteration.

[Embodiment 4]

In the above-described embodiment, the example in which the new estimation parameters are applied to the first clock time tl of the future is represented. In the present embodiment, an example in which the new estimation parameters are applied to the first clock time tl that is known will be described.

Figure 48:
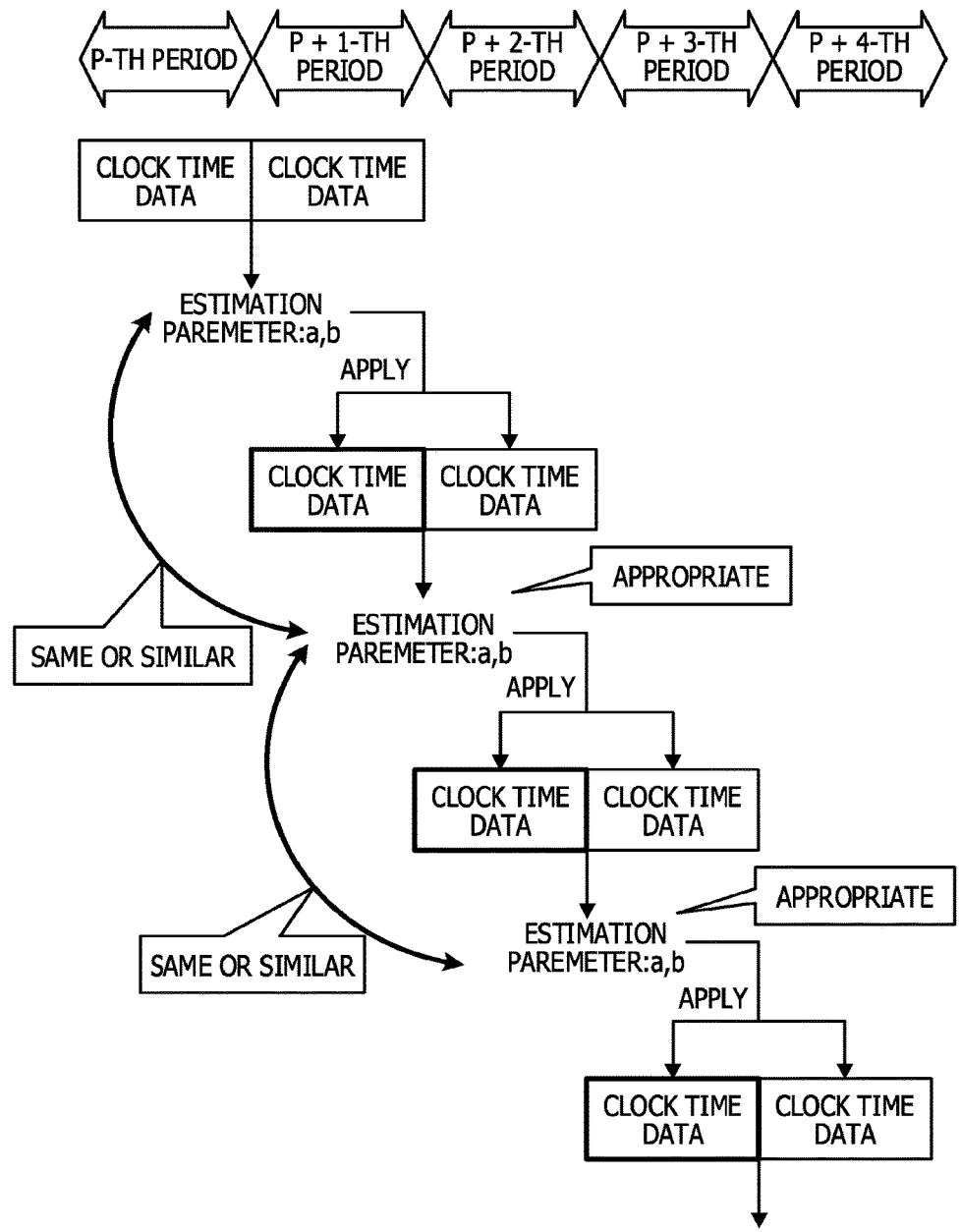
FIG. 48 is a diagram illustrating an outline of embodiment 4.

As illustrated in FIG. 48, the new estimation parameters are applied to the latter period in the periods used as the basis of the calculation of these new estimation parameters. For example, the estimation parameters calculated based on the clock time data in the P+1-th period and the P+2-th period are applied retroactively to the first clock times included in the P+2-th period. This enhances the accuracy of the estimated clock time compared with the cases of embodiments 2 and 3.

Figure 49:
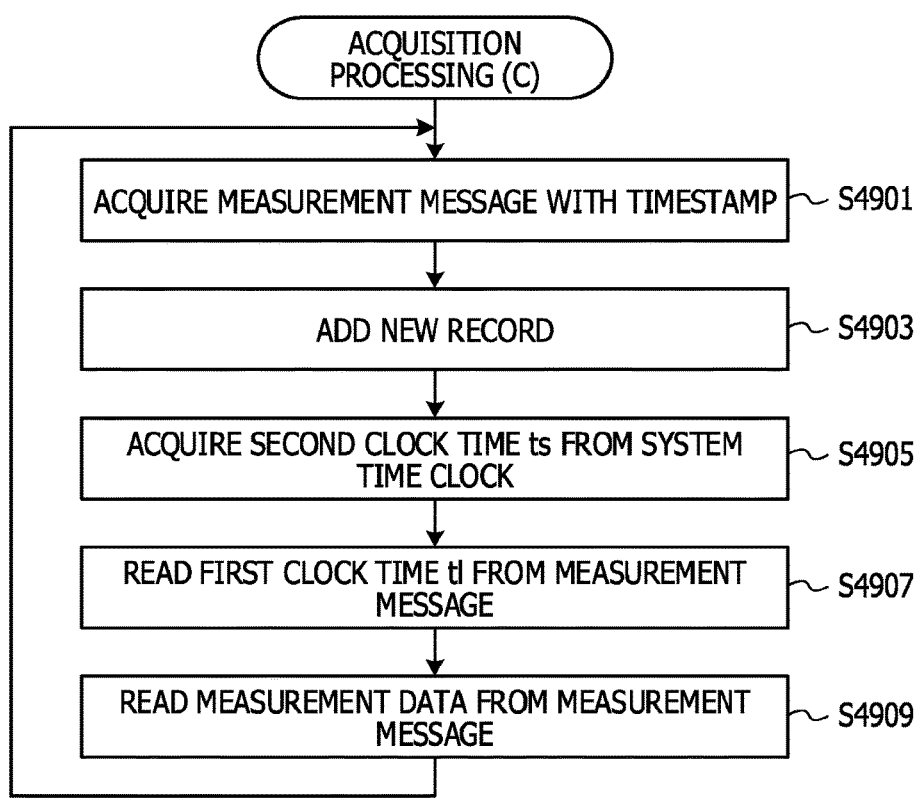
FIG. 49 is a diagram illustrating a flow of acquisition processing (C)

In the present embodiment, acquisition processing (C) is executed instead of acquisition processing (B). In FIG. 49, the flow of acquisition processing (C) is illustrated. In acquisition processing (C), calculation of the estimated clock time to is not carried out. The processing of S4901 to S4907 is similar to the case of the processing of S3501 to S3507 represented in FIG. 35. Furthermore, the processing of S4909 is similar to the case of the processing of S3511 represented in FIG. 35.

Figure 50:
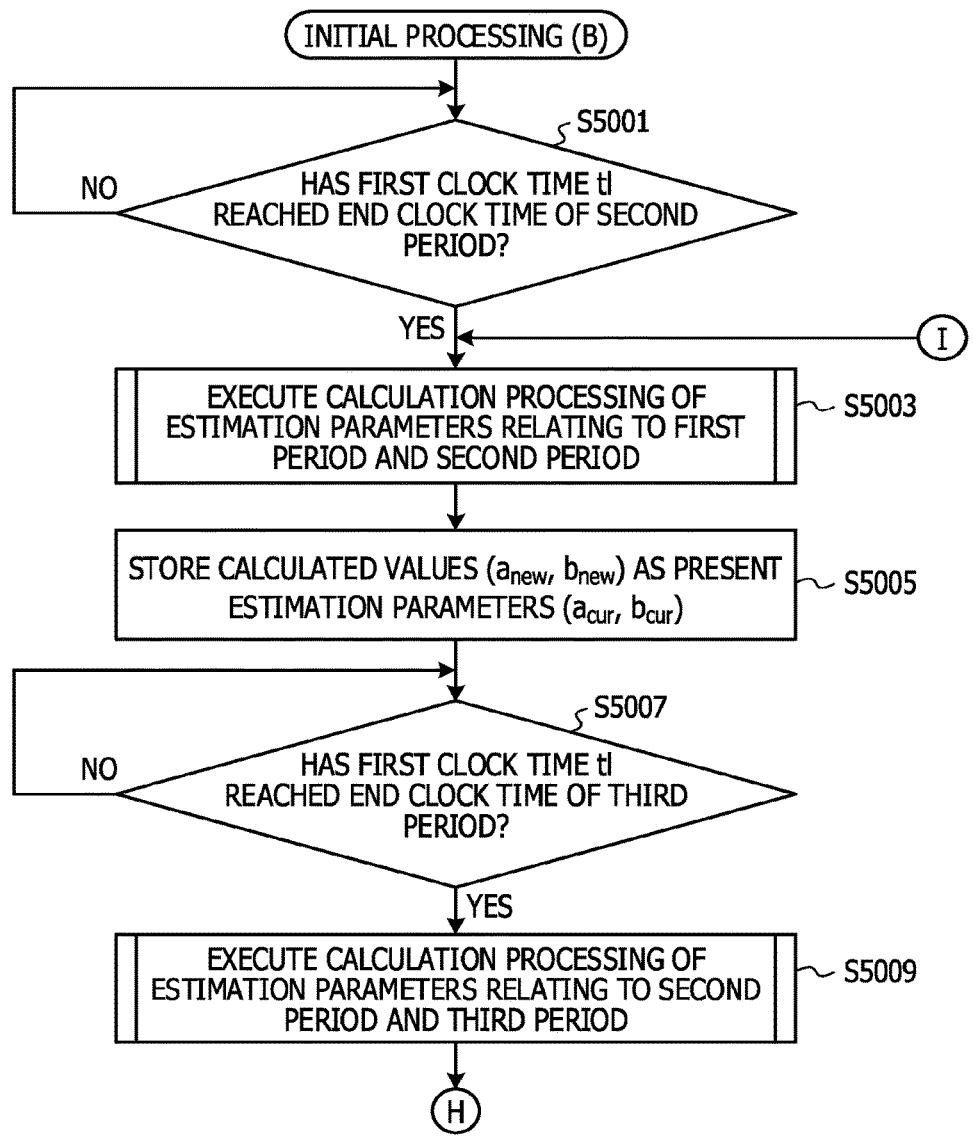
FIG. 50 is a diagram illustrating a flow of initial processing (B)

In the present embodiment, initial processing (B) is executed instead of initial processing (A). In FIG. 50, the flow of initial processing (B) is illustrated. The processing of S5001 to S5009 is similar to the case of the processing of S3601 to S3609 represented in FIG. 36. Upon the end of the processing of S5009, transition is made to processing of S5101 represented in FIG. 51 through connector H.

Figure 51:
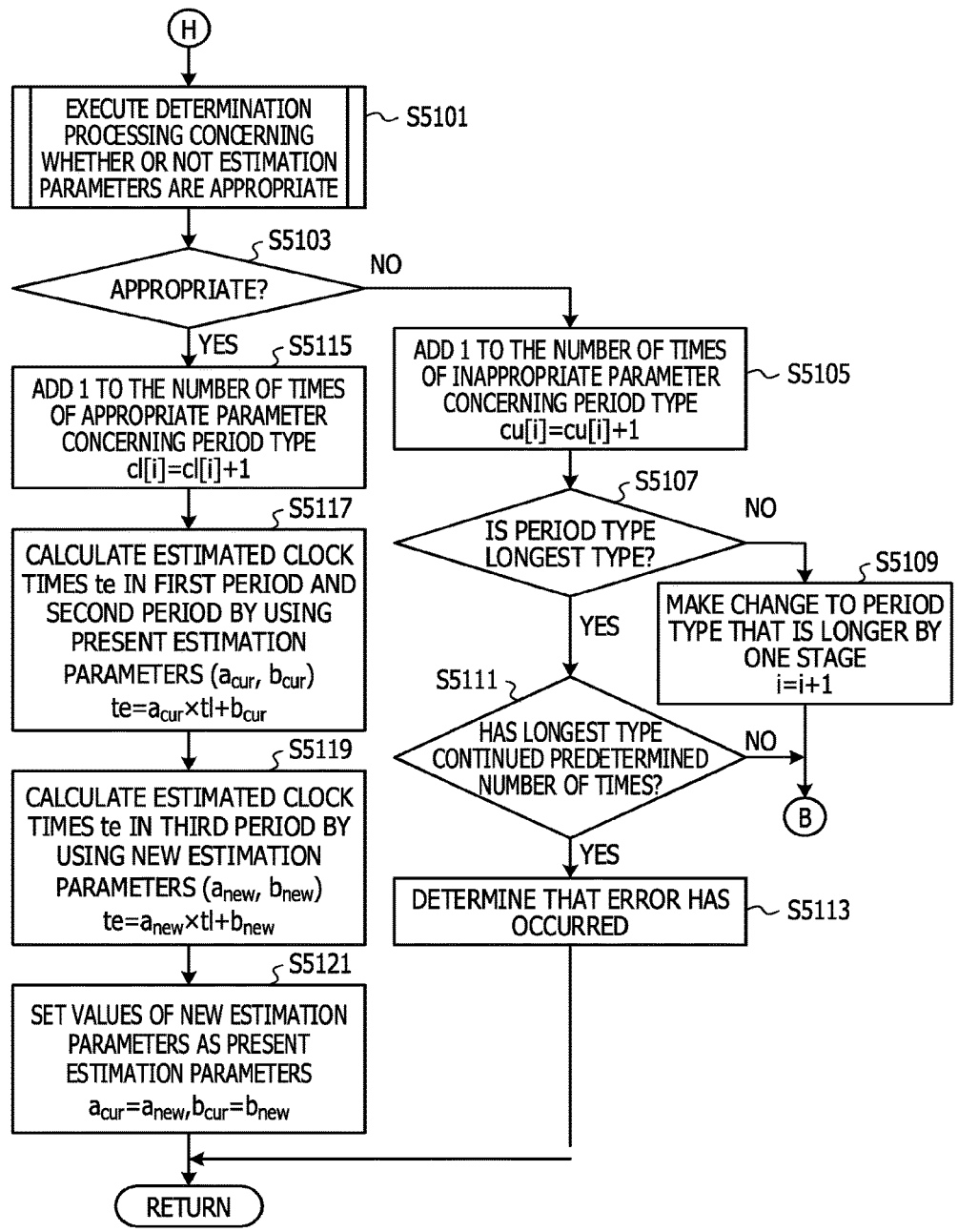
FIG. 51 is a diagram illustrating the flow of initial processing (B)

Referring next to FIG. 51, the processing of S5101 to S5115 is similar to the case of the processing of S3801 to S3815 represented in FIG. 38.

The third calculating unit 3007 calculates the estimated clock times te in the first period and the second period by using the present estimation parameters $(a_{cur}, b_{cur})$ (S5117). The third calculating unit 3007 stores the calculated estimated clock times te in records of the clock time table. The third calculating unit 3007 calculates the estimated clock times te in the third period by using the new estimation parameters $(a_{new}, b_{new})$ (S5119). The third calculating unit 3007 stores the calculated estimated clock times te in records of the clock time table.

The processing of S5121 is similar to the case of the processing of S3817 represented in FIG. 38. Upon the end of initial processing (B), return to main processing (B) of the caller is made.

Figure 52:
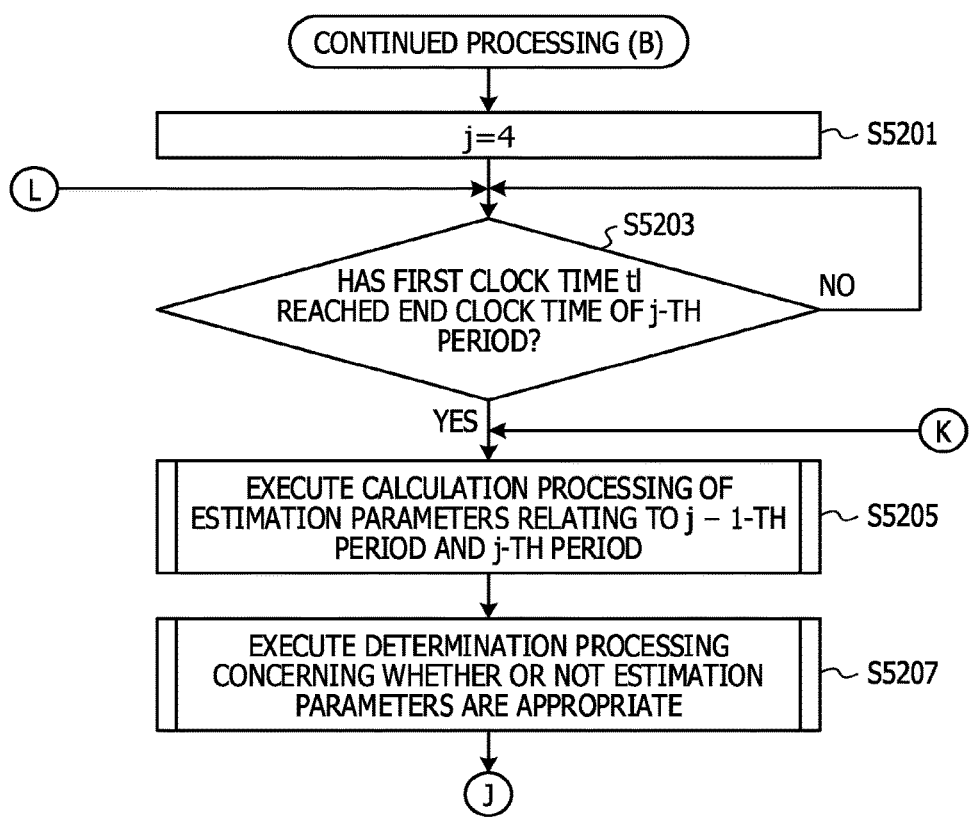
FIG. 52 is a diagram illustrating a flow of continued processing (B)

In the present embodiment, continued processing (B) is executed instead of continued processing (A). In FIG. 52, the flow of continued processing (B) is illustrated. The processing of S5201 to S5207 is similar to the case of the processing of S4201 to S4207 represented in FIG. 42. Transition is made to processing of S5301 represented in FIG. 53 through connector J.

Figure 53:
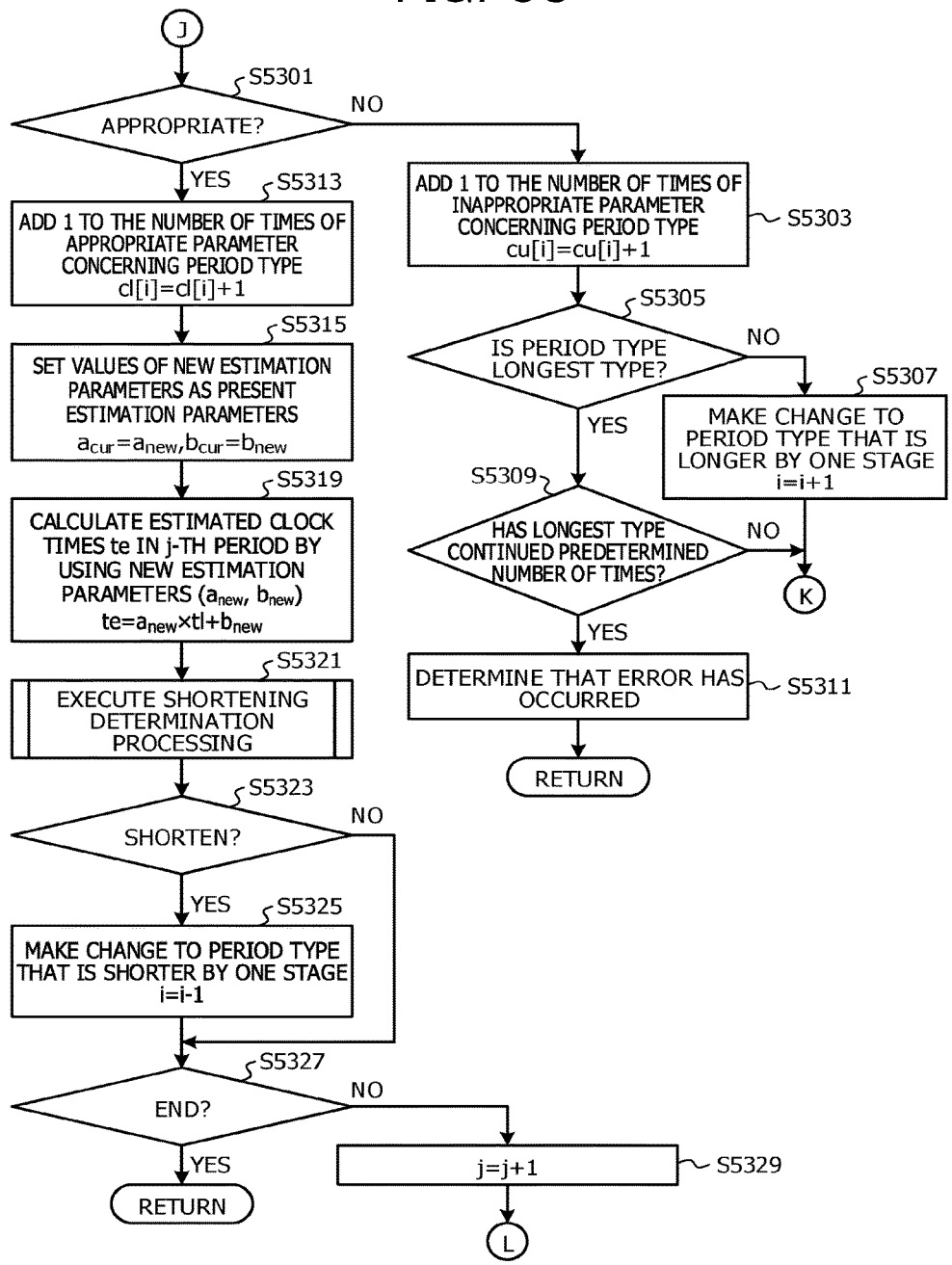
FIG. 53 is a diagram illustrating the flow of continued processing (B)

Referring next to FIG. 53, the processing of S5301 to S5315 is similar to the case of the processing of S4301 to S4315 represented in FIG. 43.

The third calculating unit 3007 calculates the estimated clock times te in the j-th period by using the new estimation parameters $(a_{new}, b_{new})$ (S5319). The third calculating unit 3007 stores the calculated estimated clock times te in records of the clock time table.

The processing of S5321 to S5329 is similar to the case of the processing of S4319 to S4327 represented in FIG. 43. Upon the end of continued processing (B), return to main processing (B) of the caller is made.

According to the present embodiment, the accuracy of the estimated clock time is further enhanced.

[Embodiment 5]

In the determination processing concerning whether or not estimation parameters are appropriate, a sum of squared difference relating to the estimation parameters, $(a_{new}-a_{cur})^2+(b_{new}-b_{cur})^2$, may be calculated and the determining unit 3011 may determine that the new estimation parameters $(a_{new}, b_{new})$ are appropriate if this value is smaller than a threshold. Furthermore, if this value is not smaller than the threshold, the determining unit 3011 may determine that the new estimation parameters $(a_{new}, b_{new})$ are inappropriate.

[Embodiment 6]

In the above-described embodiments, the example is represented in which the period is adjusted to a short period in such a range that the influence of the retention delay is not received. However, the period may be adjusted to a long period in such a range that the influence of the frequency deviation is not received.

In this case, the processing is started from the longest period for example. Then, if the estimation parameters are inappropriate, the period is shortened and the estimation parameters are recalculated. Furthermore, if the estimation parameters are appropriate, adjustment is carried out to cause the next period to become longer when a given extension condition is satisfied.

[Embodiment 7]

In the above-described embodiments, the example is represented in which the latter period in two periods used as the basis of the present estimation parameters and the former period in two periods used as the basis of the new estimation parameters overlap with each other. However, a configuration may be employed in which the two periods used as the basis of the present estimation parameters and the two periods used as the basis of the new estimation parameters do not overlap with each other.

Figure 54:
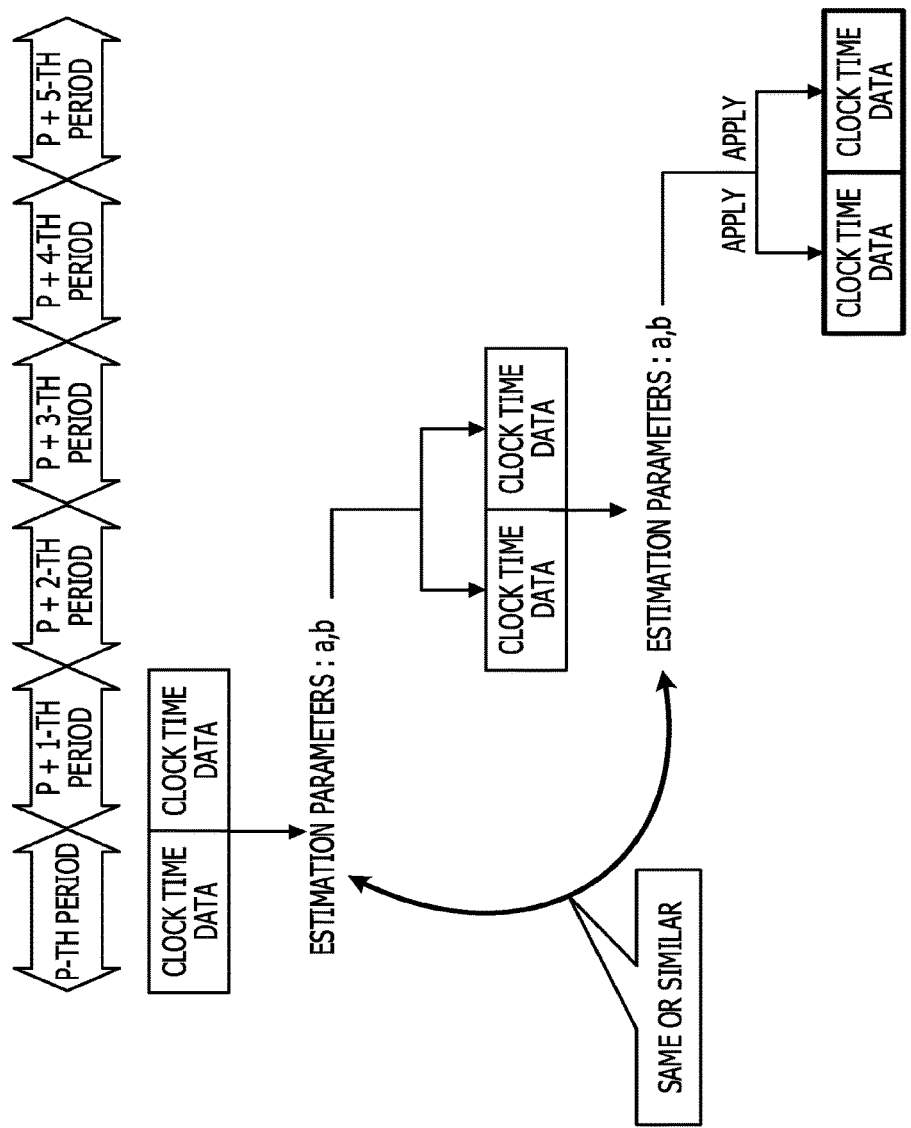
FIG. 54 is a diagram illustrating an outline of embodiment 7.

In an example illustrated in FIG. 54, at the end timing of the P+3-th period, the P-th period and the P+1-th period used as the basis of the present estimation parameters do not overlap with the P+2-th period and the P+3-th period used as the basis of the new estimation parameters. In this example, the new estimation parameters are applied in the subsequent P+4-th period and P+5-th period.

Figure 55:
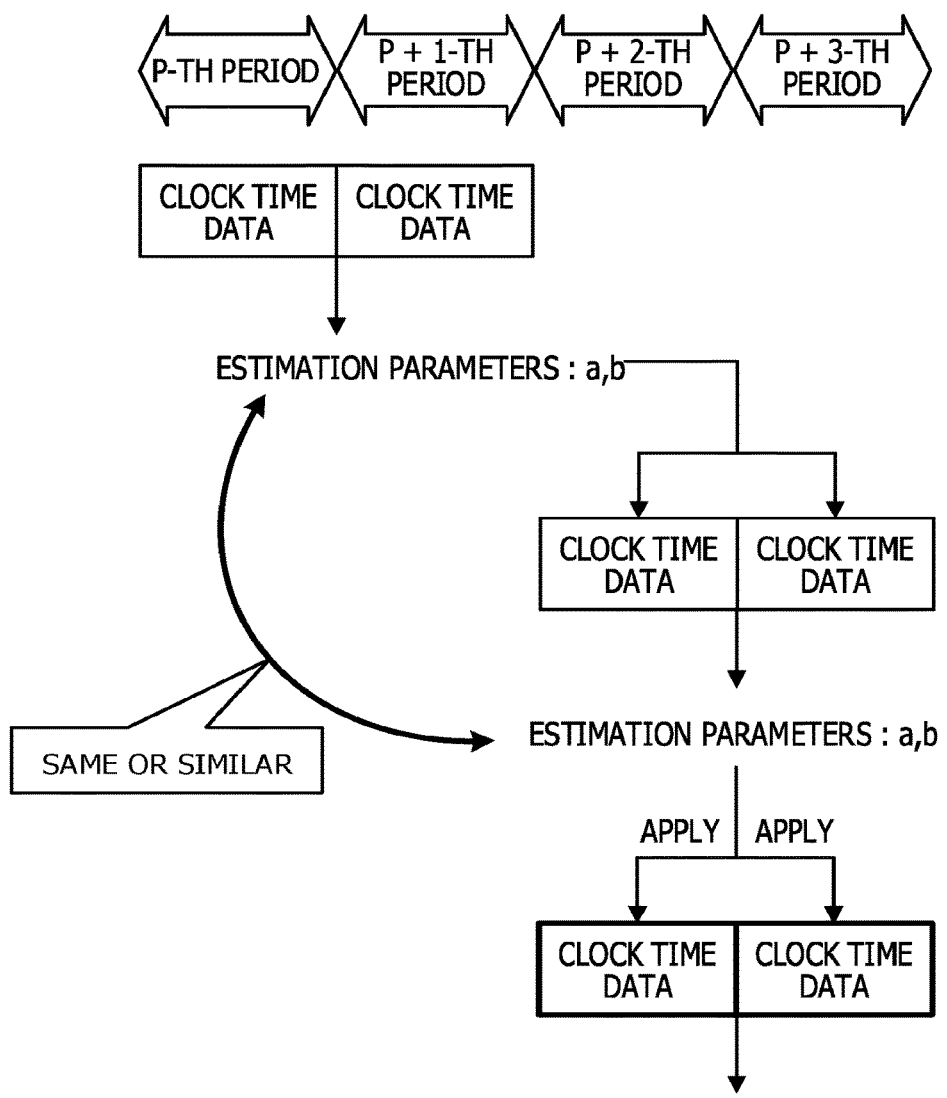
FIG. 55 is a diagram illustrating an outline of embodiment 7.

In an example illustrated in FIG. 55, similarly to the case of FIG. 54, at the end timing of the P+3-th period, the P-th period and the P+1-th period used as the basis of the present estimation parameters do not overlap with the P+2-th period and the P+3-th period used as the basis of the new estimation parameters. In this example, the new estimation parameters are applied in the known P+2-th period and P+3-th period.

Embodiment 2, embodiment 3, and the example illustrated in FIG. 54 have an aspect suitable for real-time processing. On the other hand, embodiment 4 and the example illustrated in FIG. 55 have an aspect suitable for batch processing.

Although the embodiment is described above, techniques of the present disclosure are not limited thereto. For example, there is also the case in which the above-described functional block configuration does not correspond with the program module configuration.

Furthermore, the configuration of each storage area described above is one example and does not have to be a configuration like the above-described configuration. Moreover, also in the processing flows, the order of the processing may be changed and plural kinds of processing may be executed in parallel as long as the processing result does not change.

The data collecting device 201 described above is a computer device. As illustrated in FIG. 21, a memory 2501, a CPU 2503, a hard disk drive (HDD) 2505, a display control unit 2507 coupled to a display device 2509, a drive device 2513 for a removable disc 2511, an input device 2515, and a communication control unit 2517 for coupling to a network are coupled by a bus 2519. An operating system (OS) and application programs for executing the processing in the embodiment are stored in the HDD 2505 and are read out from the HDD 2505 to the memory 2501 when being executed by the CPU 2503. The CPU 2503 controls the display control unit 2507, the communication control unit 2517, and the drive device 2513 according to the contents of processing of the application program and causes given operation to be carried out. Furthermore, data in the middle of processing is stored mainly in the memory 2501 but may be stored in the HDD 2505. In the embodiment, the application programs for executing the processing described above are stored in the computer-readable removable disc 2511 and are distributed to be installed on the HDD 2505 from the drive device 2513. In some cases, the application programs are installed on the HDD 2505 via a network such as the Internet and the communication control unit 2517. Such a computer device implements the various kinds of functions described above through organic cooperation between hardware such as the CPU 2503 and the memory 2501 described above and programs such as the OS and the application programs.

Summarization of the embodiment described above is as follows.

An information processing device according to the embodiment includes (A) a first calculating unit configured to calculate an estimated clock time obtained by altering a recording clock time of a first time clock basis received from external equipment based on a second time clock basis regarding each of the recording clock times read from a buffer in which pieces of data including the recording clock times are accumulated, (B) a second calculating unit configured to calculate, regarding each of the recording clock times, the clock time difference between the estimated clock time obtained by altering the recording clock time and a reading clock time of the second time clock basis when the recording clock time is read, (C) an identifying unit configured to identify the minimum clock time difference among the calculated clock time differences regarding each cycle that is set in advance, and (D) an updating unit configured to update a change rate of an error in the first time clock basis based on the minimum clock time difference and a minimum clock time difference identified in the cycle that is past. (E) When altering the recording clock time based on the second time clock basis, the first calculating unit removes an error at a certain timing based on one of the minimum clock time differences and removes errors at other timings than the timing based on the recording clock times of the other timings and the change rate.

This may alter the recording clock time given by external equipment into an estimated clock time of the own time clock criterion more correctly.

Furthermore, the parameter may include a coefficient by which the recording clock time is multiplied and a value added to the product of this recording clock time and this coefficient.

If this is done, the processing load in the calculation of the estimated clock time is comparatively low.

Moreover, the first calculating unit may apply the parameter to the recording clock times later than the two or more periods used as the basis of this parameter.

If this is done, it is possible to obtain the estimated clock time at an early timing.

Furthermore, the first calculating unit may apply the parameter to at least part of the recording clock times in the two or more periods used as the basis of this parameter.

This enhances the accuracy of the estimated clock time.

Moreover, the information processing device may include a control unit that executes processing of repeating processing in the first calculating unit, processing in the second calculating unit, and processing in the third calculating unit.

If this is done, it is possible to obtain the estimated clock time continuously.

Furthermore, the information processing device may include a determining unit that determines whether or not the parameter of the present time is appropriate based on comparison with the parameter of the previous time.

If this is done, it is possible to suppress miscalculation of the estimated clock time.

Moreover, if it is determined that the parameter of the present time is inappropriate, the third calculating unit may recalculate the parameter of the present time based on two or more periods in which at least one period is extended.

This enables miscalculation of the estimated clock time to be correct.

Furthermore, the information processing device may include a shortening unit that shortens at least one period in the two or more periods that serve as the basis of the parameter of the next time if it is determined that the parameter of the present time is appropriate and a given condition is satisfied.

This enables the error in the estimated clock time to be suppressed.

Moreover, the third calculating unit may iterate correction of the parameter until the parameter satisfies a given condition in the process of calculation of the parameter.

This enhances the accuracy of the estimated clock time.

A program for causing a computer to execute the processing of the information processing device described above can be created. This program may be stored in a computer-readable storing medium or storing device such as a flexible disc, compact disc read only memory (CD-ROM), magneto-optical disc, semiconductor memory, or hard disk. An intermediate processing result is temporarily stored in a storing device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a memory; and
   a processor coupled to the memory and configured to:
   obtain a plurality of external times that are measured at different time points in another device and reported from the other device in order,
   measure a plurality of internal times of the information processing device in response to obtaining each of the plurality of external times, and
   correct a first external time that is obtained in a first time period of a plurality of sequential time periods based on a rate of a change in the plurality of internal times from a second external time to a third external time, the second external time being an external time at which a time difference between a corrected time of an external time obtained in a second time period and an internal time measured in response to obtaining the external time in the second time period is minimum in the second time period, the third external time being an external time at which a time difference between a corrected time of an external time obtained in a third time period and an internal time measured in response to obtaining the external time in the third time period is minimum in the third time period, each of the second time period and the third time period being one of the plurality of the sequential time periods, the second time period being prior to the third time period.

2. The information processing device according to claim 1, wherein
   the first external time is corrected by adding a specified value, determined based on the second external time and the third external time, to a product of the first external times and the rate of the change in the plurality of internal times.

3. The information processing device according to claim 1, wherein
   the second time period and the third time period are prior to the first time period.

4. The information processing device according to claim 1, wherein
   the first time period includes at least part of the second time period and the third time period.

5. The information processing device according to claim 1, wherein
   the obtaining of the plurality of external times, the measuring of the plurality of internal times, and the correcting of the first external time are repeated.

6. The information processing device according to claim 5, wherein
   the processor is configured to determine whether the rate of the change in the plurality of internal times is to be used, based on a previous rate of the change in the plurality of internal times.

7. The information processing device according to claim 6 wherein
   the processor is configured to update, when determining that the rate of the change in the plurality of internal times is not to be used, the rate of the change in the plurality of internal times with extending at least one of the second time period and the third time period.

8. The information processing device according to claim 6 wherein
   the processor is configured to shorten, when determining that the rate of the change in the plurality of internal times is to be used, at least one of a next second time period and a next third time period.

9. The information processing device according to claim 6 wherein
   correction of the rate of the change in the plurality of internal times is iterated until the rate of the change in the plurality of internal times satisfies a specified condition.

10. An information processing method comprising:
    obtaining a plurality of external times that are measured at different time points in another device and reported from the other device in order;
    measuring a plurality of internal times of the information processing device in response to obtaining each of the plurality of external times; and
    correcting a first external time that is obtained in a first time period of a plurality of sequential time periods based on a rate of a change in the plurality of internal times from a second external time to a third external time, the second external time being an external time at which a time difference between a corrected time of an external time obtained in a second time period and an internal time measured in response to obtaining the external time in the second time period is minimum in the second time period, the third external time being an external time at which a time difference between a corrected time of an external time obtained in a third time period and an internal time measured in response to obtaining the external time in the third time period is minimum in the third time period, each of the second time period and the third time period being one of the plurality of the sequential time periods, the second time period being prior to the third time period.

11. A non-transitory computer-readable medium including computer program instructions, which when executed by an information processing apparatus, cause the information processing device to:
    obtain a plurality of external times that are measured at different time points in another device and reported from the other device in order;
    measure a plurality of internal times of the information processing device in response to obtaining each of the plurality of external times; and correct a first external time that is obtained in a first time period of a plurality of sequential time periods based on a rate of a change in the plurality of internal times from a second external time to a third external time, the second external time being an external time at which a time difference between a corrected time of an external time obtained in a second time period and an internal time measured in response to obtaining the external time in the second time period is minimum in the second time period, the third external time being an external time at which a time difference between a corrected time of an external time obtained in a third time period and an internal time measured in response to obtaining the external time in the third time period is minimum in the third time period, each of the second time period and the third time period being one of the plurality of the sequential time periods, the second time period being prior to the third time period.

\* \* \* \* \*